(12) United States Patent
Pawlick et al.

(10) Patent No.: US 8,850,964 B2
(45) Date of Patent: Oct. 7, 2014

(54) COOKING METHOD AND APPARATUS

(75) Inventors: Adam Pawlick, Omaha, NE (US);
David W. France, Omaha, NE (US);
Steven R. Baker, Omaha, NE (US)

(73) Assignee: ConAgra Foods RDM, Inc., Omaha, NE (US), `

( * ) Notice: Subject to any disclaimer, the term of this patent is extended or adjusted under 35 U.S.C. 154(b) by 932 days.

(21) Appl. No.: 11/703,066

(22) Filed: Feb. 5, 2007

(65) Prior Publication Data
US 2007/0181008 A1    Aug. 9, 2007

Related U.S. Application Data

(63) Continuation-in-part of application No. 11/423,259, filed on Jun. 9, 2006.

(60) Provisional application No. 60/728,468, filed on Oct. 20, 2005.

(51) Int. Cl.
*A47J 29/02*    (2006.01)
*B65D 55/00*    (2006.01)
*A47J 27/16*    (2006.01)

(52) U.S. Cl.
CPC ...................................... *A47J 27/16* (2013.01)
USPC ................. 99/336; 99/450; 99/403; 99/410; 99/415; 99/426; 220/201; 220/495.03; 220/560.01; 220/573.1; 220/485

(58) Field of Classification Search
CPC ..................................................... A47J 27/16
USPC ........... 99/450, 336, 403, 410, 415, 417, 418, 99/426; 220/201, 495.03, 560.01, 573.1, 220/485
See application file for complete search history.

(56) References Cited

U.S. PATENT DOCUMENTS 113,893 A    4/1871    Joyce et al. ................... 220/762
166,102 A    7/1875    Hennaman .................... 220/525

(Continued)

FOREIGN PATENT DOCUMENTS

CH    672 585    12/1989
DE    28 10 175 A1    9/1979

(Continued)

OTHER PUBLICATIONS

U.S. Appl. No. 29/346,147, filed Oct. 27, 2009 entitled "Container Assembly".

(Continued)

*Primary Examiner* — Dana Ross
*Assistant Examiner* — Ket D Dang
(74) *Attorney, Agent, or Firm* — Ryan T. Grace; Advent, LLP

(57) ABSTRACT

An ovenable cooking apparatus for facilitating the cooking of food components while maintaining the separateness thereof includes a first container for holding a first food component, and a second container for holding a second food component. The separation of the first food component from the second food component maintains the surface area for the first and second food components to facilitate heating of the first and second food components. The first food component may have a liquid based content for producing steam when heated, and one or both of the first container and the second container may define a passage for providing airflow and steamflow for contacting the second container and/or the second foodstuff and heating or steaming the second food component. Additionally, the second container may be steam impermeable for cooking bread and the like.

15 Claims, 28 Drawing Sheets

(56) References Cited

U.S. PATENT DOCUMENTS

| | | | |
|---|---|---|---|
| 177,593 A | 5/1876 | Van Skelline | |
| 181,823 A | 9/1876 | Cornwall | 99/425 |
| 241,254 A | 5/1881 | Udell | |
| 254,770 A | 3/1882 | Hurd | 99/450 |
| 472,002 A * | 3/1892 | Ross et al. | 99/340 |
| 541,397 A | 6/1895 | Swartout | 220/573.5 |
| 590,212 A | 9/1897 | Daesch | 99/416 |
| 637,838 A | 11/1899 | Vernon | |
| 851,983 A | 4/1907 | Entringer | 210/314 |
| 899,244 A | 9/1908 | Chase | 99/412 |
| 902,181 A | 10/1908 | Tidow | 99/408 |
| 948,198 A | 2/1910 | Wiegand | 99/417 |
| 952,572 A | 3/1910 | Meyer | 99/413 |
| 955,033 A | 4/1910 | Wing | 99/428 |
| 1,004,423 A | 9/1911 | Hanlon | 220/759 |
| 1,099,603 A | 6/1914 | Ingersoll | |
| 1,263,004 A | 4/1918 | Tollagsen | 126/369 |
| 1,341,960 A | 6/1920 | Meyer et al. | 220/592.23 |
| 1,347,428 A | 7/1920 | Wittekind | 220/573.4 |
| 1,476,910 A | 12/1923 | Naugle | |
| 1,519,510 A | 12/1924 | Santarsiero | 99/416 |
| 1,630,787 A | 5/1927 | Cullen | 99/416 |
| 1,765,862 A | 6/1930 | Clapp | |
| 1,864,081 A | 6/1932 | Marr | |
| 1,906,592 A | 5/1933 | Hiester | |
| 1,944,089 A | 1/1934 | Litchfield | 150/9 |
| 1,985,978 A | 5/1934 | Thomas | 426/113 |
| 2,021,465 A | 11/1935 | Ritscher | 99/403 |
| 2,039,374 A | 5/1936 | Young | |
| 2,041,227 A | 5/1936 | Chalmers | 229/87 |
| 2,107,480 A | 1/1938 | Holton | 126/377.1 |
| 2,149,872 A | 3/1939 | Schmidt | 229/58 |
| 2,200,977 A | 5/1940 | Baxter | 426/95 |
| 2,271,921 A | 2/1942 | Luker | |
| 2,290,396 A | 7/1942 | Webster | |
| 2,540,036 A | 1/1951 | Spencer | |
| 2,556,115 A | 6/1951 | Smith | 99/417 |
| 2,559,101 A | 7/1951 | Wool | |
| 2,576,862 A | 11/1951 | Smith et al. | |
| 2,591,578 A | 4/1952 | McNealy et al. | |
| 2,600,566 A | 6/1952 | Moffett | |
| 2,650,485 A | 9/1953 | La Greca | 220/23.83 |
| 2,660,529 A | 11/1953 | Bloom | |
| 2,667,422 A | 1/1954 | Kauffman | |
| 2,673,805 A | 3/1954 | Colman | 99/171 |
| 2,673,806 A | 3/1954 | Colman | 99/171 |
| 2,714,070 A | 7/1955 | Welch | |
| 2,741,559 A | 4/1956 | Banowitz | 99/171 |
| 2,777,769 A | 1/1957 | Hiram | 426/113 |
| 2,801,930 A * | 8/1957 | Jeno | 426/615 |
| 2,805,392 A | 9/1957 | Schnoll | 324/706 |
| 2,852,898 A | 9/1958 | Berg | 53/182 |
| 2,858,970 A | 11/1958 | Barnes et al. | 229/55 |
| 2,865,768 A | 12/1958 | Barnes et al. | 99/171 |
| D185,399 S | 6/1959 | Tupper | |
| 2,960,218 A | 11/1960 | Cheeley | |
| 2,961,520 A | 11/1960 | Long | |
| 2,965,501 A | 12/1960 | Harriss | 426/120 |
| 3,012,895 A | 12/1961 | Stelnicki | |
| 3,027,261 A | 3/1962 | Samara | 99/171 |
| 3,035,754 A | 5/1962 | Meister | 229/53 |
| 3,052,554 A | 9/1962 | Colman | 99/171 |
| 3,068,779 A | 12/1962 | Eidlisz | 99/416 |
| 3,070,275 A | 12/1962 | Bostrom | 229/2.5 |
| 3,107,989 A | 10/1963 | Fesco | 55/381 |
| 3,109,359 A | 11/1963 | Falla | 99/339 |
| 3,141,400 A | 7/1964 | Powers | |
| 3,179,036 A | 4/1965 | Luker | |
| 3,191,520 A | 6/1965 | Halter | |
| 3,219,460 A | 11/1965 | Brown | |
| 3,220,635 A | 11/1965 | Kasting et al. | 229/57 |
| 3,220,856 A | 11/1965 | Vischer | |
| 3,240,610 A | 3/1966 | Cease | |
| 3,244,537 A | 4/1966 | Cease | |
| 3,246,446 A | 4/1966 | Powers | |
| 3,262,668 A | 7/1966 | Luker | |
| 3,271,169 A | 9/1966 | Baker et al. | |
| 3,286,832 A | 11/1966 | Pilger | 206/56 |
| 3,287,140 A | 11/1966 | Brussell | |
| 3,293,048 A | 12/1966 | Kitterman | 99/171 |
| 3,326,097 A | 6/1967 | Lokey | 93/82 |
| 3,349,941 A | 10/1967 | Wanderer | 220/23.88 |
| 3,353,327 A | 11/1967 | Cutler et al. | 53/28 |
| 3,353,707 A | 11/1967 | Eyles | 206/519 |
| 3,357,152 A | 12/1967 | Geigel | 53/29 |
| 3,396,868 A | 8/1968 | Fitzgerald | 206/508 |
| 3,420,397 A | 1/1969 | Miller | 220/203.09 |
| 3,421,654 A | 1/1969 | Hexel | |
| 3,424,342 A | 1/1969 | Scopp et al. | 220/793 |
| 3,445,050 A | 5/1969 | Peters et al. | |
| 3,447,714 A | 6/1969 | Elliot | 206/1.5 |
| 3,489,075 A | 1/1970 | O'Reilly | 99/450 |
| 3,521,788 A | 7/1970 | Carter et al. | |
| 3,547,661 A | 12/1970 | Stevenson | |
| 3,608,770 A | 9/1971 | Naimoli | 220/16 |
| 3,610,135 A | 10/1971 | Sheridan | |
| 3,610,458 A | 10/1971 | Nissley | |
| 3,615,646 A | 10/1971 | Neely et al. | |
| 3,620,834 A | 11/1971 | Duffy | 117/213 |
| 3,637,132 A | 1/1972 | Gray | 229/53 |
| 3,638,784 A | 2/1972 | Bodolay et al. | 206/45.34 |
| 3,641,926 A | 2/1972 | Williams et al. | 99/448 |
| 3,647,508 A | 3/1972 | Gorrell | 117/38 |
| 3,669,688 A | 6/1972 | Thompson | |
| 3,718,480 A | 2/1973 | Tremblay et al. | |
| 3,741,427 A | 6/1973 | Doyle | 220/573.4 |
| 3,777,447 A | 12/1973 | Herbine et al. | 53/36 |
| 3,811,374 A | 5/1974 | Mann | |
| 3,835,280 A | 9/1974 | Gades et al. | 219/10.55 |
| 3,836,042 A | 9/1974 | Petitto | |
| 3,844,409 A | 10/1974 | Bodolay et al. | 206/45.34 |
| 3,851,574 A | 12/1974 | Katz et al. | 426/107 |
| 3,865,301 A | 2/1975 | Pothier et al. | |
| 3,873,735 A | 3/1975 | Chalin et al. | 426/87 |
| 3,881,027 A | 4/1975 | Levinson | |
| 3,884,213 A | 5/1975 | Smith | |
| 3,884,383 A | 5/1975 | Burch et al. | |
| 3,893,567 A | 7/1975 | Davis et al. | 206/520 |
| 3,908,029 A | 9/1975 | Fredrickson | |
| 3,908,111 A * | 9/1975 | Du Bois et al. | 219/442 |
| 3,938,730 A | 2/1976 | Detzel et al. | 229/120.1 |
| 3,941,967 A | 3/1976 | Sumi et al. | |
| 3,956,866 A | 5/1976 | Lattur | 53/29 |
| 3,965,323 A | 6/1976 | Forker, Jr. et al. | |
| 3,970,241 A | 7/1976 | Hanson | 229/58 |
| 3,973,045 A | 8/1976 | Brandberg et al. | 426/110 |
| 3,974,353 A | 8/1976 | Goltsos | |
| 3,975,552 A | 8/1976 | Stangroom | |
| 3,983,256 A | 9/1976 | Norris et al. | |
| 3,985,990 A | 10/1976 | Levinson | |
| 4,018,355 A | 4/1977 | Ando | |
| 4,031,261 A | 6/1977 | Durst | |
| 4,036,423 A | 7/1977 | Gordon | 229/43 |
| 4,038,425 A | 7/1977 | Brandberg et al. | 426/107 |
| 4,043,098 A | 8/1977 | Putnam, Jr. et al. | 53/180 M |
| 4,065,583 A | 12/1977 | Ahlgren | |
| 4,077,853 A | 3/1978 | Coll-Palagos | 204/20 |
| 4,079,853 A | 3/1978 | Casutt | |
| 4,082,184 A | 4/1978 | Hammer | 206/519 |
| 4,082,691 A | 4/1978 | Berger | |
| 4,096,948 A | 6/1978 | Kuchenbecker | |
| 4,113,095 A | 9/1978 | Dietz et al. | 206/508 |
| 4,118,913 A | 10/1978 | Putnam, Jr. et al. | 53/551 |
| 4,126,945 A | 11/1978 | Manser et al. | |
| 4,132,811 A | 1/1979 | Standing et al. | 426/111 |
| 4,133,896 A | 1/1979 | Standing et al. | |
| 4,136,505 A | 1/1979 | Putnam, Jr. et al. | 53/551 |
| 4,138,054 A | 2/1979 | Spencer | 229/23 BT |
| 4,140,889 A | 2/1979 | Mason et al. | 219/733 |
| 4,154,860 A | 5/1979 | Daswick | |
| 4,156,806 A | 5/1979 | Teich et al. | 219/10.55 E |
| 4,164,174 A | 8/1979 | Wallsten | 99/415 |
| 4,171,605 A | 10/1979 | Putnam, Jr. et al. | 53/552 |
| 4,184,061 A | 1/1980 | Suzuki et al. | 219/10.55 E |

(56) References Cited

U.S. PATENT DOCUMENTS

| | | | |
|---|---|---|---|
| 4,186,217 A | 1/1980 | Tchack | |
| 4,190,757 A | 2/1980 | Turpin et al. | 219/10.55 E |
| 4,196,331 A | 4/1980 | Leveckis et al. | 219/10.55 E |
| D255,751 S | 7/1980 | Daenen | D7/667 |
| 4,219,573 A | 8/1980 | Borek | 426/107 |
| 4,228,945 A | 10/1980 | Wysocki | |
| 4,230,767 A | 10/1980 | Isaka et al. | 428/349 |
| 4,230,924 A | 10/1980 | Brastad et al. | 219/10.55 E |
| 4,233,325 A | 11/1980 | Slangan et al. | |
| 4,241,563 A | 12/1980 | Müller et al. | 53/511 |
| 4,242,378 A | 12/1980 | Arai | 427/264 |
| 4,258,086 A | 3/1981 | Beall | 219/10.43 |
| 4,264,668 A | 4/1981 | Balla | 428/195 |
| 4,267,420 A | 5/1981 | Brastad | 219/10.55 E |
| 4,279,933 A | 7/1981 | Austin et al. | 426/124 |
| 4,280,032 A | 7/1981 | Levison | |
| 4,283,427 A | 8/1981 | Winters et al. | 426/107 |
| 4,291,520 A | 9/1981 | Prince et al. | 53/551 |
| 4,292,332 A | 9/1981 | McHam | 426/111 |
| 4,304,352 A | 12/1981 | Humphries | 229/31 R |
| 4,306,133 A | 12/1981 | Levinson | |
| 4,316,070 A | 2/1982 | Prosise et al. | 219/10.55 E |
| 4,317,017 A | 2/1982 | Bowen | |
| 4,324,088 A | 4/1982 | Yamashita et al. | 53/527 |
| 4,328,254 A | 5/1982 | Waldburger | |
| 4,335,291 A | 6/1982 | Ishino et al. | 219/10.55 E |
| 4,340,138 A | 7/1982 | Bernhardt | 206/519 |
| 4,345,133 A | 8/1982 | Cherney et al. | 219/10.55 E |
| 4,348,421 A | 9/1982 | Sakakibara et al. | |
| 4,351,997 A | 9/1982 | Mattisson et al. | |
| 4,355,757 A | 10/1982 | Roccaforte | 229/33 |
| 4,373,511 A * | 2/1983 | Miles et al. | 126/369 |
| 4,377,493 A | 3/1983 | Boylan et al. | |
| 4,389,438 A | 6/1983 | Ohtsuki et al. | 428/35 |
| 4,390,555 A | 6/1983 | Levison | |
| 4,398,994 A | 8/1983 | Beckett | 156/659.1 |
| 4,416,906 A | 11/1983 | Watkins | |
| 4,425,368 A | 1/1984 | Watkins | |
| 4,439,656 A | 3/1984 | Peleg | 219/10.55 E |
| 4,453,665 A | 6/1984 | Roccaforte et al. | 229/41 B |
| 4,461,031 A | 7/1984 | Blamer | 383/123 |
| 4,477,705 A | 10/1984 | Danley et al. | |
| 4,478,349 A | 10/1984 | Haverland et al. | 220/573.4 |
| 4,481,392 A | 11/1984 | Nibbe et al. | |
| 4,486,640 A | 12/1984 | Bowen et al. | |
| 4,493,685 A | 1/1985 | Blamer | 493/235 |
| 4,496,815 A | 1/1985 | Jorgensen | |
| 4,517,045 A | 5/1985 | Beckett | 156/345 |
| 4,518,651 A | 5/1985 | Wolfe, Jr. | 428/308.8 |
| 4,529,089 A | 7/1985 | Gasbarra et al. | 206/525 |
| 4,532,397 A | 7/1985 | McClelland | |
| D280,058 S | 8/1985 | Carlson | D7/629 |
| 4,535,889 A | 8/1985 | Terauds | 206/527 |
| 4,552,614 A | 11/1985 | Beckett | 156/640 |
| 4,553,010 A | 11/1985 | Bohrer et al. | 219/10.55 E |
| 4,571,337 A | 2/1986 | Cage et al. | 426/107 |
| 4,581,989 A * | 4/1986 | Swartley | 99/346 |
| 4,584,202 A | 4/1986 | Roccaforte | 426/111 |
| 4,586,649 A | 5/1986 | Webinger | 229/114 |
| 4,610,755 A | 9/1986 | Beckett | 156/634 |
| 4,612,431 A | 9/1986 | Brown et al. | 219/10.55 E |
| 4,626,352 A | 12/1986 | Massey et al. | 210/469 |
| 4,640,838 A | 2/1987 | Isakson et al. | 426/107 |
| 4,641,005 A | 2/1987 | Seiferth | 219/10.55 E |
| 4,648,549 A | 3/1987 | Trutna | 229/143 |
| 4,657,141 A | 4/1987 | Sorensen | 206/519 |
| 4,661,671 A | 4/1987 | Maroszek | 219/10.55 E |
| 4,661,672 A | 4/1987 | Nakanaga | |
| 4,677,905 A | 7/1987 | Johnson | 99/413 |
| 4,678,882 A | 7/1987 | Bohrer et al. | 219/10.55 E |
| D291,522 S | 8/1987 | Daenen et al. | D7/667 |
| 4,685,997 A | 8/1987 | Beckett | 156/629 |
| 4,697,703 A | 10/1987 | Will | 206/438 |
| 4,701,585 A | 10/1987 | Stewart | 219/10.55 E |
| 4,703,148 A | 10/1987 | Mikulski et al. | |
| 4,703,149 A | 10/1987 | Sugisawa et al. | |
| 4,705,927 A | 11/1987 | Levendusky et al. | 219/10.55 E |
| 4,713,510 A | 12/1987 | Quick et al. | 219/10.55 E |
| 4,714,012 A | 12/1987 | Hernandez | 99/444 |
| 4,727,706 A | 3/1988 | Beer | 53/434 |
| 4,734,288 A | 3/1988 | Engstrom et al. | 426/107 |
| 4,738,882 A | 4/1988 | Rayford et al. | 428/35 |
| 4,739,698 A * | 4/1988 | Allaire | 99/410 |
| 4,739,898 A | 4/1988 | Brown | 220/203.21 |
| 4,745,249 A | 5/1988 | Daniels | |
| 4,777,053 A | 10/1988 | Tobelmann et al. | |
| 4,794,005 A | 12/1988 | Swiontek | |
| 4,797,010 A | 1/1989 | Coelho | 383/109 |
| 4,803,088 A | 2/1989 | Yamamoto et al. | |
| 4,804,582 A | 2/1989 | Noding et al. | 428/332 |
| 4,806,718 A | 2/1989 | Seaborne et al. | 219/10.55 E |
| 4,808,780 A | 2/1989 | Seaborne | 219/10.55 E |
| 4,810,845 A | 3/1989 | Seaborne | 219/10.55 E |
| 4,818,831 A | 4/1989 | Seaborne | 219/10.55 E |
| 4,825,025 A | 4/1989 | Seiferth | 219/10.55 E |
| 4,842,876 A | 6/1989 | Anderson et al. | |
| 4,846,350 A | 7/1989 | Sorensen | 206/520 |
| 4,848,579 A | 7/1989 | Barnes et al. | |
| 4,851,246 A | 7/1989 | Maxwell et al. | 426/107 |
| 4,853,505 A | 8/1989 | Sorenson | |
| 4,853,509 A | 8/1989 | Murakami | |
| 4,864,089 A | 9/1989 | Tighe et al. | 219/10.55 E |
| 4,864,090 A | 9/1989 | Maxwell et al. | 219/10.55 E |
| 4,866,041 A | 9/1989 | Svarz et al. | |
| 4,870,233 A | 9/1989 | McDonald et al. | |
| 4,873,919 A | 10/1989 | Janssen | |
| 4,883,936 A | 11/1989 | Maynard et al. | 219/10.55 E |
| 4,892,744 A | 1/1990 | Ylvisaker | 426/111 |
| 4,896,009 A | 1/1990 | Pawlowski | 219/10.55 E |
| 4,899,925 A | 2/1990 | Bowden et al. | 229/2.5 R |
| 4,904,488 A | 2/1990 | LaBaw et al. | 426/107 |
| 4,914,266 A | 4/1990 | Parks et al. | 219/10.55 E |
| 4,915,216 A | 4/1990 | Magers | 206/520 |
| 4,915,780 A | 4/1990 | Beckett | 156/661.1 |
| 4,920,251 A * | 4/1990 | Whitenack et al. | 219/401 |
| 4,922,079 A * | 5/1990 | Bowen et al. | 219/415 |
| 4,923,704 A | 5/1990 | Levinson | 422/310 |
| 4,924,048 A | 5/1990 | Bunce et al. | |
| 4,935,592 A | 6/1990 | Oppenheimer | |
| 4,939,332 A | 7/1990 | Hahn | |
| 4,943,456 A | 7/1990 | Pollart et al. | 428/34.3 |
| 4,948,932 A | 8/1990 | Clough | 219/10.55 E |
| 4,952,765 A | 8/1990 | Toyosawa | |
| 4,959,516 A | 9/1990 | Tighe et al. | 219/10.55 E |
| 4,960,598 A | 10/1990 | Swiontek | |
| 4,961,944 A | 10/1990 | Matoba et al. | |
| 4,963,708 A | 10/1990 | Kearns et al. | |
| D312,189 S | 11/1990 | Noel | |
| 4,973,502 A | 11/1990 | Holzmuller et al. | |
| 4,973,810 A | 11/1990 | Brauner | 219/10.55 E |
| 4,982,064 A | 1/1991 | Hartman et al. | 219/10.55 E |
| 4,987,280 A | 1/1991 | Kanafani et al. | |
| 4,990,349 A | 2/1991 | Chawan et al. | |
| 4,992,638 A | 2/1991 | Hewitt et al. | |
| 5,011,299 A | 4/1991 | Black, Jr. et al. | 383/126 |
| 5,025,715 A | 6/1991 | Sir | |
| 5,026,958 A | 6/1991 | Palacios | |
| 5,035,800 A | 7/1991 | Kopach | 210/469 |
| 5,038,009 A | 8/1991 | Babbitt | 219/10.55 E |
| 5,039,001 A | 8/1991 | Kinigakis et al. | 229/120 |
| 5,041,295 A | 8/1991 | Perry et al. | |
| 5,044,777 A | 9/1991 | Watkins et al. | 383/100 |
| 5,050,791 A | 9/1991 | Bowden et al. | 229/2.5 R |
| 5,052,369 A | 10/1991 | Johnson | |
| 5,057,331 A | 10/1991 | Levinson | |
| D321,302 S | 11/1991 | Zimmerman | |
| 5,063,072 A | 11/1991 | Gillmore et al. | |
| 5,075,526 A | 12/1991 | Sklenak et al. | |
| 5,077,066 A | 12/1991 | Mattson et al. | |
| 5,081,330 A | 1/1992 | Brandberg et al. | 219/10.55 E |
| 5,094,865 A | 3/1992 | Levinson | |
| 5,095,186 A | 3/1992 | Scott Russell et al. | 219/10.55 E |
| 5,106,635 A | 4/1992 | McCutchan et al. | |
| 5,107,087 A | 4/1992 | Yamada et al. | |

(56) References Cited

U.S. PATENT DOCUMENTS

| | | |
|---|---|---|
| 5,108,768 A | 4/1992 | So |
| 5,153,402 A | 10/1992 | Quick et al. ............ 219/10.55 E |
| 5,176,284 A | 1/1993 | Sorensen |
| 5,189,947 A | 3/1993 | Yim ................................ 426/109 |
| 5,190,777 A | 3/1993 | Anderson et al. |
| 5,195,829 A | 3/1993 | Watkins et al. ................. 383/100 |
| 5,200,590 A | 4/1993 | Bowen et al. .......... 219/10.55 E |
| D335,445 S | 5/1993 | Detert et al. .................... D9/761 |
| D335,821 S | 5/1993 | Detert et al. .................... D9/761 |
| D336,242 S | 6/1993 | Detert et al. .................... D9/761 |
| 5,216,947 A * | 6/1993 | Cheng ............................. 99/417 |
| 5,223,291 A | 6/1993 | Levinson et al. |
| 5,230,914 A | 7/1993 | Akervik |
| 5,241,149 A | 8/1993 | Watanbe et al. |
| D341,990 S | 12/1993 | Yim |
| 5,294,765 A | 3/1994 | Archibald et al. ............. 219/727 |
| 5,298,708 A | 3/1994 | Babu et al. .................... 219/728 |
| 5,300,747 A | 4/1994 | Simon |
| 5,315,083 A | 5/1994 | Green |
| 5,363,750 A | 11/1994 | Miller et al. ..................... 99/426 |
| D353,303 S | 12/1994 | Davis |
| 5,370,042 A | 12/1994 | Tolchin et al. |
| 5,419,451 A | 5/1995 | Bitel, Jr. ......................... 220/306 |
| 5,423,453 A | 6/1995 | Fritz |
| 5,520,301 A | 5/1996 | Sohn ............................... 220/265 |
| D370,598 S | 6/1996 | Koch |
| D371,963 S | 7/1996 | Ahern, Jr. |
| 5,540,381 A | 7/1996 | Davis ........................... 229/103.2 |
| 5,558,798 A | 9/1996 | Tsai |
| D376,512 S | 12/1996 | Klemme ......................... D7/538 |
| 5,588,587 A | 12/1996 | Stier et al. |
| D378,565 S | 3/1997 | Cousins ......................... D7/667 |
| D378,566 S | 3/1997 | Cousins ......................... D7/667 |
| 5,645,300 A | 7/1997 | Hill |
| 5,645,762 A | 7/1997 | Cook et al. |
| 5,650,084 A | 7/1997 | Bley ................................ 219/727 |
| D384,555 S | 10/1997 | Bradley |
| 5,674,546 A | 10/1997 | Barnes et al. |
| D386,042 S | 11/1997 | Miller |
| 5,690,853 A | 11/1997 | Jackson et al. ................ 219/727 |
| 5,695,801 A | 12/1997 | Oh |
| 5,698,306 A | 12/1997 | Prosise et al. |
| 5,704,485 A | 1/1998 | Cautereels et al. ............ 206/546 |
| 5,718,933 A | 2/1998 | Fultz ............................... 426/115 |
| D391,440 S | 3/1998 | Cousins ......................... D7/360 |
| 5,726,426 A | 3/1998 | Davis et al. |
| 5,741,534 A | 4/1998 | Chung |
| 5,747,086 A | 5/1998 | Bows et al. |
| 5,753,895 A | 5/1998 | Olson et al. ................... 219/727 |
| 5,770,840 A | 6/1998 | Lorence |
| 5,807,597 A | 9/1998 | Barnes et al. |
| D405,561 S | 2/1999 | Willinger et al. ............. D30/129 |
| 5,869,120 A | 2/1999 | Blazevich ...................... 426/132 |
| 5,871,790 A | 2/1999 | Monier et al. ................. 426/107 |
| 5,876,811 A | 3/1999 | Blackwell et al. |
| 5,900,264 A | 5/1999 | Gics |
| 5,913,966 A | 6/1999 | Arnone et al. ................... 99/413 |
| 5,916,470 A | 6/1999 | Besser et al. |
| 5,916,620 A | 6/1999 | Oh |
| 5,925,281 A | 7/1999 | Levinson |
| 5,928,554 A | 7/1999 | Olson et al. ................... 219/727 |
| 5,931,333 A * | 8/1999 | Woodnorth et al. ........ 220/573.4 |
| 5,961,872 A | 10/1999 | Simon et al. |
| 5,970,858 A | 10/1999 | Boehm et al. ................... 99/446 |
| 5,974,953 A | 11/1999 | Messerli ........................... 99/340 |
| 5,986,248 A | 11/1999 | Matsuno et al. ............... 219/728 |
| 5,988,045 A | 11/1999 | Housley |
| 5,988,050 A | 11/1999 | Foster, Jr. ......................... 99/467 |
| D418,017 S | 12/1999 | Henry |
| D419,371 S | 1/2000 | Haley .......................... D7/392.1 |
| 6,018,157 A | 1/2000 | Craft |
| 6,042,856 A | 3/2000 | Sagan et al. ..................... 426/87 |
| D422,176 S | 4/2000 | Laib |
| 6,049,072 A | 4/2000 | Olson et al. ................... 219/727 |
| 6,055,901 A * | 5/2000 | Gantos et al. .................... 99/412 |
| 6,085,930 A | 7/2000 | Curtis ............................. 220/371 |
| 6,097,017 A | 8/2000 | Pickford |
| 6,103,291 A | 8/2000 | Fernandez Tapia ........... 426/523 |
| 6,106,882 A | 8/2000 | Oh et al. |
| D432,414 S | 10/2000 | Simpson et al. ............... D9/711 |
| D432,914 S | 10/2000 | Hayes et al. |
| 6,126,976 A | 10/2000 | Hasse, Jr. et al. |
| 6,136,355 A | 10/2000 | Fukuyama |
| D433,884 S | 11/2000 | Fujimoto ........................ D7/667 |
| 6,147,337 A | 11/2000 | Besser |
| 6,150,646 A | 11/2000 | Lai et al. |
| 6,167,799 B1 * | 1/2001 | Macias ............................. 99/413 |
| 6,168,044 B1 | 1/2001 | Zettle et al. |
| 6,175,105 B1 | 1/2001 | Rubbright et al. |
| 6,180,148 B1 | 1/2001 | Yajima |
| 6,180,150 B1 | 1/2001 | Schäfer |
| 6,183,789 B1 | 2/2001 | Nilsson et al. |
| 6,187,354 B1 | 2/2001 | Hopkins ......................... 426/234 |
| 6,192,792 B1 | 2/2001 | Gremillion |
| 6,196,406 B1 | 3/2001 | Ennis |
| 6,217,918 B1 | 4/2001 | Oh et al. |
| D441,597 S | 5/2001 | Wyche |
| D442,425 S | 5/2001 | Wyche |
| 6,229,131 B1 | 5/2001 | Koochaki |
| 6,230,919 B1 | 5/2001 | Guillin ........................... 220/315 |
| D445,633 S | 7/2001 | Bradley |
| D449,102 S | 10/2001 | Shin ............................. D23/366 |
| D449,495 S | 10/2001 | Tucker et al. |
| 6,309,684 B2 | 10/2001 | Hopkins, Sr. |
| 6,394,337 B1 | 5/2002 | Ross et al. .................... 229/103.2 |
| 6,396,036 B1 | 5/2002 | Hanson ......................... 219/727 |
| 6,422,453 B1 | 7/2002 | Wang |
| 6,455,084 B2 | 9/2002 | Johns |
| 6,463,844 B1 | 10/2002 | Wang et al. |
| 6,467,399 B1 | 10/2002 | Boutte |
| 6,486,455 B1 * | 11/2002 | Merabet ........................ 219/725 |
| D466,762 S | 12/2002 | Cote et al. ...................... D7/545 |
| 6,509,047 B2 | 1/2003 | Edomwonyi |
| D470,768 S | 2/2003 | Melhede ......................... D9/428 |
| 6,559,431 B2 | 5/2003 | Hopkins |
| 6,565,910 B1 | 5/2003 | Schell et al. .................... 426/589 |
| D477,187 S | 7/2003 | McCallister et al. |
| 6,608,292 B1 | 8/2003 | Barnes |
| 6,612,482 B2 | 9/2003 | Ross ............................. 229/103.2 |
| 6,645,539 B2 | 11/2003 | Bukowski et al. |
| D483,616 S | 12/2003 | Thonis |
| D485,473 S | 1/2004 | Dais et al. ...................... D7/629 |
| 6,727,484 B2 | 4/2004 | Policappelli |
| 6,803,551 B2 | 10/2004 | Kim et al. ...................... 219/731 |
| D497,744 S | 11/2004 | Portugal ......................... D7/543 |
| 6,818,873 B2 | 11/2004 | Savage et al. |
| 6,840,159 B1 | 1/2005 | Li ...................................... 99/337 |
| D502,847 S | 3/2005 | Leonori .......................... D7/667 |
| 6,868,980 B2 | 3/2005 | Schultz et al. ................. 220/367.1 |
| D505,048 S | 5/2005 | Cornfield ....................... D7/409 |
| D505,590 S | 5/2005 | Greiner et al. ................. D7/409 |
| D508,822 S | 8/2005 | Smith et al. |
| D513,942 S | 1/2006 | De Groote ..................... D7/665 |
| 7,008,214 B2 | 3/2006 | Faddi .......................... 425/382 R |
| 7,022,359 B2 | 4/2006 | Montserrate Gibernau |
| 7,025,213 B2 | 4/2006 | Chen ............................... 210/474 |
| D521,380 S | 5/2006 | Jackson et al. |
| 7,038,181 B2 | 5/2006 | Edmark |
| 7,045,190 B2 | 5/2006 | Inagaki et al. |
| D526,840 S | 8/2006 | Carlson ........................ D7/392.1 |
| 7,090,090 B2 | 8/2006 | Ohyama |
| D529,797 S | 10/2006 | Wilcox et al. .................. D9/428 |
| D543,796 S | 6/2007 | Lion et al. ...................... D7/667 |
| D552,433 S | 10/2007 | Stewart .......................... D7/667 |
| D557,982 S | 12/2007 | Ablo et al. ..................... D7/409 |
| D558,536 S | 1/2008 | Curtin ............................ D7/667 |
| D558,602 S | 1/2008 | Kissner et al. ................. D9/711 |
| D563,157 S | 3/2008 | Bouveret et al. |
| D564,287 S | 3/2008 | Bouveret et al. |
| D564,307 S | 3/2008 | Repp ............................. D7/667 |
| D571,656 S | 6/2008 | Maslowski ..................... D9/425 |
| D577,295 S | 9/2008 | Miller et al. ................... D9/711 |
| D582,201 S | 12/2008 | Kellermann |
| D582,791 S | 12/2008 | Elmerhaus ..................... D9/721 |

(56) References Cited

U.S. PATENT DOCUMENTS

| | | | |
|---|---|---|---|
| 7,468,498 B2 | 12/2008 | Tuszkiewicz et al. | 219/725 |
| D584,111 S | 1/2009 | Eide et al. | D7/667 |
| D584,145 S | 1/2009 | Young | |
| D590,663 S | 4/2009 | Simon et al. | |
| D591,591 S | 5/2009 | Moecks et al. | |
| D592,948 S | 5/2009 | Mayer | D9/418 |
| D593,369 S | 6/2009 | Green et al. | D7/602 |
| D594,328 S | 6/2009 | Shapiro et al. | D9/435 |
| D598,717 S | 8/2009 | Jalet | D7/667 |
| D607,095 S | 12/2009 | LeMay et al. | D23/366 |
| D610,903 S | 3/2010 | Shapiro et al. | D9/428 |
| D611,300 S | 3/2010 | Chen et al. | D7/409 |
| D612,196 S | 3/2010 | Furlong | D7/392.1 |
| D613,131 S | 4/2010 | Chen et al. | D7/667 |
| D630,061 S | 1/2011 | Kellermann | |
| D630,507 S | 1/2011 | Short et al. | D9/427 |
| D630,940 S | 1/2011 | Shapiro et al. | D9/428 |
| D632,561 S | 2/2011 | Short et al. | D9/427 |
| D633,810 S | 3/2011 | Jenkins | D9/721 |
| 7,977,612 B2 | 7/2011 | Levy et al. | 219/729 |
| 2001/0035402 A1 | 11/2001 | Barrow | 219/432 |
| 2001/0043971 A1 | 11/2001 | Johns | |
| 2001/0050002 A1 | 12/2001 | Bonanno | |
| 2002/0096450 A1 | 7/2002 | Garst | 206/516 |
| 2002/0110622 A1 | 8/2002 | Lloyd et al. | 426/115 |
| 2003/0003200 A1 | 1/2003 | Bukowski et al. | |
| 2003/0068411 A1 | 4/2003 | McCallister | 426/107 |
| 2003/0167932 A1* | 9/2003 | Chen | 99/413 |
| 2003/0213718 A1 | 11/2003 | Ducharme et al. | 206/503 |
| 2004/0058038 A1 | 3/2004 | Lee | |
| 2004/0107637 A1 | 6/2004 | Sieverding | 47/83 |
| 2004/0121049 A1 | 6/2004 | Ebner et al. | |
| 2004/0164075 A1 | 8/2004 | Henze et al. | |
| 2004/0216620 A1* | 11/2004 | Quiggins et al. | 99/413 |
| 2004/0238438 A1 | 12/2004 | Chen | 210/474 |
| 2005/0040161 A1 | 2/2005 | Lin et al. | 219/725 |
| 2005/0051549 A1 | 3/2005 | Nelson | 220/23.83 |
| 2005/0069602 A1 | 3/2005 | Faddi | 425/208 |
| 2005/0079250 A1 | 4/2005 | Mao et al. | 426/113 |
| 2005/0079252 A1 | 4/2005 | Kendig et al. | 426/125 |
| 2005/0082305 A1 | 4/2005 | Dais et al. | |
| 2005/0092762 A1* | 5/2005 | Murat et al. | 220/912 |
| 2005/0109772 A1 | 5/2005 | Thorpe et al. | |
| 2005/0112243 A1 | 5/2005 | Bellmann | 426/106 |
| 2005/0115417 A1 | 6/2005 | Murat et al. | 99/413 |
| 2005/0208182 A1 | 9/2005 | Gilbert et al. | 426/87 |
| 2005/0220939 A1 | 10/2005 | Morrow | 426/86 |
| 2005/0229793 A1 | 10/2005 | Wengrovsky | 99/483 |
| 2005/0256060 A1 | 11/2005 | Hilgers et al. | 514/25 |
| 2005/0271776 A1 | 12/2005 | Siegel | 426/138 |
| 2005/0281921 A1 | 12/2005 | Langston et al. | 426/120 |
| 2006/0013929 A1 | 1/2006 | Morris et al. | |
| 2006/0088678 A1 | 4/2006 | Berrier et al. | |
| 2006/0110498 A1 | 5/2006 | Dellinger et al. | |
| 2006/0118552 A1 | 6/2006 | Tiefenback | |
| 2006/0121168 A1 | 6/2006 | Flaherty et al. | |
| 2006/0151339 A1 | 7/2006 | Bradley et al. | |
| 2006/0236593 A1 | 10/2006 | Cap | |
| 2006/0260598 A1 | 11/2006 | Bjork et al. | |
| 2006/0289522 A1 | 12/2006 | Middleton et al. | 219/730 |
| 2007/0029314 A1 | 2/2007 | Rodgers et al. | 219/730 |
| 2007/0059406 A1 | 3/2007 | Shahsavarani | 426/106 |
| 2007/0090103 A1 | 4/2007 | France et al. | |
| 2007/0116806 A1 | 5/2007 | Parsons | 426/107 |
| 2007/0116807 A1 | 5/2007 | Parsons | 426/107 |
| 2007/0131679 A1 | 6/2007 | Edwards et al. | 219/725 |
| 2007/0251874 A1 | 11/2007 | Stewart | 210/232 |
| 2008/0069485 A1 | 3/2008 | France et al. | |
| 2008/0138473 A1 | 6/2008 | Pawlick et al. | |
| 2008/0178744 A1 | 7/2008 | Hill | 99/323.5 |
| 2008/0210686 A1 | 9/2008 | Shapiro et al. | |
| 2009/0022858 A1 | 1/2009 | Pawlick | |
| 2009/0035433 A1 | 2/2009 | France et al. | |
| 2009/0078125 A1 | 3/2009 | Pawlick et al. | |
| 2009/0142455 A1 | 6/2009 | Parsons | 426/120 |
| 2010/0015293 A1 | 1/2010 | Shapiro | |

FOREIGN PATENT DOCUMENTS

| | | | |
|---|---|---|---|
| EP | 0326105 A1 | 8/1989 | |
| EP | 0 449 643 A1 | 10/1991 | |
| EP | 1352841 A1 | 4/2002 | B65D 21/04 |
| EP | 1 245 504 A1 | 10/2002 | B65D 81/34 |
| EP | 1 352 848 A1 | 10/2003 | B65D 81/34 |
| EP | 1 514 804 A1 | 3/2005 | |
| EP | 1 464 262 B1 | 7/2005 | |
| EP | 1 612 150 A1 | 1/2006 | |
| EP | 1 749 757 A2 | 2/2007 | |
| FR | 2 631 315 A3 | 11/1989 | |
| FR | 2 774 262 A1 | 8/1999 | |
| FR | 2 846 196 A1 | 4/2004 | |
| FR | 2 860 213 | 4/2005 | |
| FR | 2 929 491 | 10/2009 | |
| GB | 1560488 | 2/1980 | B65D 25/02 |
| GB | 2 218 962 A | 11/1989 | |
| GB | 2 295 371 A | 5/1996 | |
| GB | 2 308 465 A | 6/1997 | |
| GB | 2340823 | 3/2000 | A47J 27/04 |
| JP | 2-109882 | 4/1990 | |
| JP | 4367476 A | 12/1992 | |
| JP | 06293366 | 10/1994 | |
| JP | 09051767 | 2/1997 | |
| JP | 10094370 A | 4/1998 | |
| JP | 10-129742 | 5/1998 | |
| JP | 11113511 | 4/1999 | |
| JP | 2001348074 A | 12/2001 | |
| JP | 2005059863 A | 3/2005 | |
| JP | 2005-312923 | 11/2005 | |
| JP | 2006-34645 | 2/2006 | |
| JP | 2010-189031 | 9/2010 | |
| MX | 01011879 A | 6/2002 | |
| SU | 1149999 A | 4/1985 | |
| WO | WO 86/00275 | 1/1986 | B65D 6/04 |
| WO | WO 96/07604 | 3/1996 | |
| WO | WO 98/33399 | 8/1998 | |
| WO | WO 99/59897 | 11/1999 | |
| WO | WO 9959897 A2 * | 11/1999 | B65D 85/00 |
| WO | WO 02/051716 | 7/2002 | |
| WO | WO 03/086882 | 10/2003 | B65D 21/04 |
| WO | WO 2004/045970 A1 | 6/2004 | |
| WO | WO 2006/098950 A2 | 9/2006 | |
| WO | WO 2006/128156 A2 | 11/2006 | |
| WO | WO 2006/136825 | 12/2006 | B65D 81/34 |
| WO | WO 2007/003864 A2 | 1/2007 | |
| WO | WO 2008/109448 A2 | 9/2008 | |
| WO | WO 2008/109448 A3 | 9/2008 | |
| WO | WO 2009/097030 A1 | 8/2009 | |
| WO | WO 2009/136038 A1 | 11/2009 | |

OTHER PUBLICATIONS

U.S. Appl. No. 29/346,148, filed Oct. 27, 2009 entitled Container Basket.

U.S. Appl. No. 29/364,804, filed Jun. 29, 2010 entitled "Container Assembly".

U.S. Appl. No. 29/364,807, filed Jun. 29, 2010 entitled "Container Basket".

Certified priority document in U.S. Appl. Serial. No. 12/012,403, filed Feb. 2, 2008 (filed in Int'l Application No. PCT/US2008/080874 on Nov. 3, 2008).

http://www.unclebens.de/produkte/heiss_auf_reis/heiss_auf reis_uebersicht.aspx, Mars Inc., 2006, 1 pg.

http://www.pastanmoresale.com, site accessed Jun. 15, 2010, 2 pgs. (now being sold at http://pastaboat.com).

Machine translation FR 2774262, Etimble et al., Aug. 1999, 9 pgs.

Docket Sheet for *Green* v. *ConAgra Foods*, Case # 8:08-cv-00200, 11 pgs.

*Green* v. *ConAgra Foods*, Case #8:08-cv-00200, Complaint for Patent Infringement and Injunctive Relief, filed May 5, 2008, 13 pgs.

(56) References Cited

OTHER PUBLICATIONS

*Green* v. *ConAgra Foods*, Case #8:08-cv-00200, Answer, Affirmative Defenses and Counterclaims of Defendant ConAgra Foods, Inc., filed, May 5, 2008, 12 pgs.
*Green* v. *ConAgra Foods*, Case #8:08-cv-00200, Answer to Counterclaims, filed May 5, 2008, 2 pgs.
*Green* v. *ConAgra Foods*, Case #8:08-cv-00200, Joint Claim Construction Chart, filed Sep. 24, 2008, 3 pgs.
*Green* v. *ConAgra Foods*, Case #8:08-cv-00200, Plaintiff's Opening Brief on Claim Construction, filed Oct. 10, 2008, 27 pgs.
*Green* v. *ConAgra Foods*, Case #8:08-cv-00200, Index of Evidence in Support of ConAgra Foods, Inc.'s Opening Markman Brief, filed Oct. 10, 2008, 105 pgs.
*Green* v. *ConAgra Foods*, Case #8:08-cv-00200, Plaintiff's Responsive Brief on Claim Construction, filed Oct. 31, 2008, 16 pgs.
*Green* v. *ConAgra Foods*, Case #8:08-cv-00200, Defendant ConAgra Foods, Inc.'s Brief in Response to Plaintiffs Opening Brief on Claim Construction, filed Oct. 31, 2008, 17 pgs.
*Green* v. *ConAgra Foods*, Case #8:08-cv-00200, Memorandum and Order, filed Jan. 9, 2009, 14 pgs.
*Green* v. *ConAgra Foods*, Case #8:08-cv-00200, Transcript of Markman Hearing Proceedings Before the Honorable Lyle E. Strom, filed Jan. 15, 2009, 76 pgs.
*Green* v. *ConAgra Foods*, Case #8:08-cv-00200, Joint Stipulation of Dismissal with Prejudice, filed Feb. 2, 2009, 3 pgs.
*Green* v. *ConAgra Foods*, Case #8:08-cv-00200, Order, filed Feb. 3, 2009, 1 pg.
*Green* v. *ConAgra Foods*, Case #8:08-cv-00200, Report on the Determination of an Action Regarding Patent, filed Feb. 4, 2009, 2 pg.
Invitation to Pay Additional Fees with Partial International Search mailed Jun. 25, 2008.
International Search Report dated Aug. 20, 2008, Application No. PCT/US2008/055512.
International Search Report dated Oct. 20, 2008, Application No. PCT/US2008/071917.
U.S. Official Action Mailed Sep. 18, 2008 in U.S. Appl. No. 11/424,520.
U.S. Official Action Mailed Apr. 24, 2009 in U.S. Appl. No. 11/286,008.
U.S. Official Action Mailed Apr. 30, 2009 in U.S. Appl. No. 11/424,520.
U.S. Official Action Mailed Oct. 16, 2009 in U.S. Appl. No. 11/903,732.
U.S. Official Action Mailed Oct. 29, 2009 in U.S. Appl. No. 11/890,297.
U.S. Official Action Mailed Nov. 12, 2009 in U.S. Appl. No. 11/286,008.
U.S. Official Action Mailed Nov. 25, 2009 in U.S. Appl. No. 11/424,520.
U.S. Official Action Mailed Mar. 10, 2010 in U.S. Appl. No. 11/903,732.
U.S. Official Action Mailed Mar. 29, 2010 in U.S. Appl. No. 29/351,253.
U.S. Official Action Mailed Apr. 14, 2010 in U.S. Appl. No. 11/424,520.
U.S. Official Action Mailed May 21, 2010 in U.S. Appl. No. 11/286,008.
International Search Report and Written Opinion mailed Jan. 12, 2009.
"Cafe Steamers," HealthyChoice.com, http://www.healthychoice.com/products/meals/cafe_steamers.jsp (Retrieved Aug. 2007).
"Ziploc® Containers With Snap'n'Seal Lids: Designed With You in Mind," brochure found at http://www.ziploc.com/food-storage-containers/, 2 pages (Retrieved Nov. 14, 2005).
"Ziploc® Containers With Snap'n'Seal Lids: Storage Made Simpler!," brochure found at http://www.ziploc.com/new_containers.html, 1 page (Retrieved Nov. 14, 2005).
Anchor Hocking '70 Catalog, p. 83, baking dishes at #4, 5 and 6 (Oct. 1970).
France, "Steam Cooking Apparatus," U.S. Appl. No. 60/728,468, filed Oct. 20, 2005.
McCallister, "Microwaveable Pasta Product," U.S. Appl. No. 09/965,300, filed Sep. 28, 2001.
Photographs of a food tray available from Inter Frost GmbH at a trade show in Germany, Oct. 2005.
European Office Action Mailed Jul. 15, 2010 in Application No. 08731136.1.
U.S. Official Action Mailed Dec. 11, 2008 in U.S. Appl. No. 11/286,008.
U.S. Official Action Mailed May 25, 2010 in U.S. Appl. No. 11/423,259.
U.S. Official Action Mailed Oct. 6, 2010 in U.S. Appl. No. 11/424,520.
U.S. Official Action Mailed Nov. 10, 2010 in U.S. Appl. No. 11/423,259.
U.S. Official Action Mailed Dec. 9, 2010 in U.S. Appl. No. 29/346,147.
U.S. Official Action Mailed Dec. 9, 2010 in U.S. Appl. No. 29/346,148.
U.S. Official Action Mailed Dec. 28, 2010 in U.S. Appl. No. 29/364,804.
U.S. Official Action Mailed Feb. 23, 2011 in U.S. Appl. No. 29/369,419.
U.S. Official Action Mailed Apr. 1, 2011 in U.S. Appl. No. 11/424,520.
U.S. Official Action Mailed Apr. 6, 2011 in U.S. Appl. No. 12/277,886.
U.S. Official Action Mailed Apr. 8, 2011 in U.S. Appl. No. 29/369,416.
U.S. Official Action Mailed Apr. 12, 2011 in U.S. Appl. No. 29/369,423.
Supp. International Search Report dated Mar. 15, 2011, Application No. PCT/CA2006/001894.
U.S. Official Action mailed Jul. 15, 2011, in U.S. Appl. No. 11/423,259.
European Search Report dated Jan. 27, 2011, in Application No. 08832921.4-1261.
U.S. Official Action dated Aug. 5, 2011, in U.S. Appl. No. 11/286,008.
U.S. Official Action dated Aug. 9, 2011, in U.S. Appl. No. 11/903,732.
European Allowance dated Jul. 18, 2011, in Application No. 10163678.5-2308.
U.S. Official Action mailed Aug. 19, 2011, in U.S. Appl. No. 11/424,520.
U.S. Official Action mailed Aug. 25, 2011, in U.S. Appl. No. 12/277,886.
U.S. Official Action mailed Nov. 7, 2011, in U.S. Appl. No. 11/890,297.
Starmaid Microwave Steamer Jun. 26, 2006, [on line], retrieved on Oct. 13, 2011. Retrieved from the Internet: URL:<http://www.flickr.com/photos/starmaid/5180282532/>.
Progressive International Mini Steamer (on line), Jul. 18, 2006. Retrieved from the Internet at the URL listed in the column immediately following this column: http://www.google.com/search?q=microwave+steamer&hi=en&biw=1291&bih=1015&sa=X&ei=0ZuXTiqGMKbt0gGMyoHWBA&ved=0CAkQpwIoBg&source=int&tbs=cdr%2Ccd_max%3A8%2F2%2F2007&tbm=#pq=microwave+steamer&hl=&en&sugexp=gsih&cp=12&gs_id=9&xhr=t&q=microwave+mini+steamer&pf=p&sclient=psy-ab&biw=1291&bih=1015&tbs=img:1%2Ccdr%3A1%2Ccd_max%3A8%2F2%2F2006&.
Mini Steamer—Progessive International / Starmaid vegetable steamer, [on line], retrieved Oct. 21, 2011. Retrieved from the Internet: URL:<http://www.campingcookwarepro.com/Progressive_International_Microwavable_Mini_Steamer>.
Tupperware India, Cook easy Microsteamer, The Hindu Business Line, [on line], Jun. 26, 2003, retrieved on Oct. 21, 2011. Retrieved from the Internet: URL:<http://www.thehindubusinessline.in/catalyst/2003/06/26/stories/2003062600070406.htm>.
Microwave mini steamer, Lunch in a Box, [on line]Feb. 12, 2007, retrieved on Oct. 13, 2011. Retrieved from the Internet: URL:<http://www.flickr.com/photos/24506652@N00/388209604/>.

(56) References Cited

OTHER PUBLICATIONS

Microwave steamer 2, Oct. 16, 2006, [on line]. Retrieved from the Internet: URL:<http://www.flickr.com/photos/momsinmind/271170248/>.
U.S. Notice of Allowance and Fees Due in U.S. Appl. No. 29/424,416.
U.S. Official Action mailed May 2, 2012, in U.S. Appl. No. 11/903,732.
U.S. Official Action mailed May 2, 2012, in U.S. Appl. No. 12/040,641.
U.S. Official Action mailed Sep. 24, 2012, in U.S. Appl. No. 12/471,114.
U.S. Official Action mailed Sep. 25, 2012, in U.S. Appl. No. 12/040,641.
Succinylated Monoglycerides; http://www.fao.org/ag/agn/jecfa-additives/specs/Monograph1/Additive-443.pdf; 1982; obtained Sep. 14, 2012.
U.S. Official Action mailed Sep. 10, 2012, in U.S. Appl. No. 11/903,732.
U.S. Official Action mailed Jul. 3, 2013, in U.S. Appl. No. 11/286,008.
U.S. Official Action mailed Aug. 21, 2013, in U.S. Appl. No. 11/890,297.
U.S. Official Action mailed Jan. 24, 2013, in U.S. Appl. No. 12/471,114.
Propylene Glycol Monostearate; *Hawley's Condensed Chemical Dictionary Thirteenth Edition*; 1997.
U.S. Official Action mailed Dec. 20, 2011 in U.S. Appl. No. 11/423,259.
U.S. Official Action mailed Jan. 19, 2012, in U.S. Appl. No. 11/286,008.
U.S. Official Action mailed Jan. 25, 2012, in U.S. Appl. No. 11/903,732.
U.S. Official Action mailed Mar. 26, 2012, in U.S. Appl. No. 11/424,520.
U.S. Official Action Mailed Jan. 16, 2014, in U.S. Appl. No. 12/277,886.
U.S. Official Action Mailed Jan. 16, 2014, in U.S. Appl. No. 11/286,008.
U.S. Official Action Mailed Jan. 22, 2014, in U.S. Appl. No. 12/471,114.
U.S. Official Action Mailed Jan. 29, 2014, in U.S. Appl. No. 12/040,641.
U.S. Official Action mailed Sep. 27, 2013, in U.S. Appl. No. 11/423,259.
U.S. Official Action mailed Sep. 19, 2013, in U.S. Appl. No. 12/471,114.
International Search Report mailed Dec. 4, 2013 in Application No. PCT/US2013/044064.
U.S. Official Action Mailed Mar. 21, 2014, in U.S. Appl. No. 11/703,066.
U.S. Official Action Mailed Apr. 14, 2014, in U.S. Appl. No. 11/423,259.
U.S. Official Action Mailed Apr. 21, 2014, in U.S. Appl. No. 11/424,520.
U.S. Official Action Mailed Jun. 16, 2014, in U.S. Appl. No. 12/277,886.

\* cited by examiner

COOKING METHOD AND APPARATUS

CROSS-REFERENCE TO RELATED APPLICATIONS

Application Ser. No. 11/703,066 is a continuation-in-part of U.S. patent application Ser. No. 11/423,259, filed Jun. 9, 2006, entitled "STEAM COOKING APPARATUS," now pending. U.S. patent application Ser. No. 11/423,259 claims the benefit under 35 U.S.C. §119(e) of U.S. Provisional Application Ser. No. 60/728,468, filed Oct. 20, 2005, entitled "STEAM COOKING PACKAGING." The present application herein incorporates U.S. patent application Ser. Nos. 11/703,066 and 11/423,259 and U.S. Provisional Application Ser. No. 60/728,468 by reference in their entirety.

FIELD OF THE INVENTION

The present invention generally relates to the field of frozen food products, and more particularly to an apparatus for storing and preparing food.

BACKGROUND OF THE INVENTION

As contemporary society progresses, people spend less time preparing and consuming meals. Fast food provides one option for those who want their meal in a short time ready for consumption; however, many people no longer desire fast food or can not eat it, due to its lack of nutrition and in particular, its high calorie, salt, and fat content.

Prepared foods, such as those appearing in supermarkets, take-out establishments, and the like, while appearing to be home cooked, are typically expensive. Additionally, like fast food, these prepared foods lack nutritional value, and are usually high in calories, salt, and fat. Accordingly, both fast food and prepared foods do not appeal to health conscious consumers.

Health conscious consumers have found some suitability in frozen meals and prepackaged meals, such as those that can be heated in a microwave oven; however, these frozen meals typically mix together all of their contents. Accordingly, when cooked or reheated, some of the contents may be undercooked, while some of the contents may be overcooked. Similarly, room temperature prepackaged meals may suffer partial degradation and discoloration of the components while in storage, and when heated in a microwave oven, the components may also cook unevenly.

To address some of the problems of intermixed frozen meals, a food container for use in a microwave with an internal separator dividing the container into upper and lower compartments was developed. The upper compartment is configured for a food product and the lower for a water or water-containing medium. The separator is a thin perforated sheet that is designed to snap into place with evenly spaced internal lugs. When the food container is placed in the microwave and heated the steam created by the water medium passes through the separator to steam the product. The problem with this food container is that the separator is configured to latch into place for use with the container, thereby inhibiting the availability of the water-containing medium after the food product is steamed.

Therefore a need still exists for an ovenable cooking apparatus that facilitates improved cooking of a food product in microwave ovens, conventional ovens, combination ovens and all other typical cooking apparatuses which separates the food product from the sauce or liquid and allows the consumer to easily access the food product and sauce after cooking.

There exists a similar need for improvements in the food service industry. The food service industry currently prepares food in commercial settings using foodservice tray pans that include a mixture of food ingredients. Typically, the food comprises a frozen mass of ingredients such as starch, protein, vegetables, and sauce. To prepare and serve the food, the frozen foodservice tray is heated in an oven, commercial oven, convection oven, combination oven, microwave oven, steam cooker, or the like. Because the food ingredients are frozen in a large mass, the heating times can be from one to two hours or more. The quality of the food using this method may sometimes be undesirable, resulting in overcooked or undercooked ingredients, variation in food texture, or discoloration of the food ingredients. Further, consumers cannot plate their meals according to their individual tastes because all the ingredients are mixed together. The current method is also incompatible with breaded ingredients because they come out soggy and do not meet consumer approval.

Accordingly, it would be desirable to provide a method and apparatus for preparing food in the commercial food sector that is more efficient and produces higher quality food products.

SUMMARY OF THE INVENTION

The present invention improves on the contemporary art by providing an ovenable cooking apparatus for any typical cooking apparatus (including but not limited to microwave ovens, combination ovens, conventional ovens, steamers, and the like) that has separate compartments for different foods or food components. These separate compartments are such that food components are kept separate during storage, prior to cooking or heating, (cooking and heating hereinafter, referred to collectively as "cooking", and all variations thereof), as well as during cooking. This arrangement prevents unwanted mixing of the food components. As a result, the food components in the second or upper compartment maintain their integrity and do not degrade or discolor as a result of having contacted the food components in the first or tower compartment. Accordingly, the invention is operable with sauces or liquids in one compartment, separate from components such as proteins and/or starches, in a separate compartment.

These separate compartments also facilitate cooking of the proteins and/or starches in a second or upper compartment with the steam generated by heating the sauce or liquid food component in the first or lower compartment when the upper compartment is perforated. By separating the proteins and/or starches from the sauce, the food product remains crispier and develops a mouth feet similar to traditionally steamed proteins and/or starches. When using a solid upper compartment it allows the cooking, browning, and crisping of breaded items white cooking the sauce at the same time. In addition, as the food components in each of the compartments cook simultaneously, they are ready for consumption in a shorter time than had the meat been prepared in a non-microwave oven, or the food components were prepared separately.

Additionally, the compartments are designed such after the product is cooked, the upper compartment can be easily removed from the lower compartment. As such, the consumer may eat the steamed starch and/or protein product, of the upper compartment, by itself or may choose to add the heated sauce, of the lower compartment, onto the steamed starch and/or protein.

The ovenable cooking apparatus includes upper and lower compartments for food components. These compartments are arranged such that the food component in the upper compartment may be cooked by steaming when the upper compartment is perforated. The steam is generated upon heating the food component in the lower compartment until at least a portion of the food component boils. The generated steam then enters the upper compartment through openings in the base and side walls of the upper compartment. Food components cooked by steam are typically healthier, and typically include, starches and proteins, such as rice, vegetables, shrimp, meat, and the like. Accordingly, the apparatus is suitable for storing and cooking healthy and nutritious meals. Depending on the materials of construction these meals may be cooked in a microwave oven in a short time, as compared to preparing the same meal conventionally. These meals may also be cooked in a conventional oven, combination oven, steam cooker, or other common cooking apparatus. When the upper compartment is perforated the food product is cooked with steam improvements, when the upper compartment is solid the food products re baked.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1A:
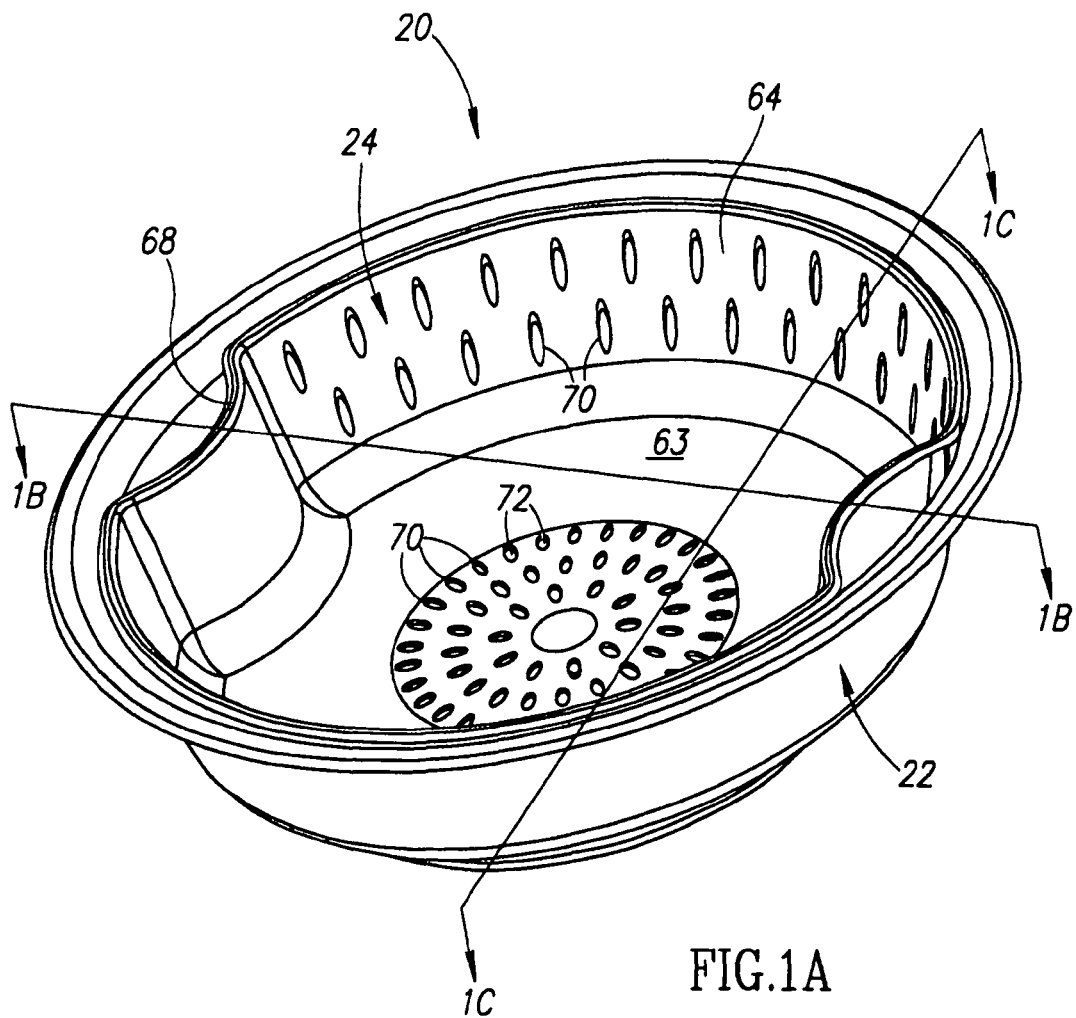
FIG. 1A is a perspective view of a cooking apparatus in accordance with a first embodiment of the present invention.

Reference will now be made in detail to the presently preferred embodiments of the invention, examples of which are illustrated in the accompanying drawings.

The present invention relates to an ovenable cooking or heating (cooking and heating, and variations thereof, collectively known as "cooking", as detailed above) apparatus, for use with conventional, convection, combination, or microwave ovens. The apparatus has separate compartments for different foods or food components, such that the separateness and integrity of each food type is maintained from processing (filling and packaging) through storage and cooking. In particular, the second or upper compartment is received by the first or lower compartment such that after the food product is heated, the compartments may be easily separated. The apparatus may also include a sheet of barrier material sealing the combined compartments and food products.

As the apparatus is heated, at least a portion of the first food component in the first or lower compartment boils producing steam. The steam is utilized to cook the second food component in the upper compartment. In one embodiment, the second compartment is steam impermeable. In another embodiment, the steam rises into the second or upper compartment thereby steam cooking the second food component. The second or upper compartment includes a plurality of openings 238 that allow the steam to pass from the first and lower compartment into the second or upper compartment. The sheet of barrier material ensures that the food product is cooked uniformly by preventing the steam from escaping the compartments or dissipating into the atmosphere during cooking. Although, the apparatus is designed such that the foods or food components in each of the compartments cook simultaneously, as the compartments are easily separated, the consumer may choose to consume the steamed second food product by itself or in combination with the first food component.

Throughout this document there are references to directions and positions. These directional and positional references are to the apparatus of the invention in typical orientations. The references include, for example, upper, lower, top, bottom, above, below, and are exemplary only. They are not limiting in any way, as they are for description and explanation purposes.

FIGS. 1A-3C show an apparatus 20 in accordance with an embodiment of the invention. The apparatus 20 is designed for holding separate food components to maintain the separateness and integrity of the components during storage and cooking. The food components may be combined after cooking by the user. Apparatus 20 may be of any general shape without departing from the scope of the invention. Suitable shapes include circular, oval, rectangular, square, among others. As shown in FIGS. 1A-3C, the apparatus 20 may be of circular shape. The apparatus 20 includes a container 22 and a basket 24, that are separate pieces, with the basket 24 constructed to be received by the container 22.

The container 22 holds a first food component, such as, liquids, gels, partially liquid or gelatinous mixtures, and mixtures thereof. Examples of the first food component include a sauce, gravy, water, and meat and/or vegetables in a sauce or gravy. The basket 24, is received and held by the container 22, and is in coaxial alignment with the container 22. The basket 24 typically holds a solid food component, such as starches and/or proteins, such as rice, grains, and pasta, vegetables, or other particulate foods, that are typically steam cooked. Accordingly, the basket 24 includes openings 70 in its base 63 and its sidewalls 64, that allow steam, generated by the cooking of the first component, to enter the basket 24, and cook the second food component. The openings 70 are also dimensioned to allow liquids, such as water and the like, generated in the upper compartment during cooking, to drain into the container 22.

Figure 2A:
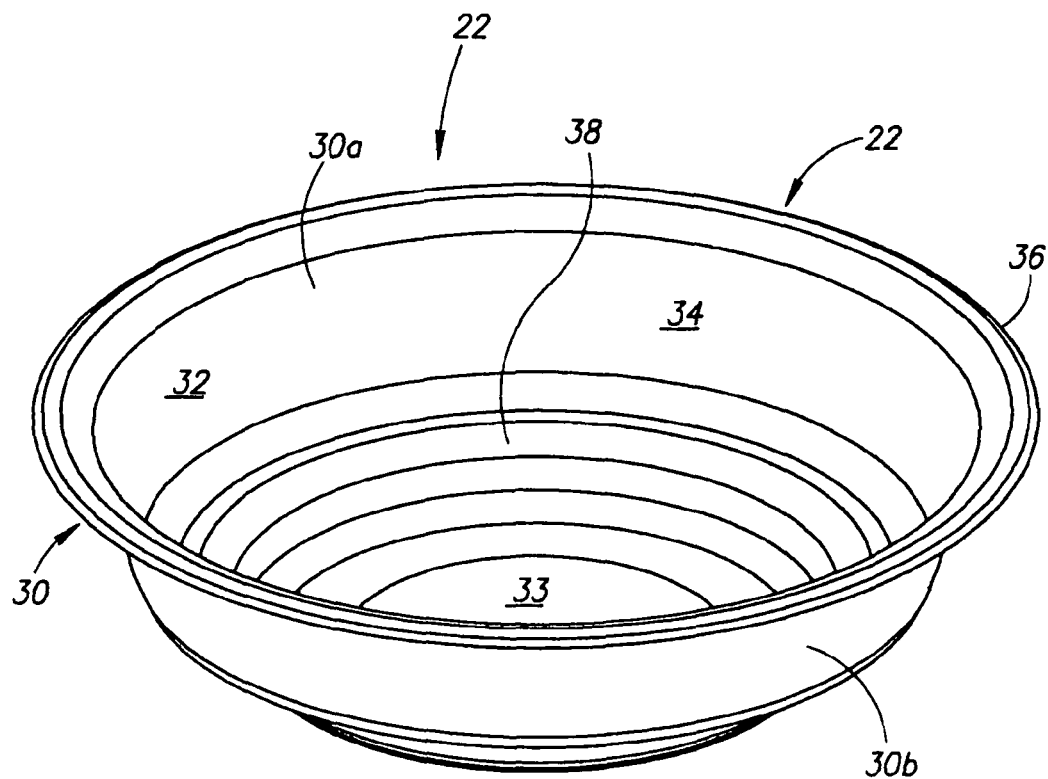
FIG. 2A is a perspective view of the container of the cooking apparatus of FIG. 1A.
Figure 2B:
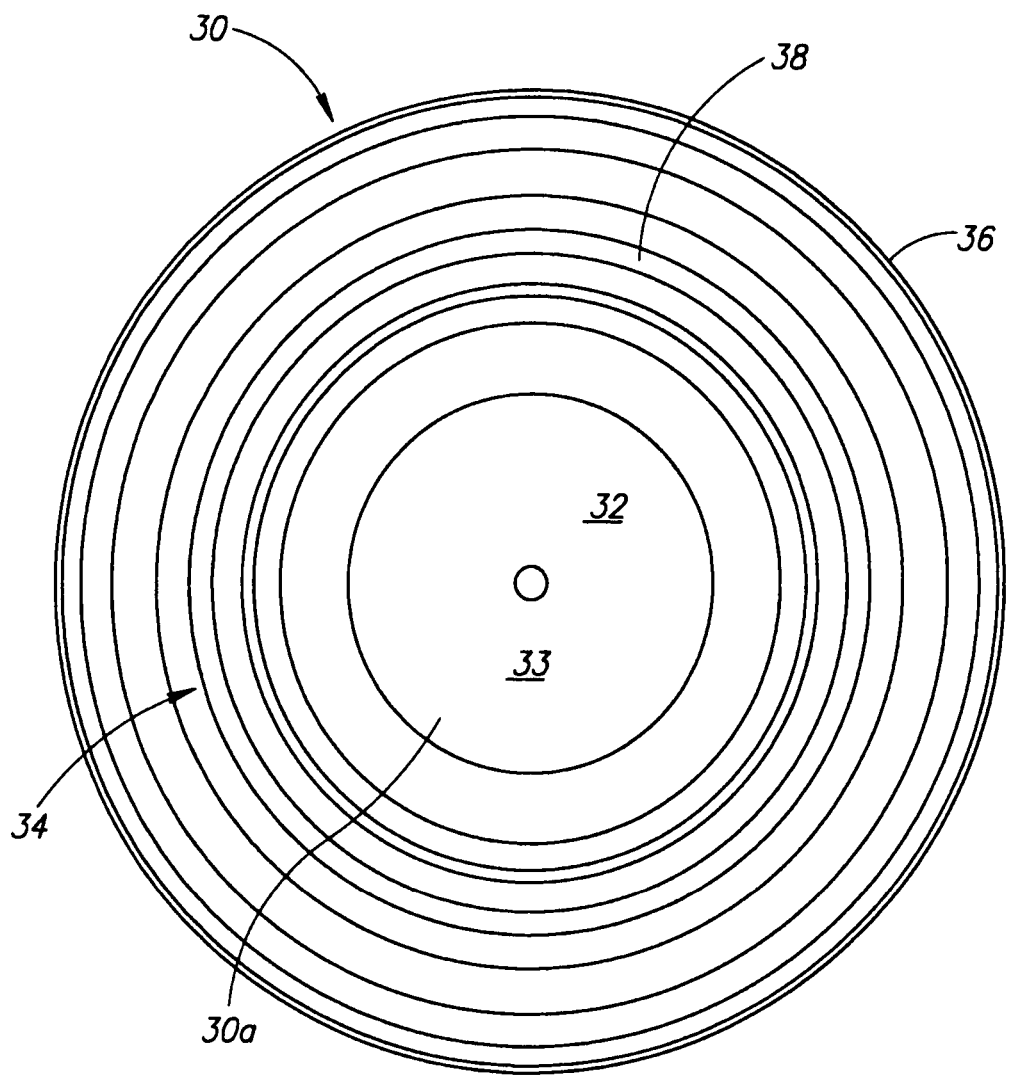
FIG. 2B is a top view of the container of the cooking apparatus of FIG. 1A.
Figure 2C:
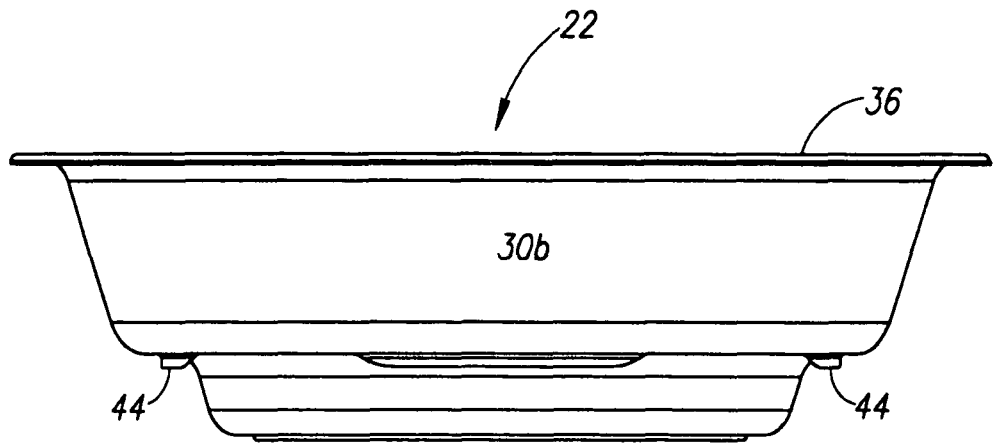
FIG. 2C is a side view of the container of the cooking apparatus of FIG. 1A.

As shown in detail in FIGS. 2A-2C, the container 22 includes a body 30 that is, for example, circular in shape. The body 30 includes an inner side 30*a*, and an outer side 30*b*. The body 30 includes a cavity 32, defining the inner side 30*a* of the body, a base 33, and sidewalls 34. The body 30 is suitable for holding a first food component and receiving the basket 24 in a secure manner.

Figure 1B:
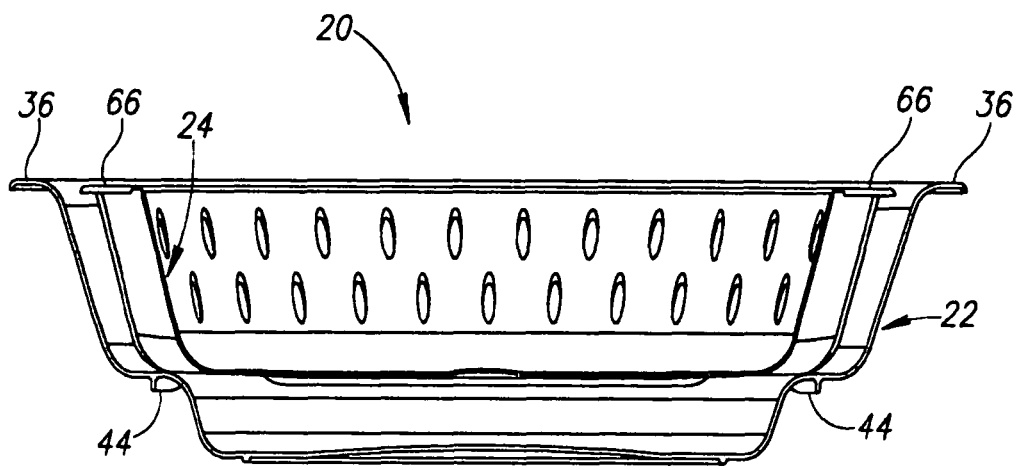
FIGS. 1B and 1C are side cross-sectional views of the cooking apparatus of FIG. 1A, taken along lines 1B-1B and 1C-1C, respectively.
Figure 1C:
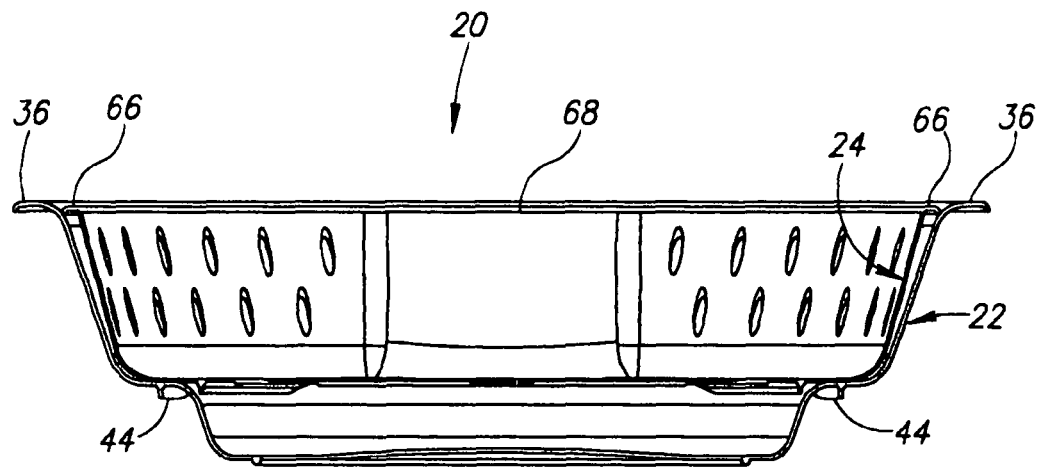

The container's 22 sidewalls 34 include a shelf portion 38 within its cavity 32. The shelf portion 38 extends along the sidewall 34 and is typically continuous. The sidewalls 34 typically include at least a portion that tapers outwardly, with the entire sidewall 34 typically tapering outwardly from the base 33 to a rim 36, at the opening of cavity 32. The shelf portion 38 provides support for the basket 24 and ensures that the base 63 of the basket 24 is not in direct contact with the base 33 of the container 22 (as shown in FIGS. 1B and 1C). The shelf portion 38 coupled with the sidewalls 34 allow for the basket 24 to be removably received in the container 22 in a secure manner, with minimal movement or play. Alternatively, the container's 22 sidewall 34 may include at least one ledge or protrusion rather than a shelf portion 38 to provide support for the basket 34. Optionally multiple edges or protrusions may be included to support the basket 34.

As shown in FIG. 2C, the outer side 30*b* of the body 30, may include protrusion segments 44. These protrusion segments 44 allow for ease in manually gripping the apparatus 20.

Figure 3A:
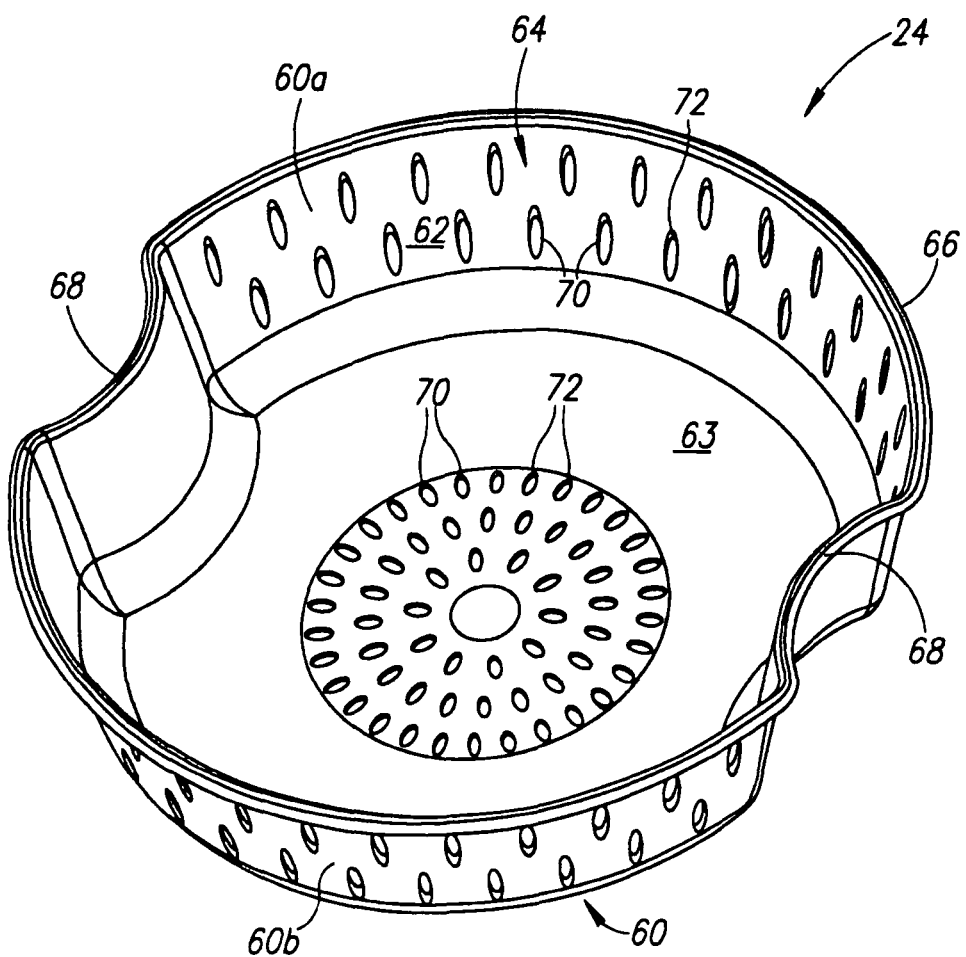
FIG. 3A is a perspective view of the basket of the cooking apparatus of FIG. 1A.
Figure 3B:
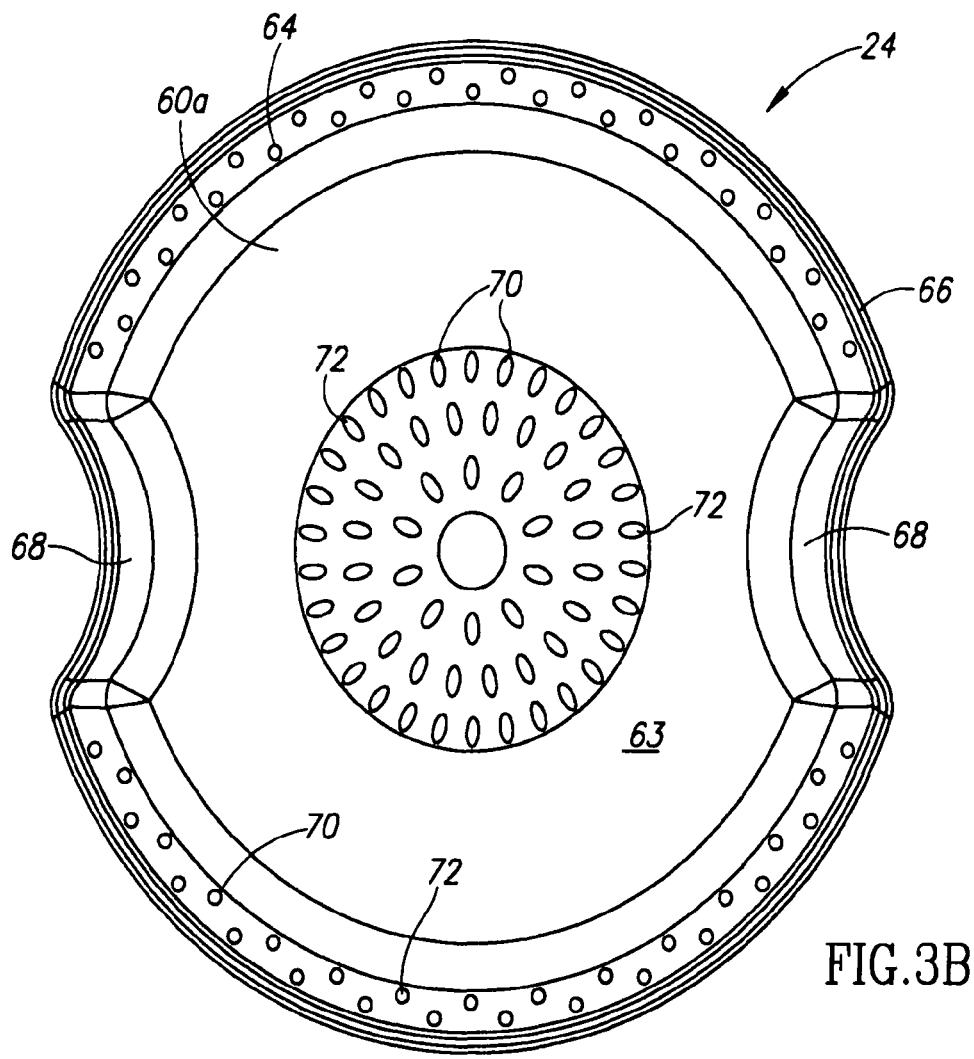
FIG. 3B is a top view of the basket of the cooking apparatus of FIG. 1A.
Figure 3C:
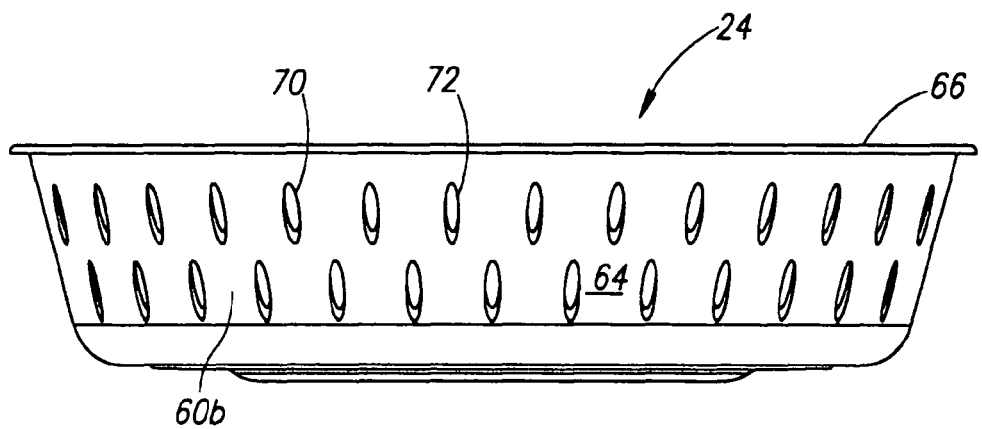
FIG. 3C is a side view of the basket of the cooking apparatus of FIG. 1A.

As shown in detail in FIGS. 3A-3C, the basket 24 includes a body 60 that is, for example, substantially circular in shape, to conform to the shape of the container 22. The body 60 includes an inner side 60*a*, and an outer side 60*b*. The body 60 includes a cavity 62, defining the inner side 60*a*, a base 63, and sidewalls 64. The body 60 is suitable for holding a second food component.

The sidewalls 64 typically include at least a portion that tapers outward, with the entire sidewall 64 typically tapering outward from the base 63, to a rim 66, at the opening of the cavity 62. The sidewalls 64 and rim 66 typically include arcs 68, that are typically rounded inward, into the cavity 62. The arcs 68, are approximately oppositely disposed with respect to each other, and when the basket 24 sits in the container 22, serve as vents for steam, generated in the cavity 32 of the container 22 during cooking. The arcs 68 also provide sufficient portions for manually gripping the basket 24, for its removal from the container 22.

The basket 24 includes a plurality of openings 70. The openings 70 are perforations or bores 72 that extend through the base 63 and through the sidewalls 64. The bores 72 may be of any size or dimension so as to allow steam to pass from the cavity 32 of the container 22 into the basket 24, in order to steam heat (or steam cook) the contents (e.g., the second food component) stored in the cavity 62 of the basket 24, as well as allowing liquid (typically water) to pass from the basket 24 into the container 22. Moreover, the openings 70 are also dimensioned to keep particulate foods, such as rice and the like, including particles thereof, from dropping out of the basket 24 and into the cavity 32 of the container 22. Suitable bore shapes include small, circular, rounded, or oval cylindrical bores, but are not limited thereto.

The openings 70 at the base 63 and sidewalls 64 may be arranged in any desired pattern, provided sufficient amounts of steam are able to reach the basket 24 and there are sufficient openings 70 to allow for the passage of liquid from the basket 24 to the container 22. For example, the openings 70 at the base 63 may be arranged in a series of concentric circles. The openings 70 at the sidewalls 64 may be arranged in a line. Typically, one or more lines of openings 70 may be included in the sidewalls 64 of the basket 24. If a second line of openings 70 is arranged at the sidewalls 64, the second line of openings 70 may be offset with the first line of openings, such that the cylindrical bores 72 of the second line are not directly below the cylindrical bores 72 of the first line.

The body 60, is constructed, such that when the basket 24 is removably received by the container 22, there is sufficient space in the cavity 32 of the container 22, between the base 33 of the container 22 and the base 63 of the basket 24, to accommodate a first food component in both dry or frozen (storage) and cooking (heated) states, without disrupting the seating of the basket 24 in the container 22. Additionally, the body 60 is such that the basket 24 is adequately supported in the container, for example, by the shelf portions 38 (FIG. 1C) and the indent 46 of the rim 36, in order that it hold the second food component, without substantial bending and without allowing the first and second food components to contact one another during storage, prior to the cooking process, or during the cooking process.

Figure 4A:
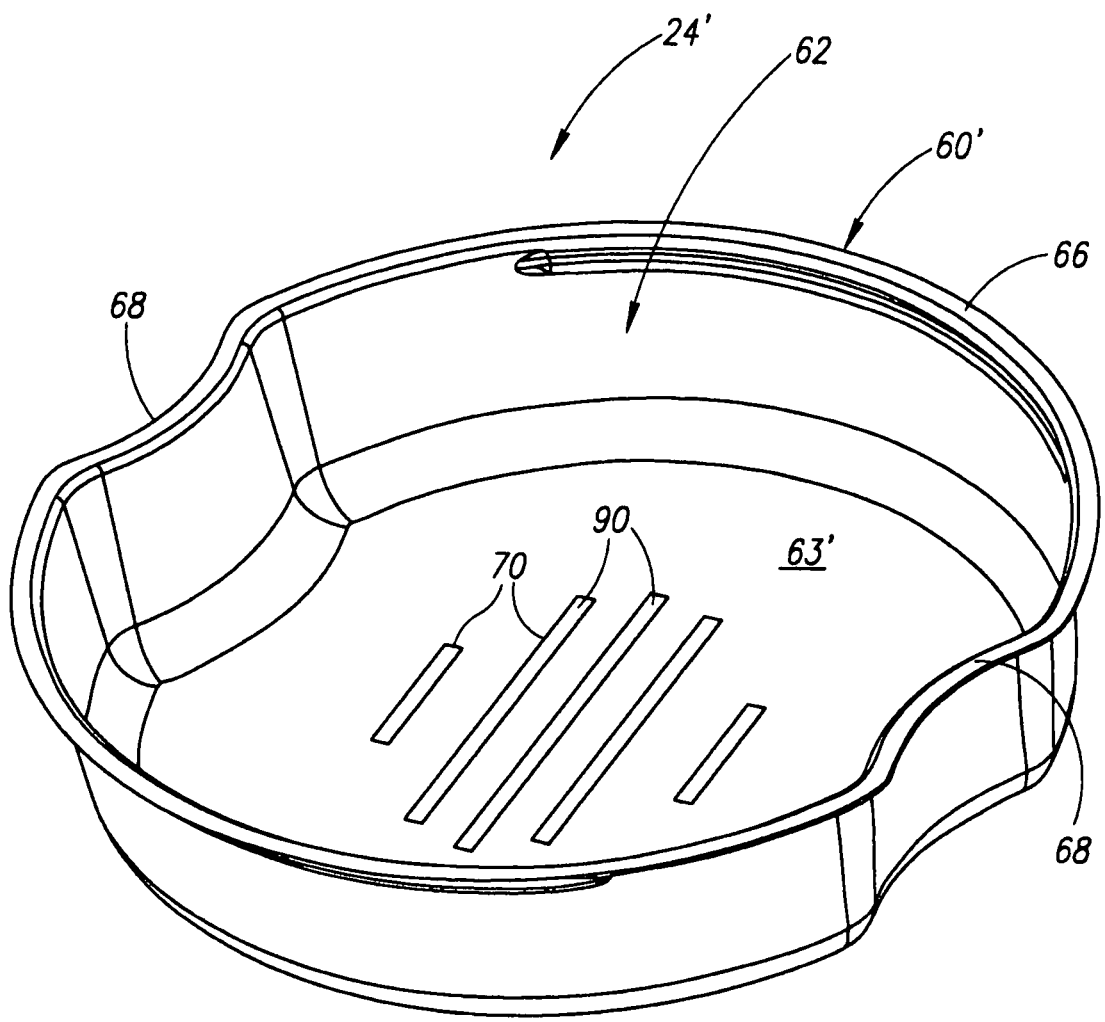
FIG. 4A is a perspective view of an alternate embodiment of the basket of the cooking apparatus of FIG. 1A.
Figure 4B:
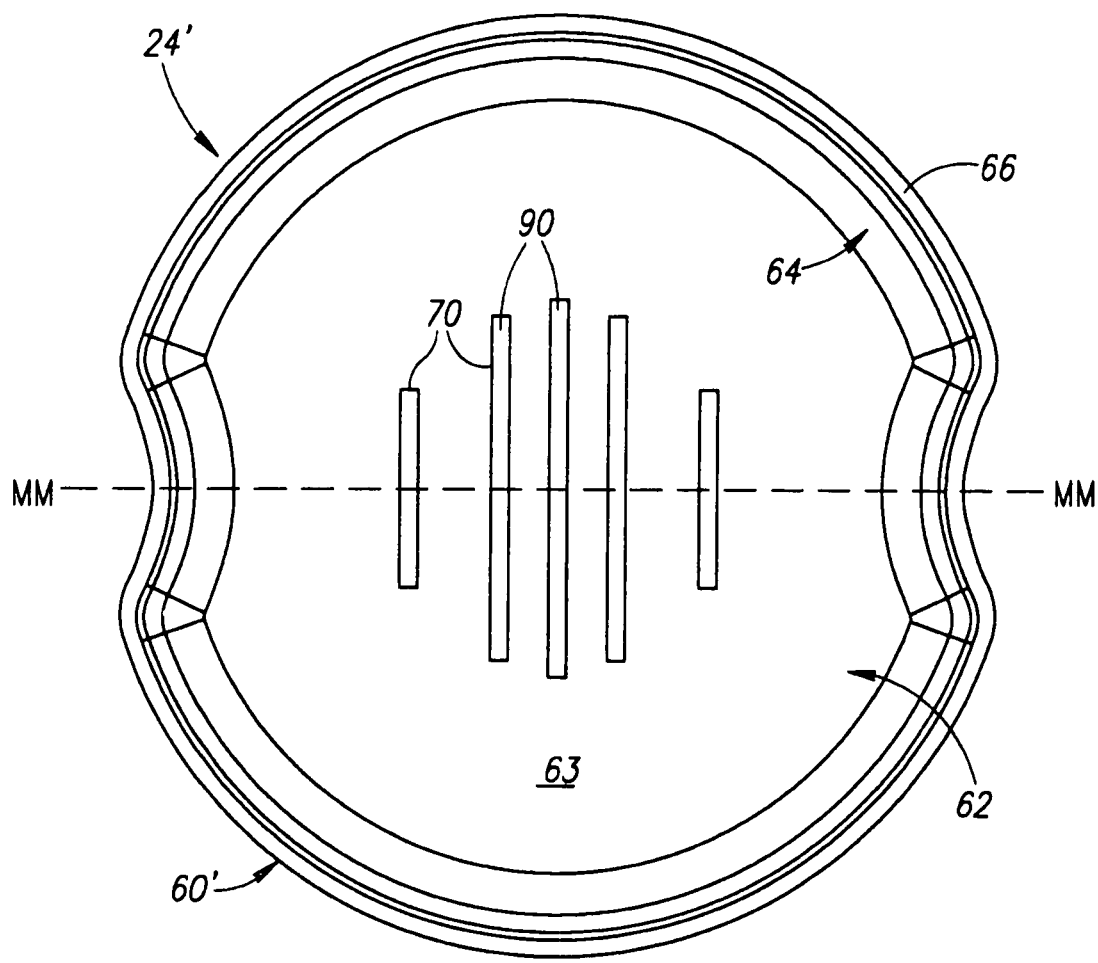
FIG. 4B is a top view of an alternate embodiment of the basket of the cooking apparatus of FIG. 1A.
Figure 4C:
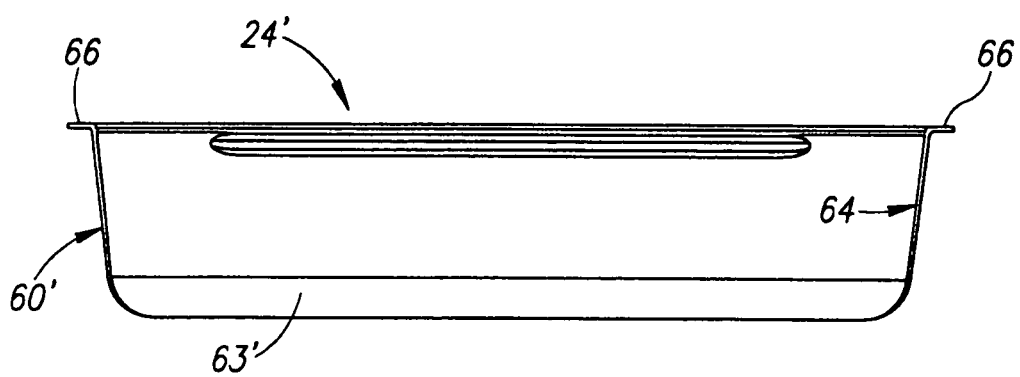
FIG. 4C is a side view of an alternate embodiment of the basket of the cooking apparatus of FIG. 1A.

FIGS. 4A-4C show an alternate basket 24', similar in all aspects of construction and dimensions to the basket 24. Accordingly similar components, as detailed above, are numbered the same as above. Changed or different components are detailed below.

The basket 24', like basket 24, is substantially circular in shape, and designed to sit in the container 22, as detailed above. The basket 24' differs from basket 24, in that the openings 70 may be slits 90, rather than circular, rounded, or oval cylindrical bores 72 as in basket 24. Like the cylindrical bores 72, the slits 90 are dimensioned to facilitate the passage of steam, generated by cooking of the first food component, to enter the basket 24'. The dimensioning of the slits 90 also facilitates the passage of liquid, for example, water, from the basket 24' to the container 22. This dimensioning keeps particulate foods, such as rice and the like, including particles thereof, from dropping out of the basket 24' and into the cavity 32 of the container 22.

The slits 90 are typically rectangular in shape, and extend through the base 63'. They are typically arranged in a parallel alignment with respect to each other. The slits 90 are typically oriented perpendicular to the longitudinal axis MM of the base 63'. Alternatively, the slits 90 may also be oriented parallel to the longitudinal axis MM of the base 63'.

FIGS. 5A-9C show an alternate embodiment of the apparatus of the present invention. Apparatus 120 is of similar constructions and materials to apparatus 20 detailed above. Components in apparatus 120, that are similar to those in apparatus 20, FIGS. 1A-3C, are numbered so as to be increased by "100." The components increased by "100" that are not described below, function similarly to the corresponding components for apparatus 20. Different components, including components that function differently, are described below.

Figure 5A:
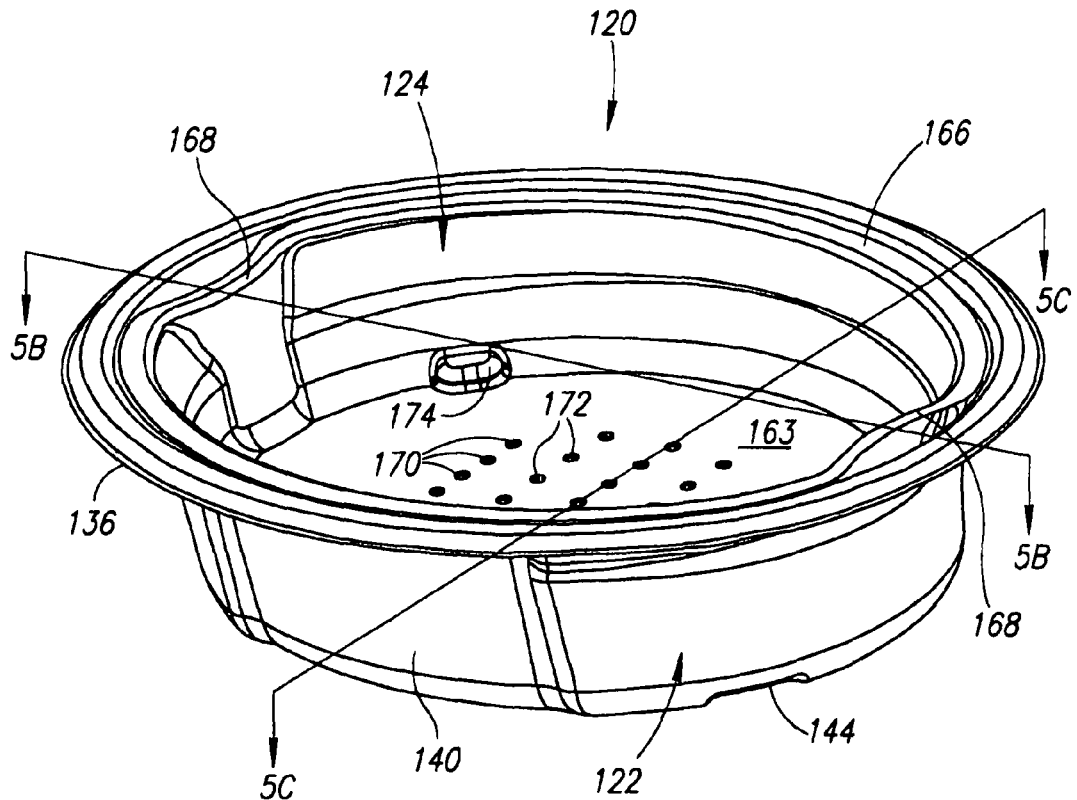
FIG. 5A is a perspective view of a cooking apparatus in accordance with an alternate embodiment of the present invention.

As stated above, the apparatus of the present invention may be of any desired shape. As shown in FIG. 5A, the apparatus 120 is such that it is of an oval shape. The apparatus 120 is formed of a container 122, that is oval in shape, and a basket 124, for sitting in the container 122, in a secure manner, as detailed above, for the container 22 and basket 24, 24' of apparatus 20.

Figure 5B:
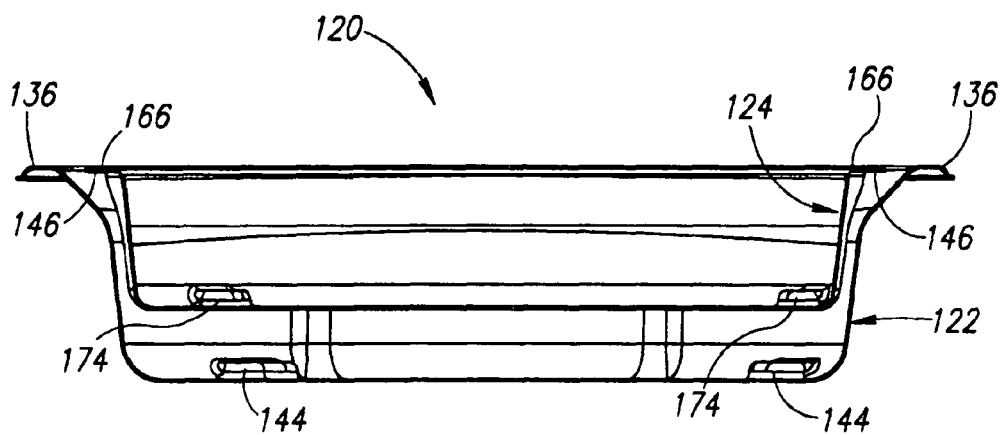
FIGS. 5B and 5C are side cross-sectional views of the cooking apparatus of FIG. 5A, taken along lines 5B-5B and 5C-5C, respectively.
Figure 5C:
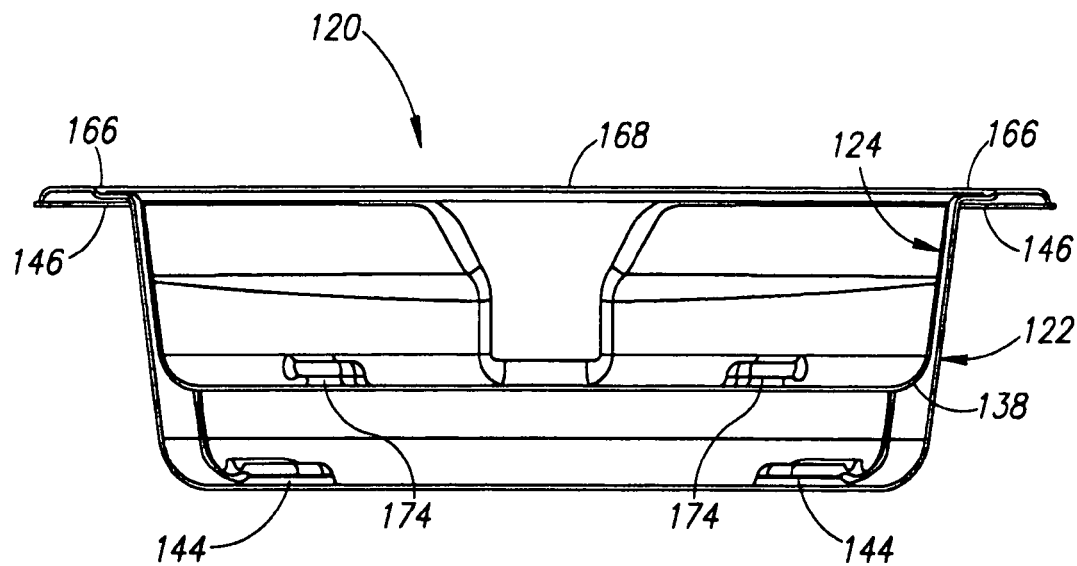
Figure 6A:
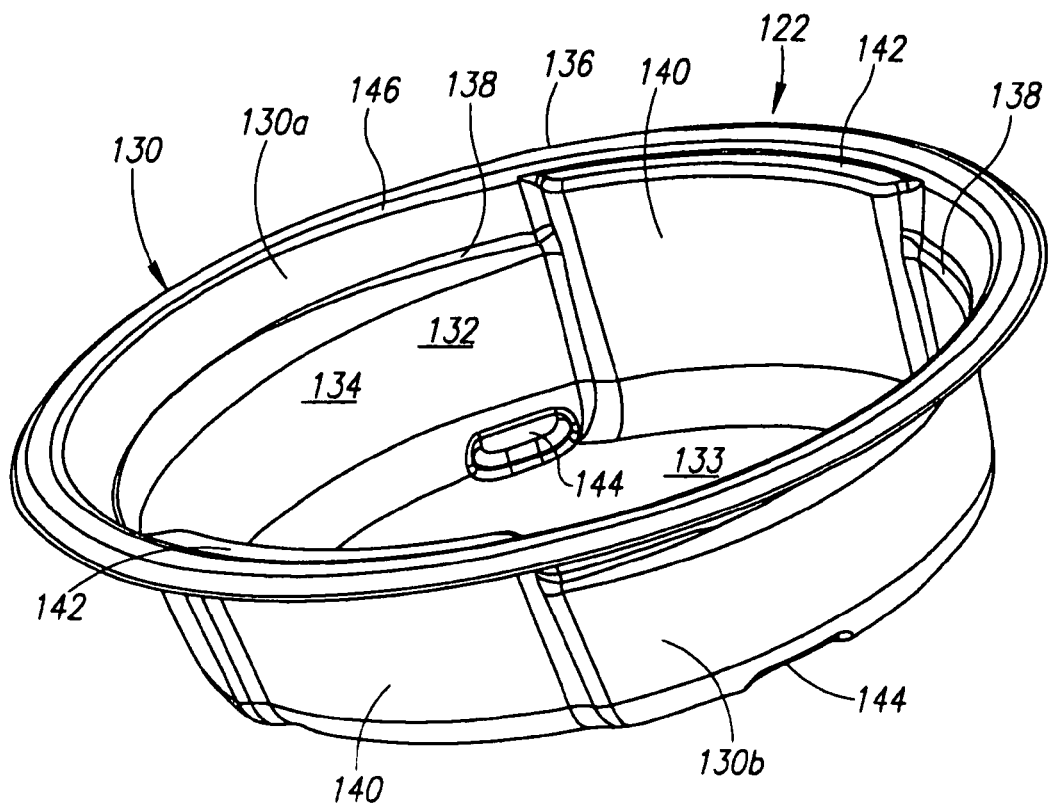
FIG. 6A is a perspective view of the container of the cooking apparatus of FIG. 5A.
Figure 6B:
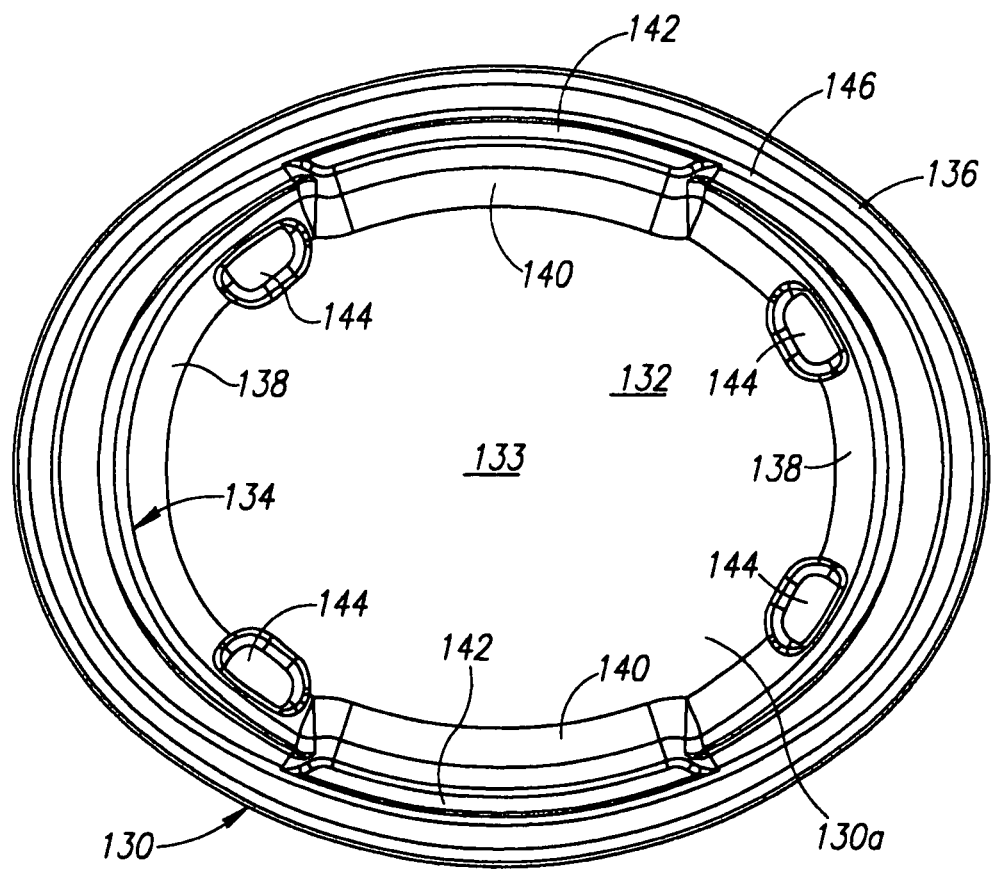
FIG. 6B is a top view of the container of the cooking apparatus of FIG. 5A.
Figure 6C:
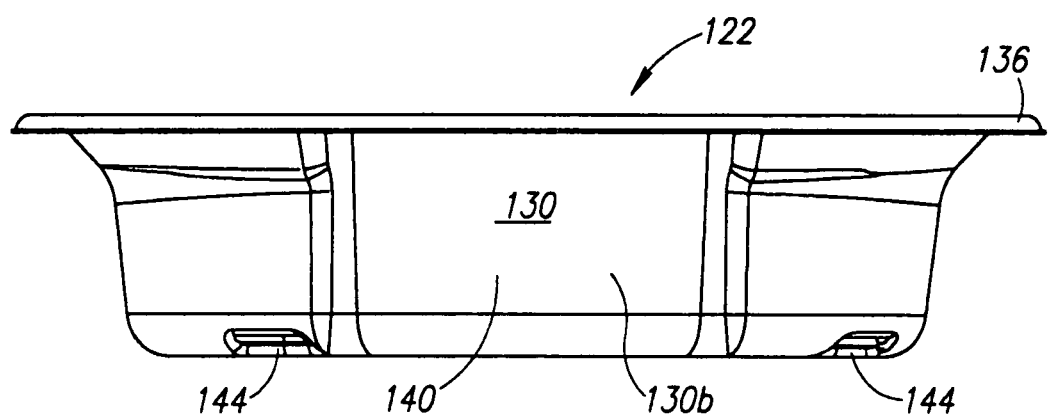
FIG. 6C is a side view of the container of the cooking apparatus of FIG. 5A.

As shown in FIGS. 6A-6C, the container 122 includes shelf portions 138, at an intermediate height along the sidewalls 134 that are typically discontinuous from each other. Dividing portions 140, that extend inward into the cavity 132, separate the shelf portions 138 from each other. The dividing portions 140 extend from the base 133 to ledges 142, proximate to the rim 136. The shelf portions 138 and the dividing portions 140 are typically symmetric and oppositely disposed with respect to each other. The shelf portions 138 provide support for the basket 124 (as shown in FIGS. 5B and 5C).

The dividing portions 140 are such that they provide rigidity to the container 122. The rim 136 of the container 122 also includes an indent 146, similar to the indent 46, along the inner periphery of the rim 136. The rim serves in maintaining a secure fit of the basket 124 in the container 122.

Figure 7A:
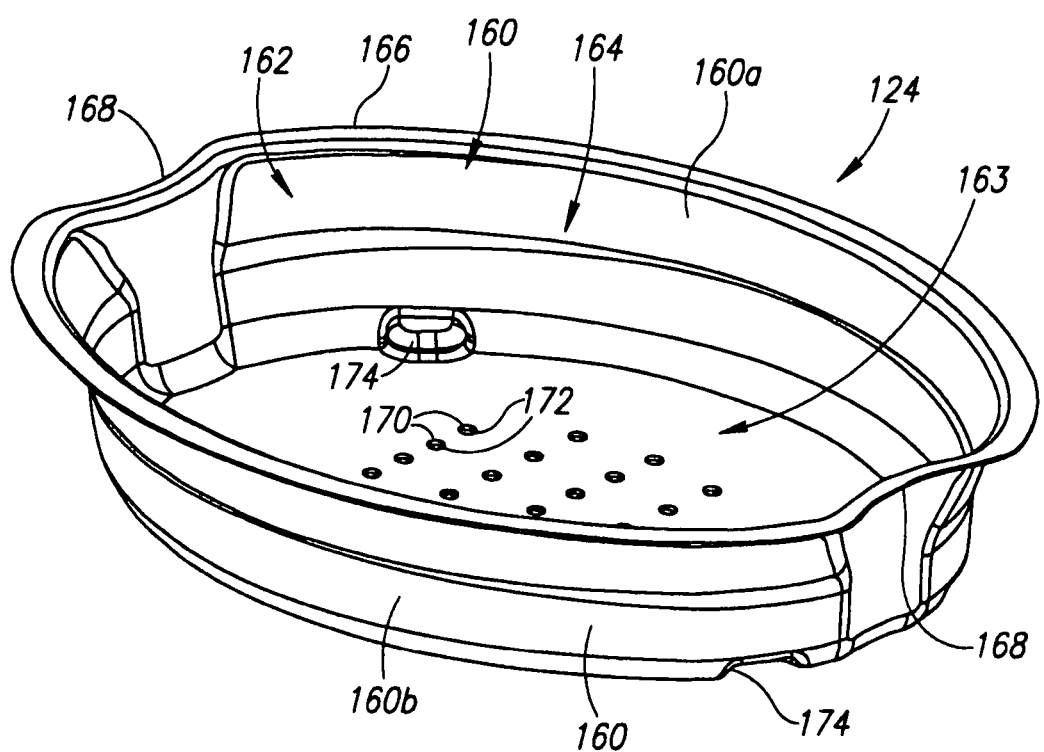
FIG. 7A is a perspective view of the basket of the cooking apparatus of FIG. 5A.
Figure 7B:
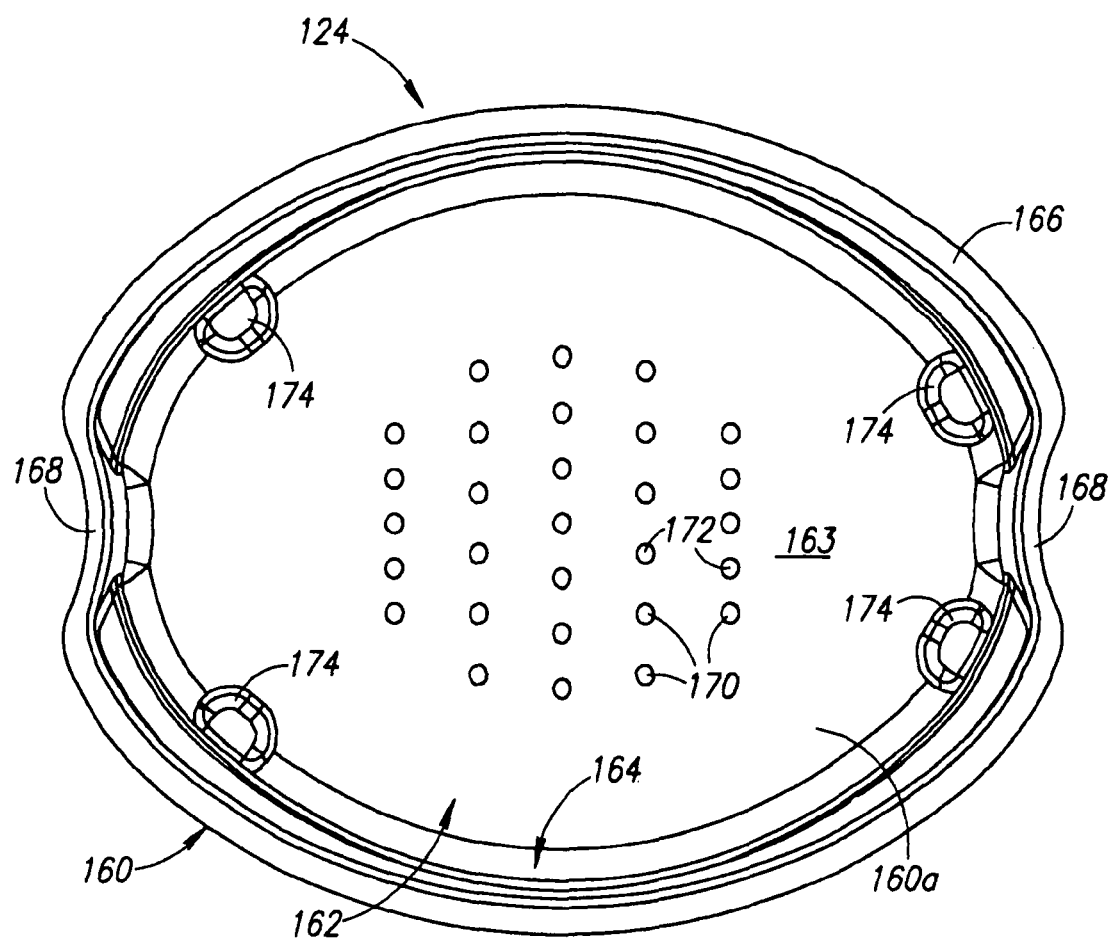
FIG. 7B is a top view of the basket of the cooking apparatus of FIG. 5A.
Figure 7C:
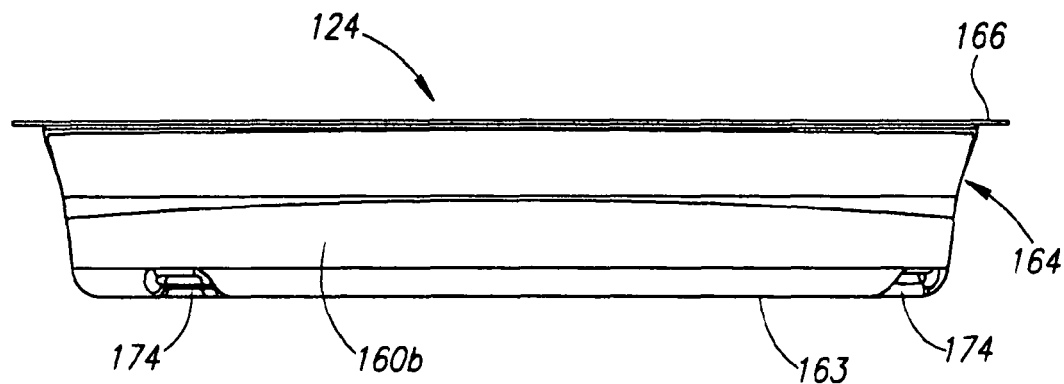
FIG. 7C is a side view of the basket of the cooking apparatus of FIG. 5A.

As shown in FIGS. 7A-7C, the basket 124 is of a substantial oval shape, but includes arcs 168, similar to the arcs 68, to allow for venting of steam as well as ease of gripping, by fingers. The basket 124 includes openings 170 of cylindrical bores 172, arranged for example in lines. The cylindrical bores 172 may also be staggered. Alternatively, other arrangement of the openings 170 are also permissible, such as concentric circles. The openings 170 (formed of cylindrical bores 172) function similarly to the openings 70 (formed of cylindrical bores 72) of the basket 24, as detailed above.

The outer side 160b of the body 160, may include protrusion segments 174. These protrusion segments 174 allow for ease of use in manually gripping the basket 124.

Figure 8A:
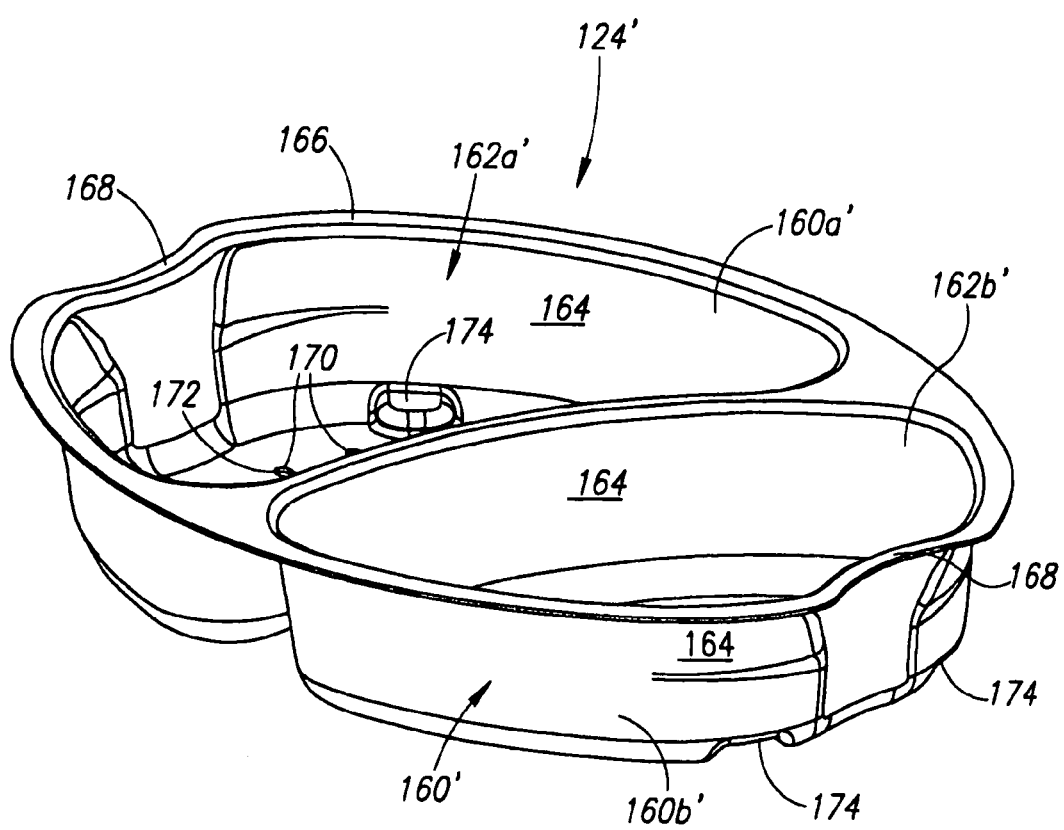
FIG. 8A is a perspective view of an alternate embodiment of the basket of the cooking apparatus of FIG. 5A.
Figure 8B:
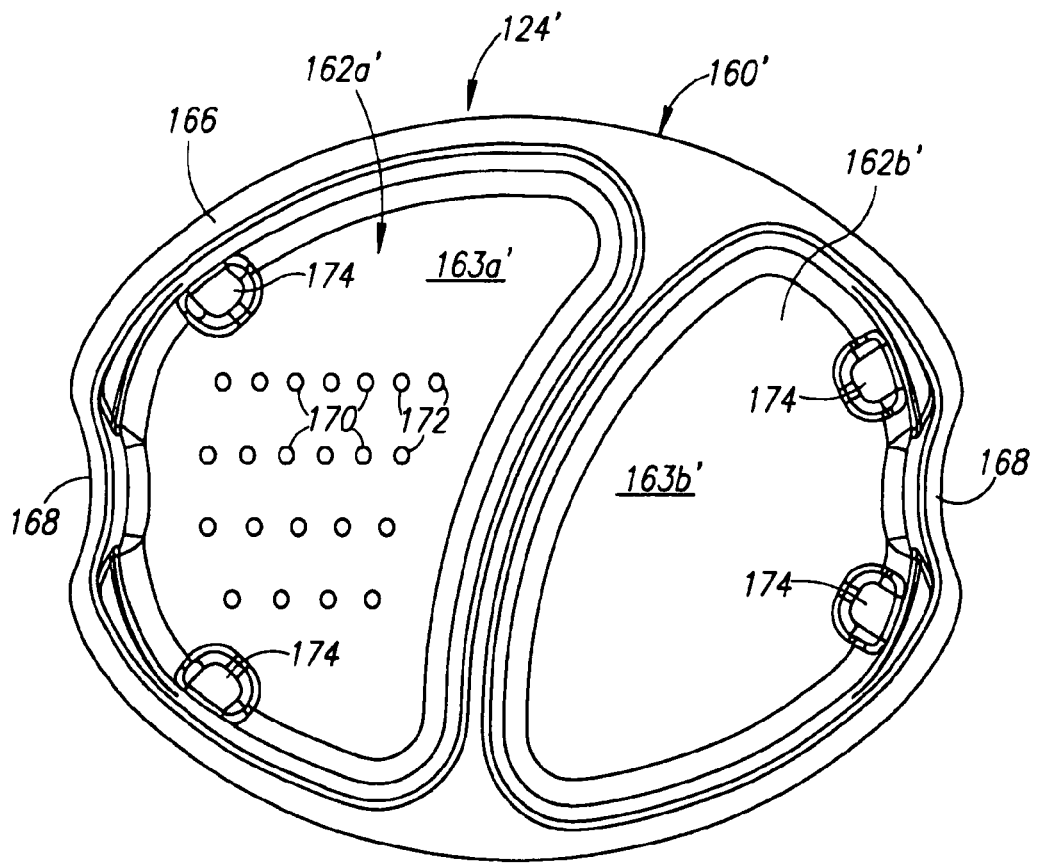
FIG. 8B is a top view of the another alternate embodiment of the basket of the cooking apparatus of FIG. 5A.
Figure 8C:
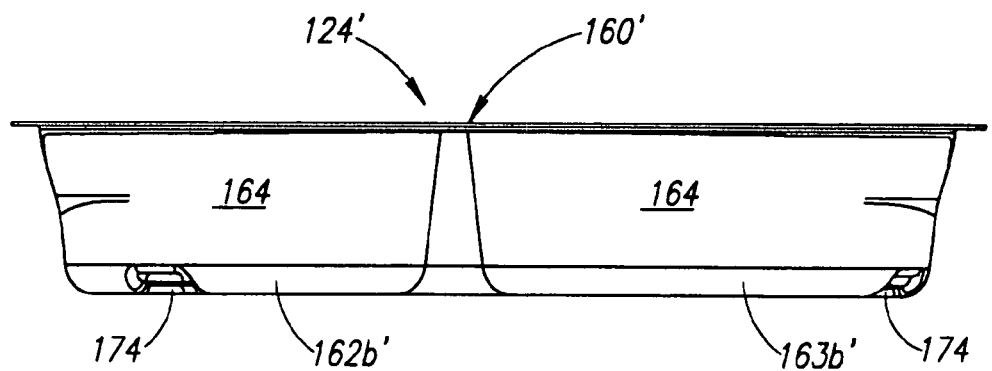
FIG. 8C is a side view of an another alternate embodiment of the basket of the cooking apparatus of FIG. 5A.

FIGS. 8A-8C show an alternate basket 124', similar in all aspects of construction to basket 124, except where indicated. The basket 124', like basket 124, is substantially oval in shape, and designed to sit in the container 122, as detailed above. The basket 124' differs from the basket 124, in that the body 160' is divided into two cavities 162a', 162b', for holding separate food components. Additionally, the base 163a' of the first cavity 162a' includes openings 170, for example, cylindrical bores 172, as detailed above. The base 163b' of the second cavity 162b' is solid, whereby the food component therein is primarily heated by the heating source.

Figure 9A:
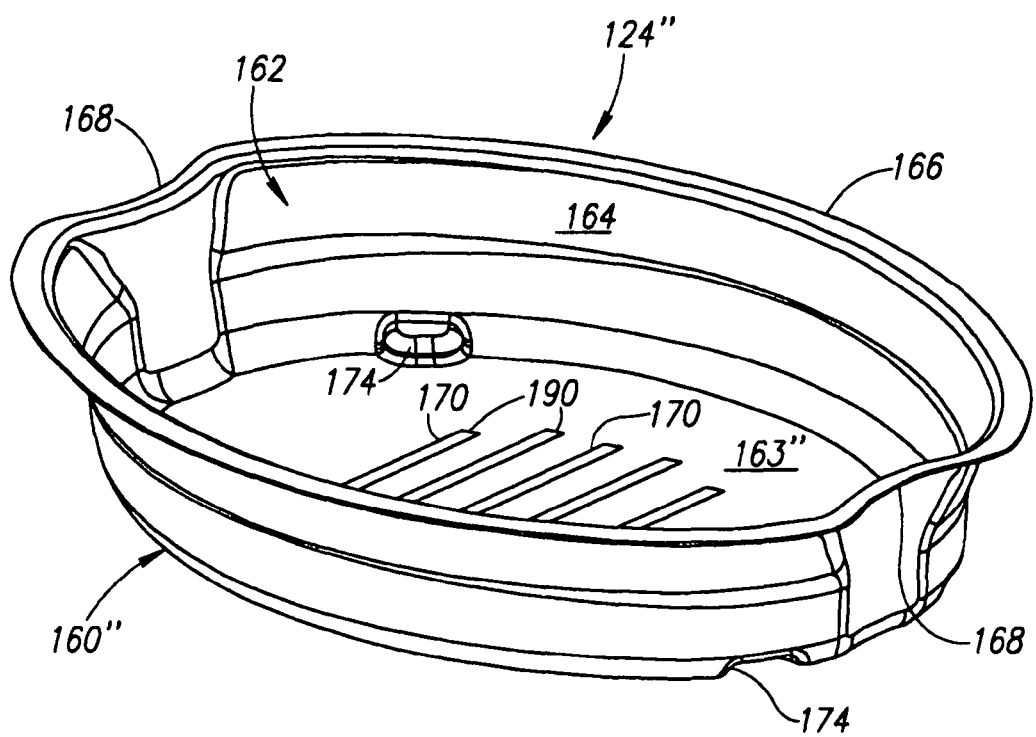
FIG. 9A is a perspective view of another alternate embodiment of the basket of the cooking apparatus of FIG. 5A.
Figure 9B:
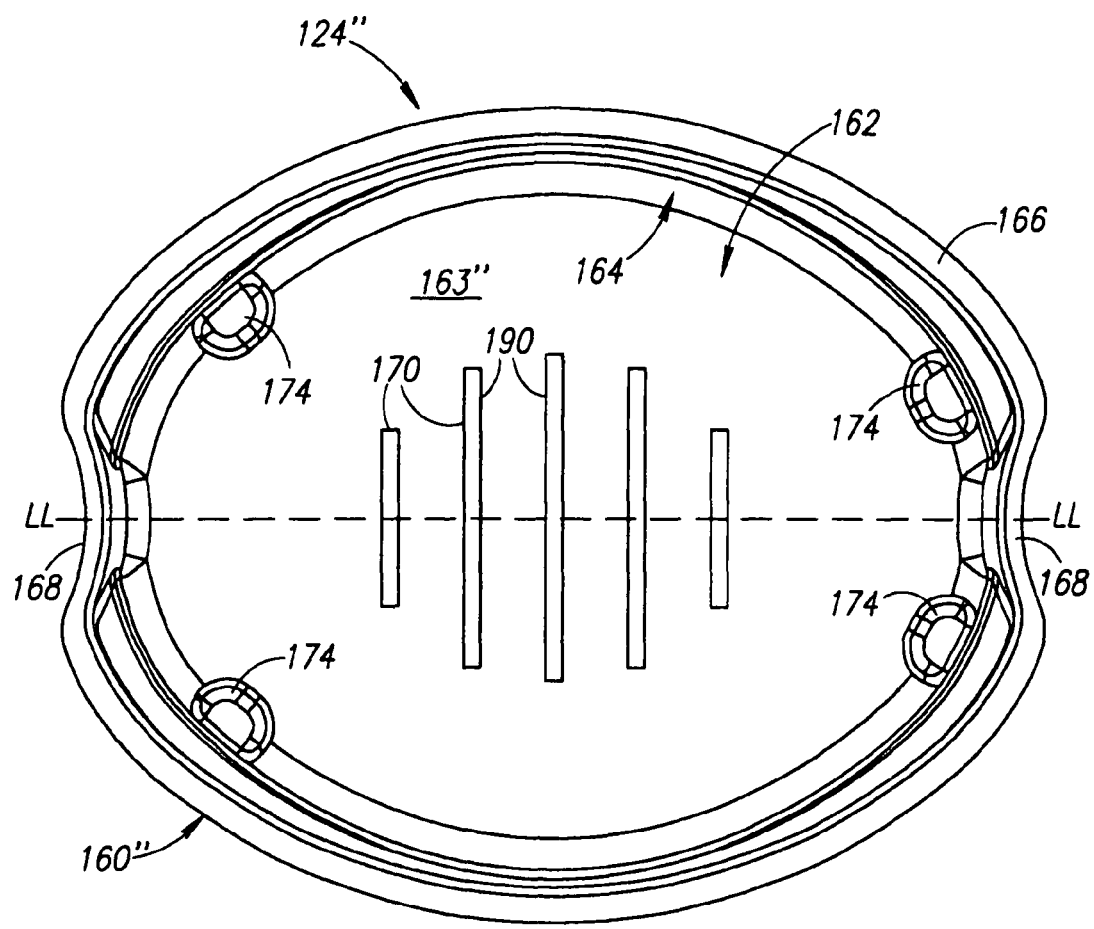
FIGS. 9B is a top view of another alternate embodiment of the basket of the cooking apparatus of FIG. 5A.
Figure 9C:
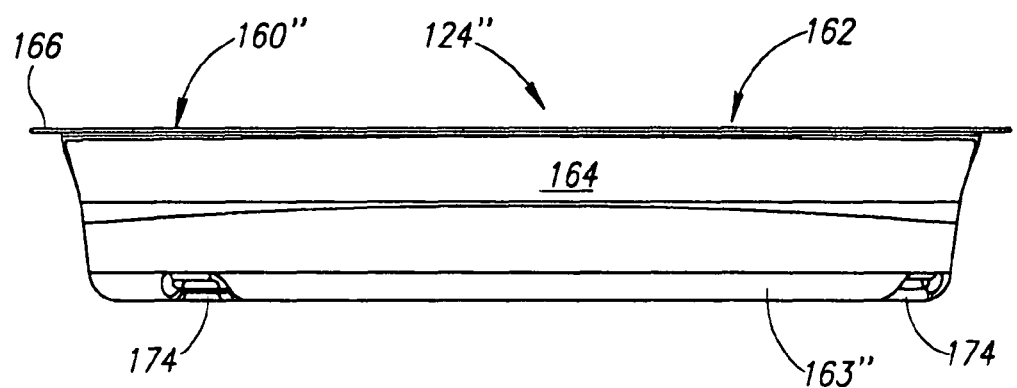
FIG. 9C is a side view of another alternate embodiment of the basket of the cooking apparatus of FIG. 5A.
Figure 10:
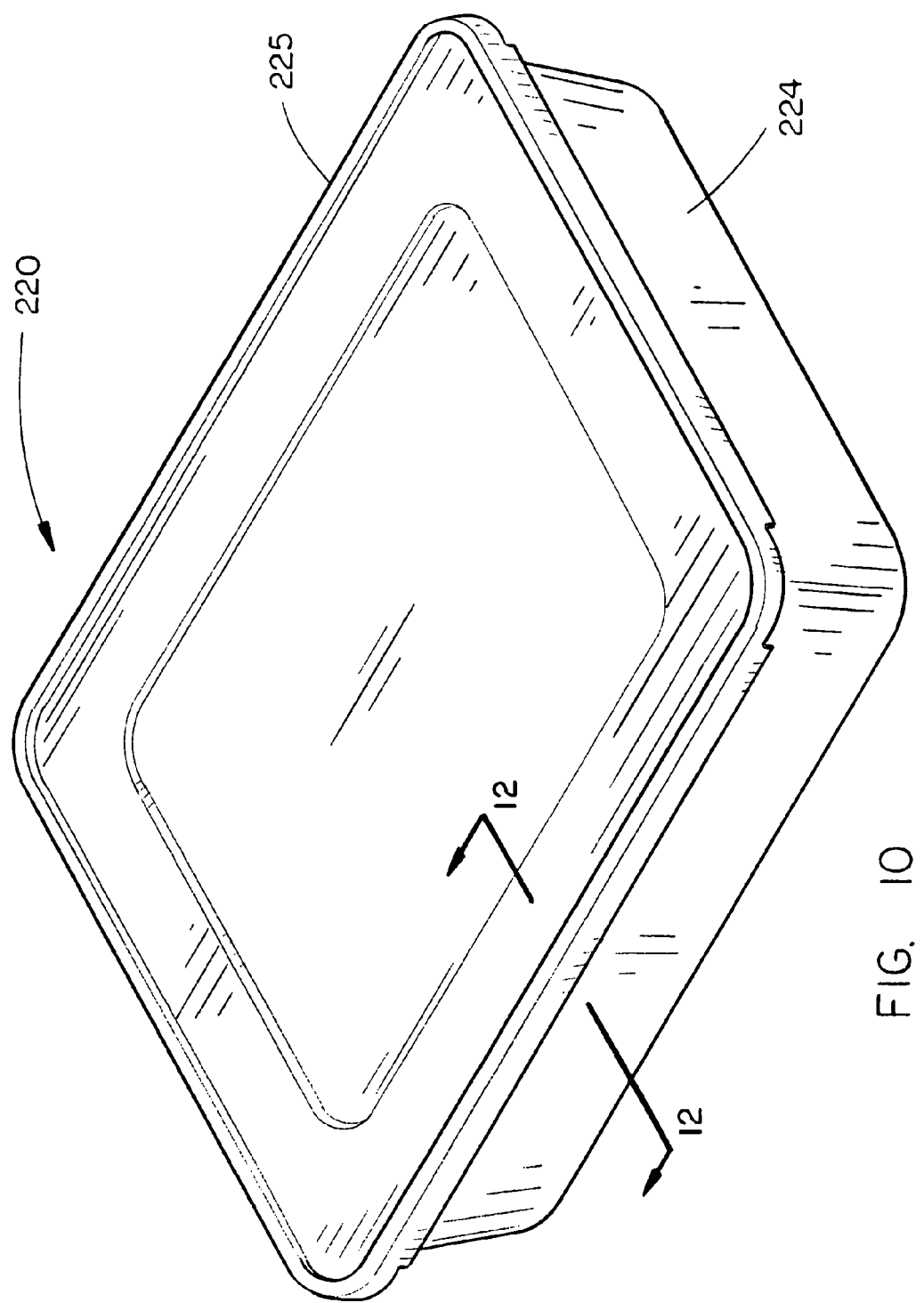
FIG. 10 is an illustration of an ovenable cooking apparatus that may be suitable for foodservice applications.

FIGS. 9A-9C show another alternate basket 124", similar in all aspects of construction and dimensions to the basket 124. Accordingly similar components, as detailed above, are numbered the same as above. Changed or different components are detailed below.

The basket 124", like basket 124, is substantially oval in shape, and designed to sit in the container 122, as detailed above. The basket 124" differs from basket 124, in that the openings 170 may be slits 190.

The slits 190 are similar in construction and function to the slits 90 of the basket 24, as detailed above. The slits 190 are cut into and extend through the base 163" of the body 160". They are typically arranged in a parallel alignment with respect to each other. The slits 190 are typically oriented perpendicular to the longitudinal axis LL of the base 163". Alternatively, the slits 90 may also be oriented parallel to the longitudinal axis LL of the base 163".

The containers 22,122 and baskets 24, 24',124, 124', 124" are, for example, made of polymers, such as Polypropylene (PP) (e.g., Co-polymer Polypropylene), Crystallized Polyethylene Terepthalate (CPET), or any other microwave and food safe non-toxic material. The containers 22,122 and baskets 24, 24',124,124', 124" are, for example, formed by conventional polymer forming and working techniques. Suitable forming and working techniques include injection molding, rotational molding, and the like, as well as thermoforming. The containers 22, 122 and baskets 24, 24',124, 124',124" are suitable for refrigerated storage, freezer storage, and subsequent heating without substantial deformation.

The apparatuses 20,120, in particular, the containers 22,122 and baskets 24, 24',124,124', 124" are typically of dimensions to ensure that during the cooking process the second food component is uniformly steam cooked. In addition, the apparatuses 20, 120, in particular, the containers 22,122 and baskets 24, 24',124, 124', 124" are of dimensions to fit within a typical consumer, or alternatively, food service microwave oven, with sufficient space remaining. For example, the containers 22 and 122 may be of circular shape and with a diameter of from about 4 to about 12 inches. Alternatively, the containers 22 and 122 may be of rectangular shape, with dimensions of from about 3 to about 6 inches in width to about 7 to about 12 inches in length. In addition, the containers 22 and 122 may include 1 to 6 servings, preferably 2 to 4 servings. Other dimensioning and/or shapes for the apparatuses 20,120, containers 22, 122 and baskets 24, 24', 124, 124', 124" are also possible, to accommodate different packages, cartons, or sleeves, that hold the apparatus prior to its use, as well as the internal cooking chambers of microwave ovens, high energy cooking apparatus, and the like. Similarly, other serving sizes are also possible to accommodate consumer demand.

The apparatuses 20,120 are such that they may be covered by a sheet of barrier material (e.g., transparent, translucent, or opaque) continuously sealed to the rim 36 of the containers 22 and 122, but also could be sealed to the rim 66, 166 of the baskets 24, 24',124, 124', 124". This sheet of barrier material is made of a material that is suitable to withstand oven temperatures during cooking and is moisture-impervious. Suitable materials include polymers, such as polypropylene and polyethylene, among others. The sheet of barrier material is sealed to the rim using any method generally known in the art The sheet of barrier material is sealed to the rim to prevent substantial bulging or expansion of the sheet material during the cooking process. In particular, the seal is such as to allow the release of some pressure build up inside the container while maintaining uniform heating and cooking of the food products therein.

In an alternative embodiment, the ovenable cooking apparatus 220 is suitable for use in commercial foodservice applications. FIGS. 10 through 26 show an ovenable cooking apparatus 220 suitable for foodservice applications. The ovenable cooking apparatus 220 includes a basket 222 and a container 224 that are dimensioned to allow the basket 222 to nest inside the container 224. The container 224 is used for containing the first food component 234 and receiving the basket 222, which holds the second food component 236. Use of the ovenable cooking apparatus 220 may result in a higher quality food product as compared to current methods in foodservice applications without requiring significant changes to current equipment and procedures. Use of the basket 222 and the container 224 allows separation of the sauce or liquid components of the meal from the vegetable, starch, or protein components. This separation leads to improvements in vegetable, protein, and starch integrity. The separation of food ingredients also allows for the preparation of breaded ingredients, which have typically been avoided using conventional methods because the soggy breaded items do not meet consumer standards. Use of the ovenable cooking apparatus 220 may result in breaded items, such as chicken parmigiana, that meet consumer approval and are not soggy.

Figure 21:
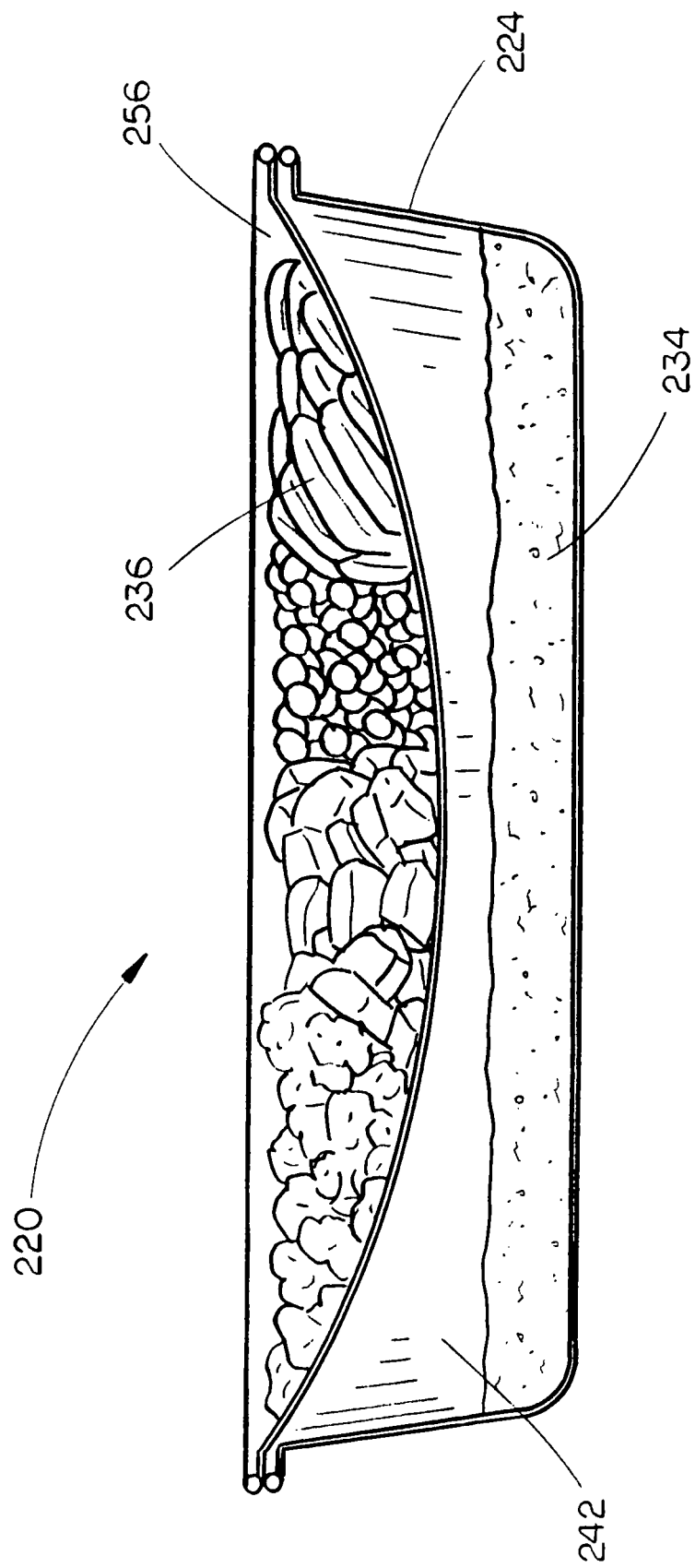
FIG. 21 is an illustration of a wok-shaped basket containing a second food component nested within the container containing the first food component.

In an exemplary embodiment of the invention, the ovenable cooking apparatus 220 includes a passage for providing airflow and steamflow for cooking the second food component 236. These passages may be defined by the basket 222 and the container 224, and allow an area through which steam may pass to transfer heat and/or steam to the second food component 236. In one embodiment, the passage is defined between the bottom or base 240 of the basket 222 and the top surface of the second food component 236. Cooking the liquid-based second food component 236 generates steam, which may travel across this passage to contact the basket 222 and heat or steam the second food component 236. In the methods illustrated in FIGS. 12, 13, and 15, the passage is a rectangular prism. However, it will be appreciated that the prism may be shaped differently, such as in a concave shape for increasing the surface area of the basket 222 adjacent to the passage (as depicted in FIG. 21). In another embodiment, the passages take the form of openings 238 that are located at the base 240 of the basket 222. The openings 238 may include apertures such as perforations, pores, holes, slits, outlets, slots, vents, gaps, pricks, or the like to facilitate steaming when steaming is desired. In an alternative embodiment, the basket may be solid to prevent steam from passing (for instance, when cooking breaded items).

Figure 11:
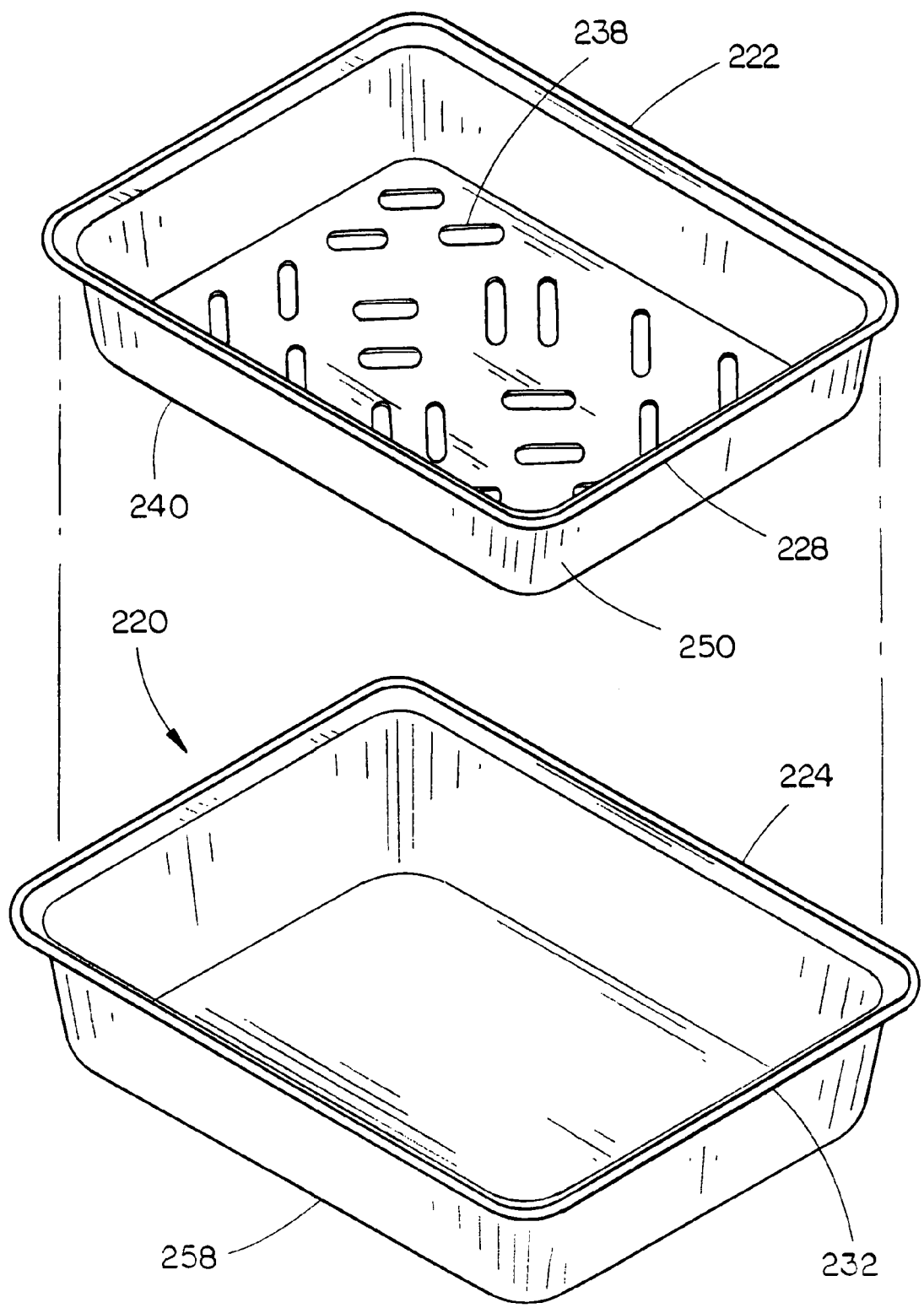
FIG. 11 is an illustration of an ovenable cooking apparatus that may be suitable for foodservice applications including a basket and a container.
Figure 12:
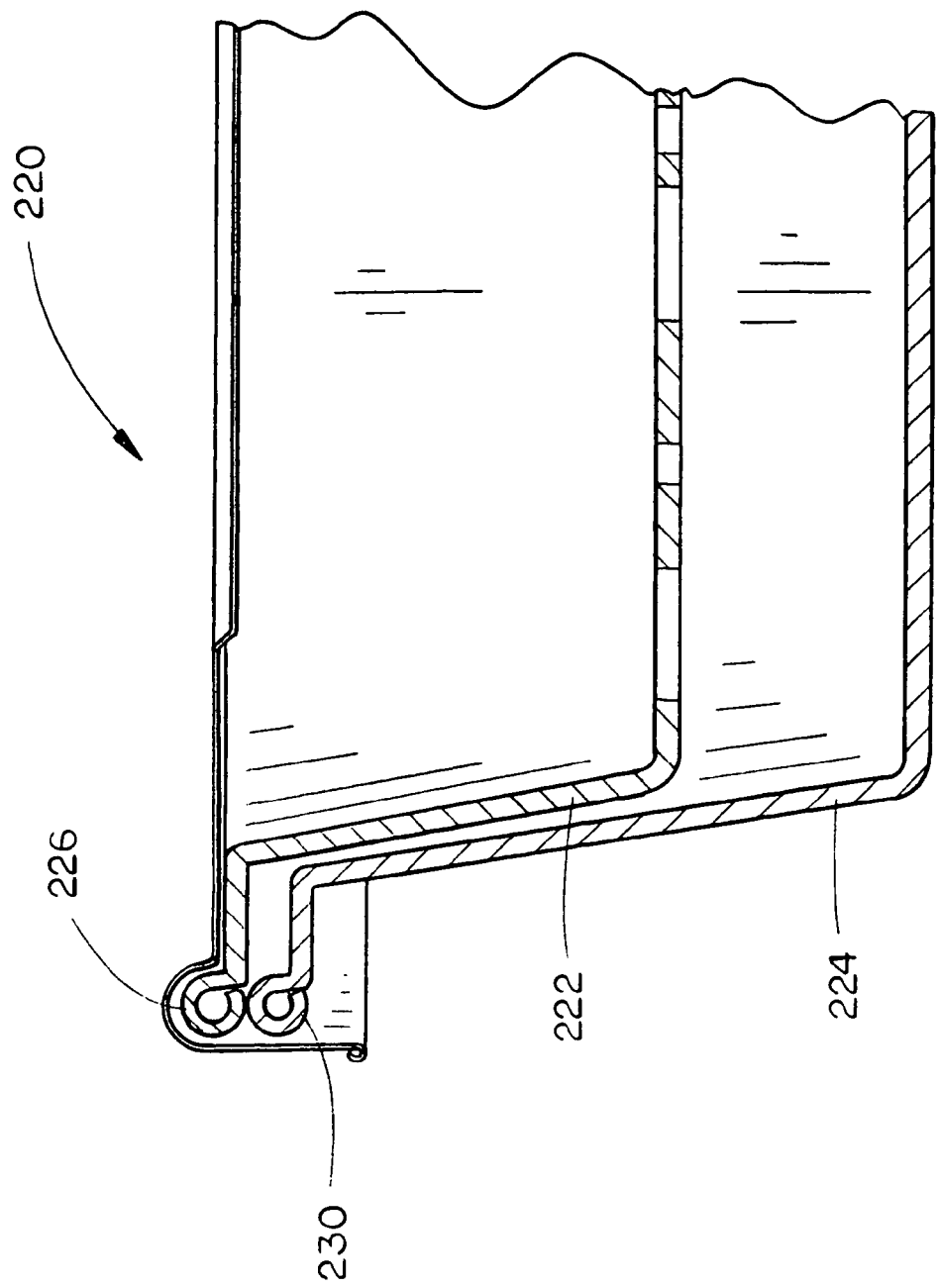
FIG. 12 is an illustration of a rolled edge of the container as it supports a rolled edge of the basket nested within the container.
Figure 13:
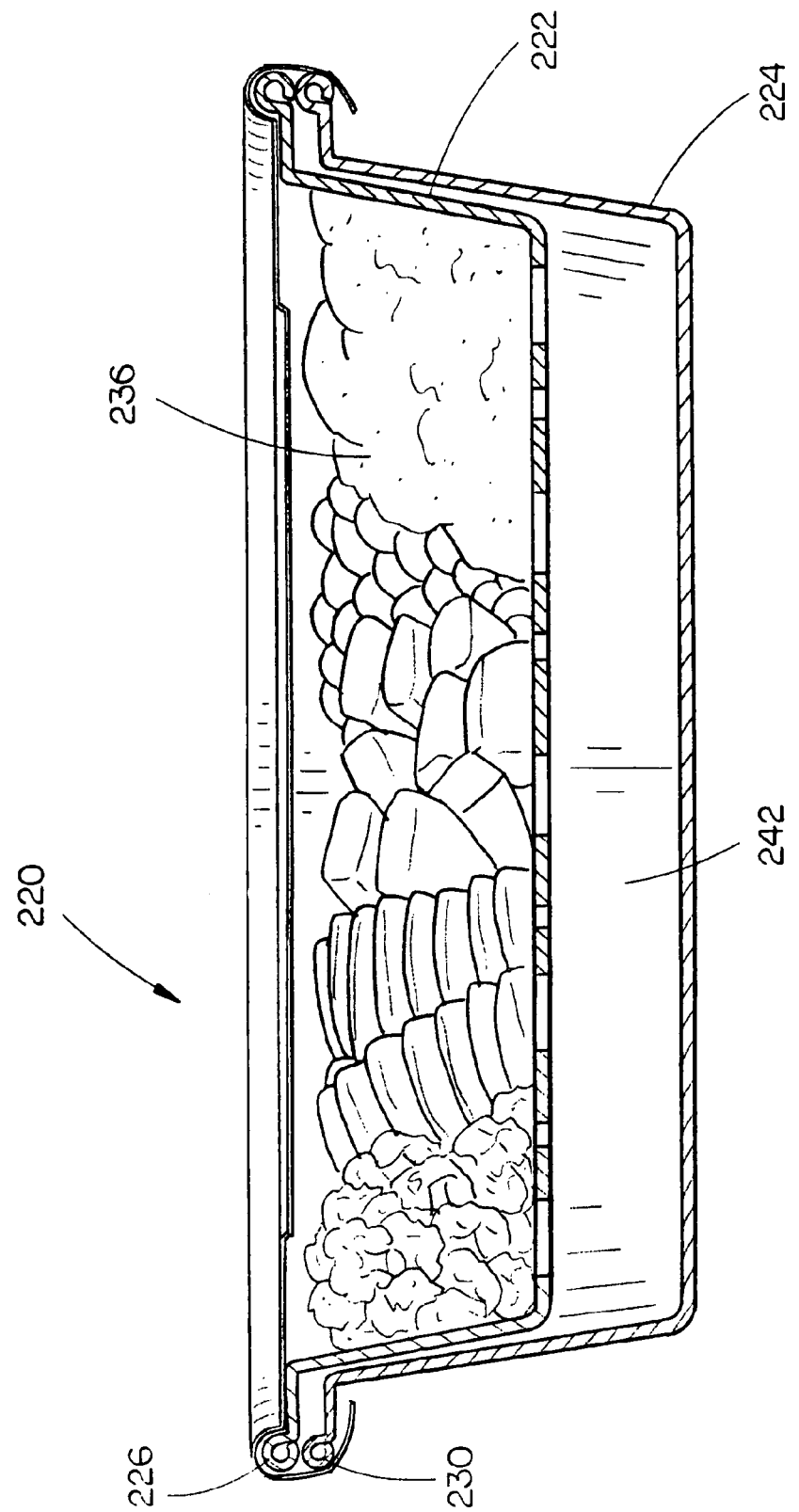
FIG. 13 is an illustration of the basket containing a second food component nested within the container of the ovenable cooking apparatus.

FIGS. 11 through 13 depict the basket 222 that may be suitable for foodservice applications. The basket 222 includes openings 238 that extend through the base 240 of the basket 222. In an alternative embodiment, the basket 222 may also include openings 238 along the sidewalls 250 of the basket 222. The basket 222 may also include a rolled edge 226 along the rim 228 of the basket 222 to allow the stacking of the rim 228 of the basket 222 along the rolled edge 230 of the container 224. As previously discussed, the body of the basket 222 may take any shape. In one embodiment, the basket 222 is of a rectangular shape with dimensions that may range from 4" to 18" in length, 3" to 12" in width, and 1" to 8" in depth. The basket 222 allows the second food component 236 to be cooked separately from the first food component 234.

FIGS. 10 through 13 show the container 224 that may be suitable for foodservice applications. The container 224 includes a rolled edge 230 along the rim 232 of the container 224 to allow stacking of the basket 222 within the container 224. The container 224 is dimensioned to allow nesting of the basket 222 within the container 224. The dimensions of the container 224 may range from 4" to 18" in length, 3" to 12" in width, and 1" to 8" in depth. The container 224 allows the first food component 234 to the cooked separately from the second food component 236.

Figure 14:
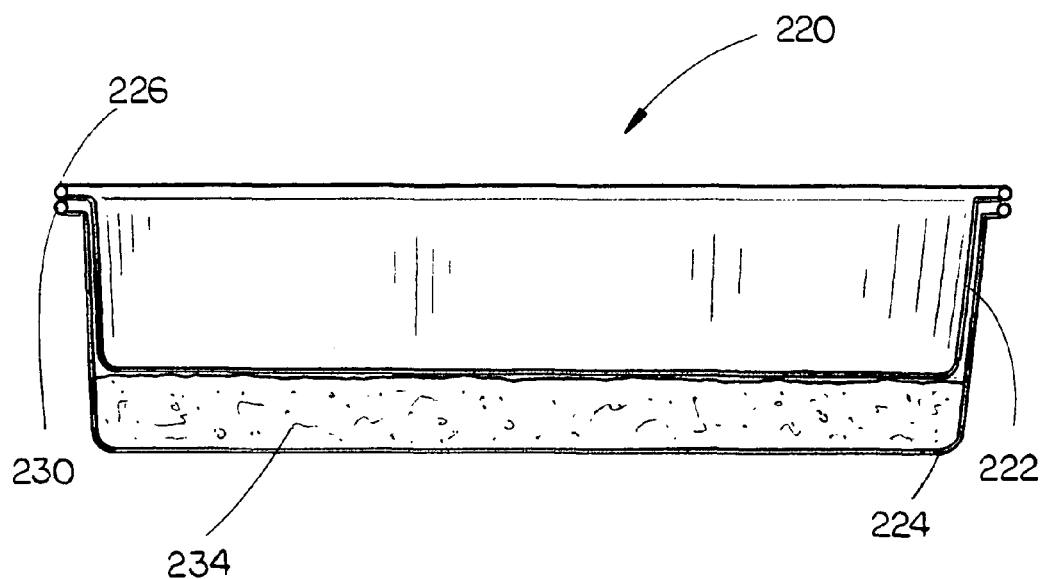
FIG. 14 is an illustration of the basket nested in the container containing a first food component.
Figure 15:
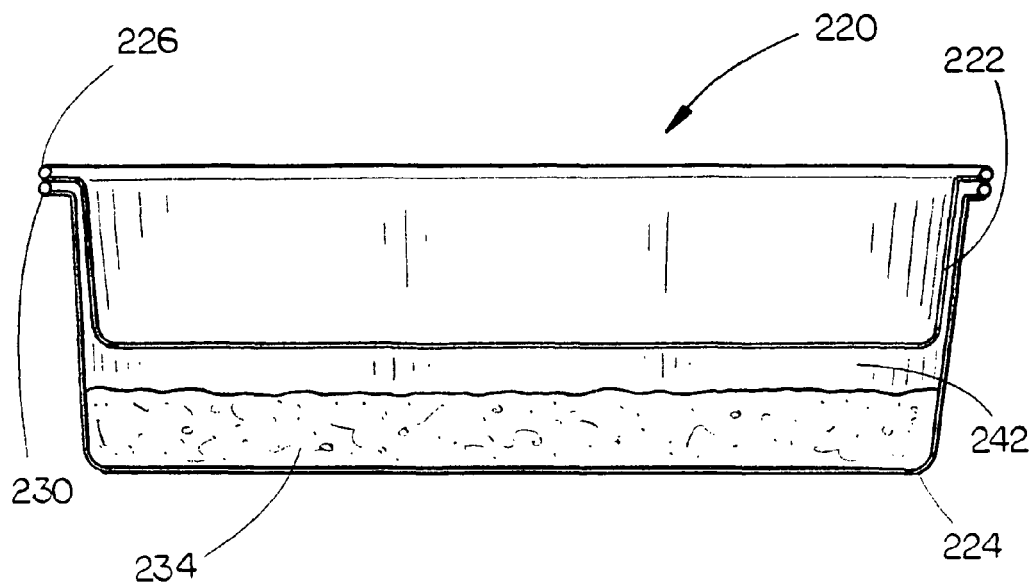
FIG. 15 is an illustration of the basket nested in the container containing a first food component with the first food component filled to a level to provide an airgap.

FIGS. 3 through 6 demonstrate how the basket 222 may be nested within the container 224 when food is loaded into the ovenable cooking apparatus 220. In one embodiment, basket 222 is stacked in the container 224 and the first food component 234 is filled to a level to provide airspace between the base 240 of the basket 222 and the first food component 234. In an alternative configuration, the basket 222 is stacked in the container 224 and the first food component 234 is filled to a level to limit or eliminate the airspace. This embodiment is depicted in FIG. 14 and provides partial or complete contact between the base 258 of the container 224 and the first food component 234. Either configuration may be selected depending on the type of food components, required cook times, thermodynamic properties of the cooking method and the food components, etc. The dimensions of the basket 222 and container 224 may vary to provide a greater or lesser amount of airspace. Similarly, the amount of the first food component 234 that is loaded into the container 224 may vary to provide the appropriate amount of airspace. By controlling air space, water, and the like, cooking times and food attributes can be controlled.

FIG. 12 depicts how the rolled edges of the basket 222 and the container 224 may be stacked to allow the basket 222 to nest within the container 224. In this embodiment, the container 224 and the basket 222 are formed of aluminum. The rolled edges are formed using a crimper using methods known in the art of foodservice tray formation. In an alternative embodiment, the stackability of the basket 222 within the container 224 may be provided using another method known in the art.

Figure 16:
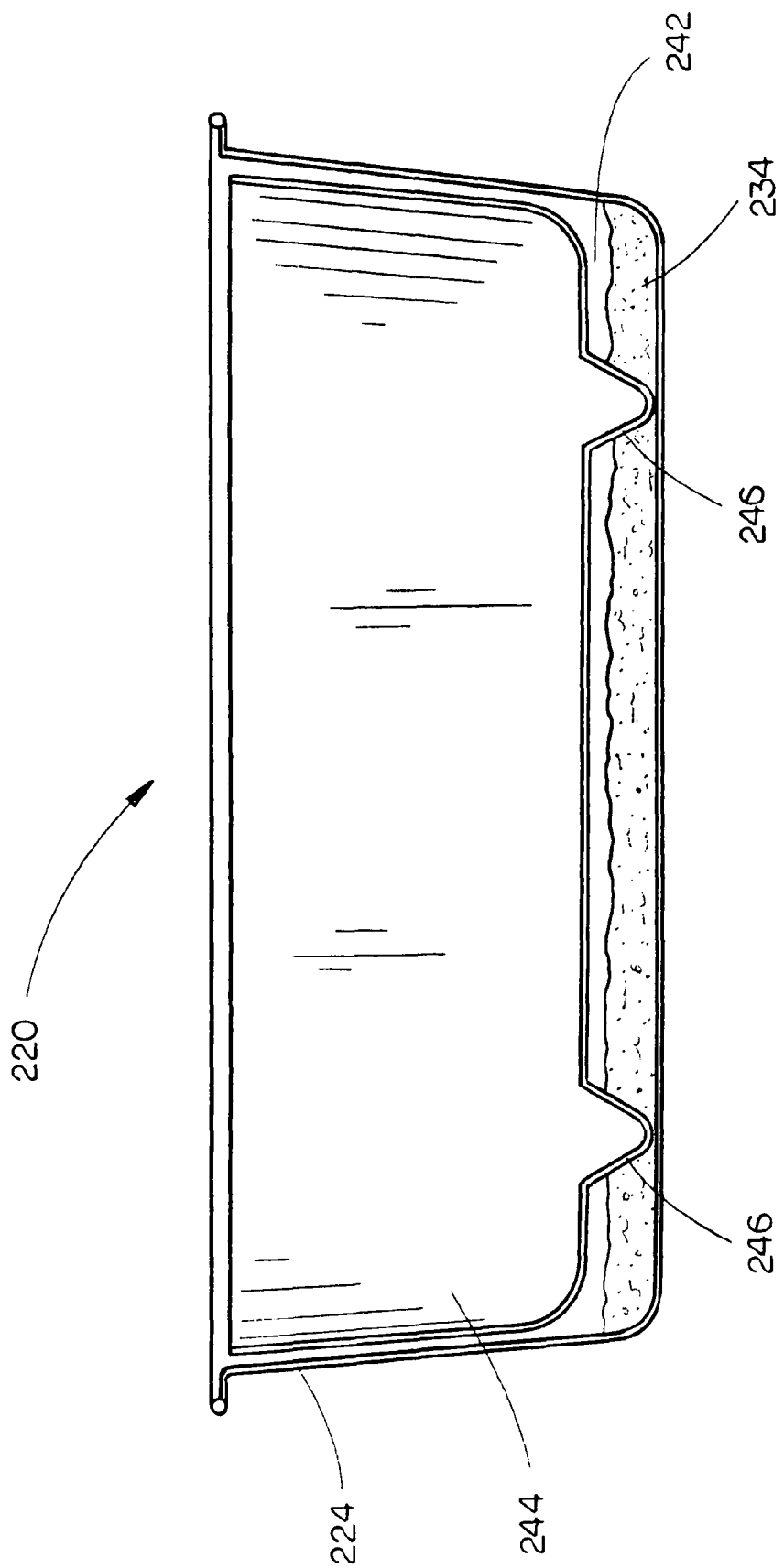
FIG. 16 is an illustration of a footed basket nested within a container containing a first food component.
Figure 17:
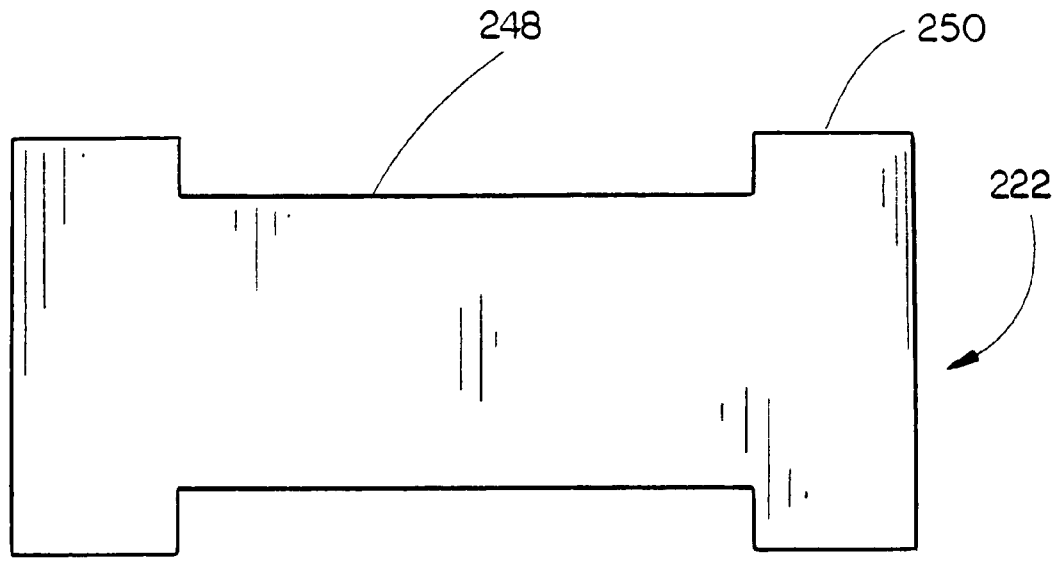
FIG. 17 is an illustration of a basket with indentations along the sidewalls of the basket.
Figure 18:
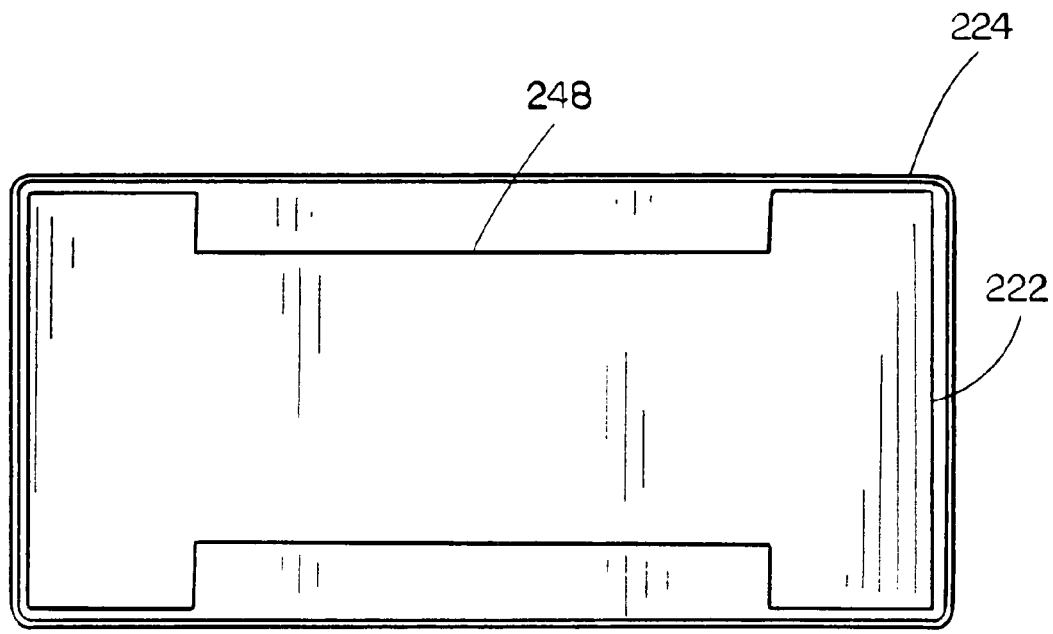
FIG. 18 is an illustration of a basket including indentations nested within the container.

FIG. 16 depicts an alternative embodiment of the ovenable cooking apparatus 220 that may be compatible with foodservice applications. In this embodiment, the ovenable cooking apparatus 220 includes a footed basket 244 and a container 224. The footed basket 244 includes a plurality of support members which rest on the base 258 of the container 224. This provides airflow and separation between the base 240 of the basket and the base 258 of the container 224. In this embodiment, the passage is comprised of the gap that exists between the base 240 of the basket 222 and the base 258 of the container 224. This passage serves to facilitate and permit the flow of steam from the first food component to the basket 222, and thus to the second food component 236. It will be appreciated that the support structures will be designed to minimize obstruction of the passage. This may also be designed to work with no air gap between the footed basket 244 and the container 224.

The footed basket 244 is depicted in FIG. 16, and includes a basket with a plurality of support members, which may include ridges, contours, or foot members 246. The foot members 246 protrude from the base 240 of the basket and contact the base 258 of the container 224. The foot members 246 are dimensioned to keep the base 240 of the basket 222 separate from the base 258 of the container 224. The amount of the first food component 234 that is loaded into the container 224 may vary to provide varying amounts of airspace. Similarly, the size of the foot members 246 may also vary to provide varying amounts of airspace, but are generally sized so as not to obstruct the passage. The footed basket 244 may include openings 238 to allow steam to enter and drain from the basket and cook the second food component 236. In an alternative embodiment, the foot members 246 provide sufficient separability between the container 224 and the basket to provide the passage for steam and heat to cook the second food component 236, and openings 238 are not required.

Employment of the footed basket 244 may provide sufficient support to the basket 222 so that rolled edges 226, 230 are not required suspend the basket 222 above the first food component 234. This can provide certain manufacturing advantages, as modifications to the edge crimper which typically forms the rolled edges, would not be required. The footed basket 222 can be manufactured using a thermoform process, aluminum press, or other method known in the art.

An alternative embodiment of the ovenable cooking apparatus 220 is depicted in FIGS. 17 through 20 and includes the container 224 and a basket 222 with indentations 248. The basket 222 with the indentations 248 is dimensioned to provide increased steam and airflow along the periphery of the basket 222. In this embodiment, the indentations 248 in the sidewalls 250 of the basket and the sidewalls of the container serve to define the passage for steam to cook the second food component 236. The form of the passage in this embodiment is thus vertical.

In another embodiment, the basket 222 is steam impermeable. Suitable materials include polymers, such as polypropylene and polyethylene, among others. For example, the basket may be formed from one continuous material, such as a continuous sheet of metal or the like. The basket 222 may be utilized for cooking foods that need to be separated from the steam produced by the first food component. In one specific embodiment, the basket 222 may be utilized for cooking a foodstuff such as bread, or the like. It will be appreciated that other foodstuffs may be cooked in the basket 222 and separated from steam generated by the first food component without departing from the scope and spirit of the present invention.

Figure 19:
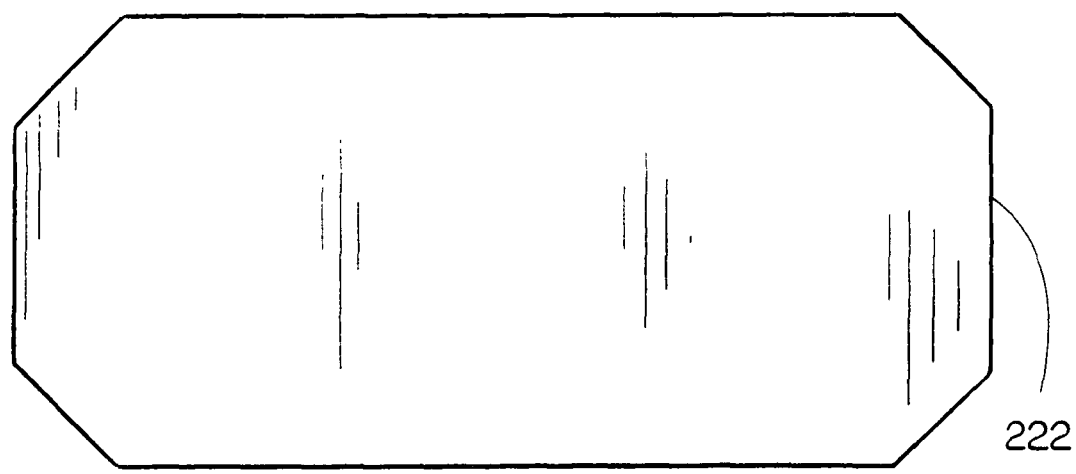
FIG. 19 is an illustration of a basket including indentations along the corners of the basket.
Figure 20:
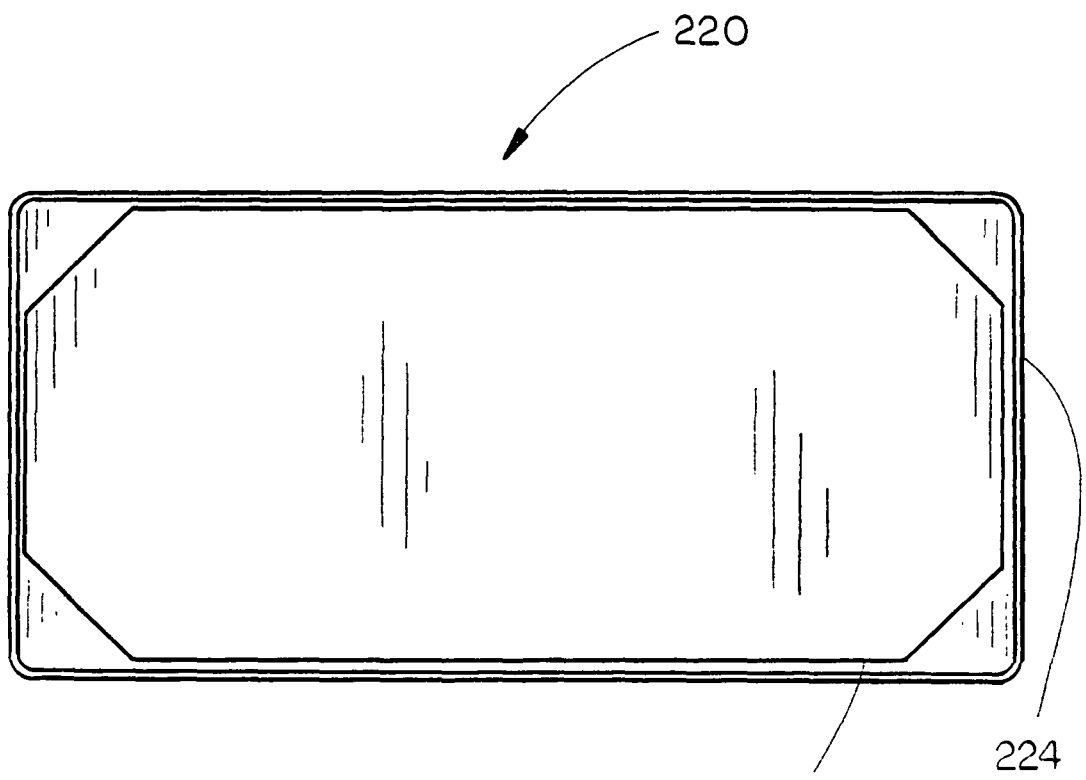
FIG. 20 is an illustration of a basket including indentations along the corners of the basket nested within the container.

In one embodiment, the basket 222 may be of a generally rectangular shape as described previously and include indentations 248 in the side walls 250 of the basket 222. For example, in one embodiment the basket 222 includes two indented side walls along the length of the basket 222. In another embodiment, the basket 222 includes indentations 248 along both the length of the basket 222 and along the width of the basket 222. FIGS. 19 and 20 depict another embodiment, wherein the corners of the generally rectangular basket 222 are removed to provide increased airflow and steam along the corner areas of the basket 222. Other configurations of indentations 248 to the basket 222 are also possible, and may include circular indentations, contoured indentations, or the like on any number of the basket's sidewalls 250. The indentations 248 may result in a symmetrically shaped basket 222, or an asymmetrically shaped basket 222.

The ovenable cooking apparatus 220 of the present embodiment also includes a container 224. The container 224 is dimensioned to define the passage and provide gaps 254 between the edge/rim of the container 224 and the rim/edge of the basket 222. These gaps 254 provide steam flow and airflow to heat the second food component 236. It will be appreciated that the lid 225 for the ovenable cooking apparatus 220 may be separated form the lip of the basket 222 to allow steam to move from the passage to the second food component 236.

The embodiments depicted in FIGS. 17 through 20 may also include a basket 222 with handles. The handles may include a protrusion segment or other means to allow manual gripping of the basket 222 for removal from the container 224. In one embodiment, the handles are located on the indentations 248 at the opposing corners of the edge of the basket 222. In another embodiment, the handles are located on opposing sides of the length-wise indentation of the basket 222. Employment of the handles may eliminate the need for rolled edges on the basket 222 and the container 224, thus providing ease in manufacturing.

The embodiments depicted in FIGS. 17 through 20 may provide sufficient steam flow and airflow to the basket 222 so that openings 238 may not be required. In one embodiment, the basket 222 does not include openings 238. The manufacturing process for forming a basket 222 with indentations 248 is thus easier and cleaner because a secondary cut for the openings 238 is not required. The basket 222 with indentations 248 can be formed using a thermoform process, aluminum press, or other method known in the art.

The ovenable cooking apparatus 220 described in FIGS. 17 through 20 may also be compatible with the footed basket 244 depicted in FIG. 16. For example, in one embodiment the basket 222 includes foot members 246 and indentations 248 along the length of the basket 222. The foot members 246 and the indentations 248 provide steam flow and air flow to the periphery of the basket 222 to cook the second food component 236.

An alternative embodiment of the invention is depicted in FIG. 21 and includes a wok-shaped basket 256 and a container 224. In this embodiment, the basket 222 is formed in a wok-like or bowl-like shape. The wok-like shape may provide enhanced thermodynamic and cooking properties for certain food components and heating devices.

The wok-shaped basket 256 is depicted in FIG. 21 and may include a rolled edge 226 to allow stacking of the basket 222 within the container 224. The wok-shaped basket 256 may include openings 238 to provide increased steam flow and drainage. In an alternative embodiment, the wok-shaped basket 256 does not include openings 238 because the shape of the wok provides sufficient air flow and steam flow to heat the second food component 236. For example, the curvature of the wok-shaped basket 256 may provide a larger airgap 242 along the periphery of the wok-shaped basket 256 so air and steam can cook the second food component 236. In some instances, the second food component 236 may include breaded items for which steam contact is not desired. In such an instance, the steam generated by the first food component 234 provides sufficient heat transfer to the basket 256 to heat the second food component 236.

The container 224 of the embodiment depicted in FIG. 21 is dimensioned to allow nesting of the wok-shaped basket 256 in the container 224. The container 224 may include a rolled edge 230 to allow the basket to stack into the container 224. The amount of the first food component 234, as well as the dimensions of the wok-shaped basket 256 and the container 224, may be varied to provide different sized airgaps. For example, the container 224 and the wok-shaped basket 256 may be dimensioned such that a portion of the base 240 of wok-shaped basket 256 may contact a portion of the base 258 of the container 224. In this embodiment, only a portion of the base 240 of the wok-shaped basket 256 contacts the base 258 of the container 224 or the first food component 234, providing an airgap 242 along the edge/rim of the wok-shaped basket 256. In an alternative embodiment, the base 240 of the wok-shaped basket 256 does not contact the first food component 234 or the base 258 of the container 224, and instead is supported by the rolled edges to provide a larger airgap 242.

Figure 22:
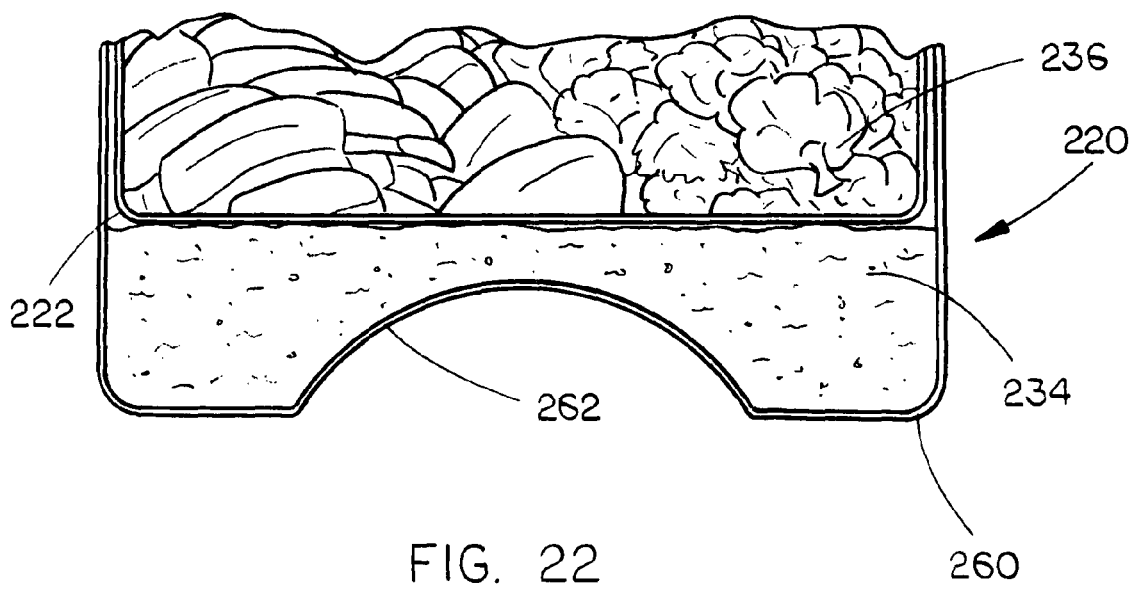
FIG. 22 is an illustration of the basket containing the second food component nested in a contoured container containing a first food component.

An alternative embodiment of the ovenable cooking apparatus 220 is depicted in FIG. 22 and includes a basket 222 and a container 224 with a contoured base 260. The container includes a contour 262 at the base 258 of the container, with the concavity of the contour 262 being oriented towards the basket 222. This embodiment provides enhanced heat transfer to the food components. In this embodiment, the base of the container 224 is shaped to extend into the passage, in close proximity to the base of the basket 222. This may facilitate heat transfer between the container 224 and the basket 222 by reducing the distance between them.

As depicted in FIG. 22, the container includes a contour 262 at the base 258 of the container. In some instances, the food components that are located towards the center of the basket 222 and the container are the most difficult to heat because they receive the least amount of heat transfer. Unlike the edges of the container, which may receive heat through the bottom and the sides of the container, the center of the base may only receive heat from one direction. The contour 262 may provide enhanced heat transfer because it reduces the thickness of this center area of the ovenable cooking apparatus 220 which may be difficult to heat. The size and concavity of the contour 262 may vary depending on the heat transfer desired and the type of food. Multiple contours 264 may also be included to provide enhanced heat transfer and cooking. In one embodiment depicted in FIG. 24, the container includes a plurality of contours 264 to provide a greater surface area to volume ratio on the tray. This may provide enhanced heat transfer because a greater surface area on the container provides a greater area for heat transfer to occur. Other textures may also be applied to the base 258 of the container to increase the surface area for heat transfer, including pyramidal textures, sinusoidal textures, wave patterns, or the like.

Figure 23:
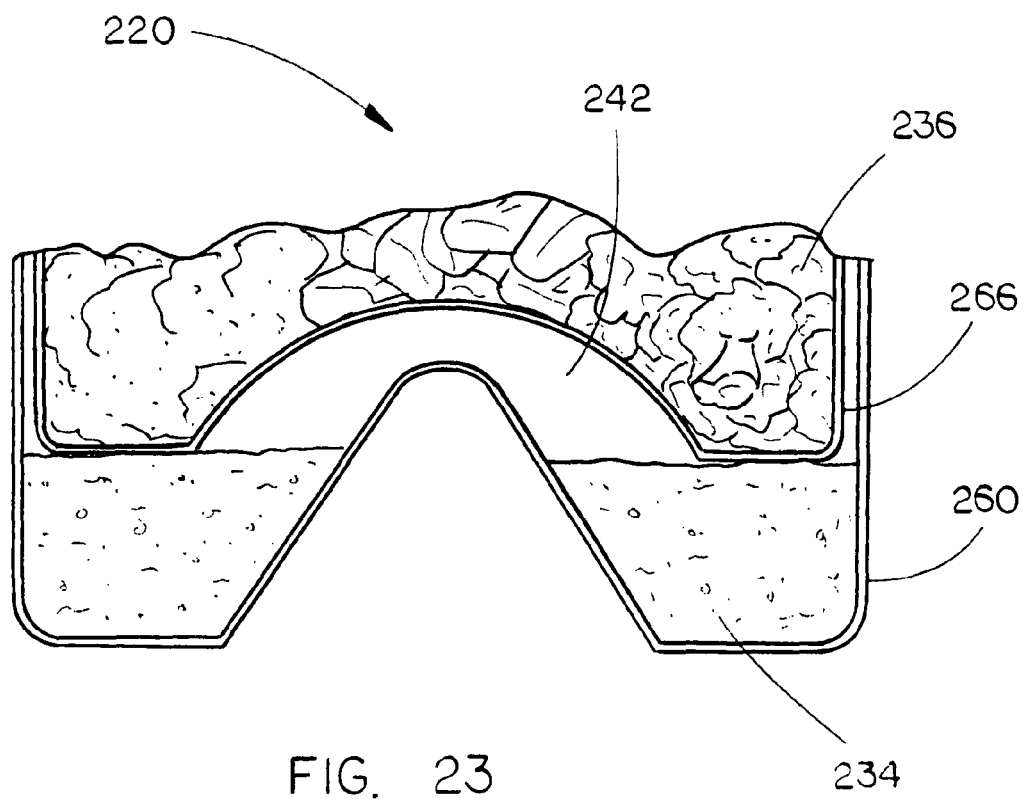
FIG. 23 is an illustration of a contoured basket containing the second food component nested within the contoured container containing a first food component.
Figure 24:
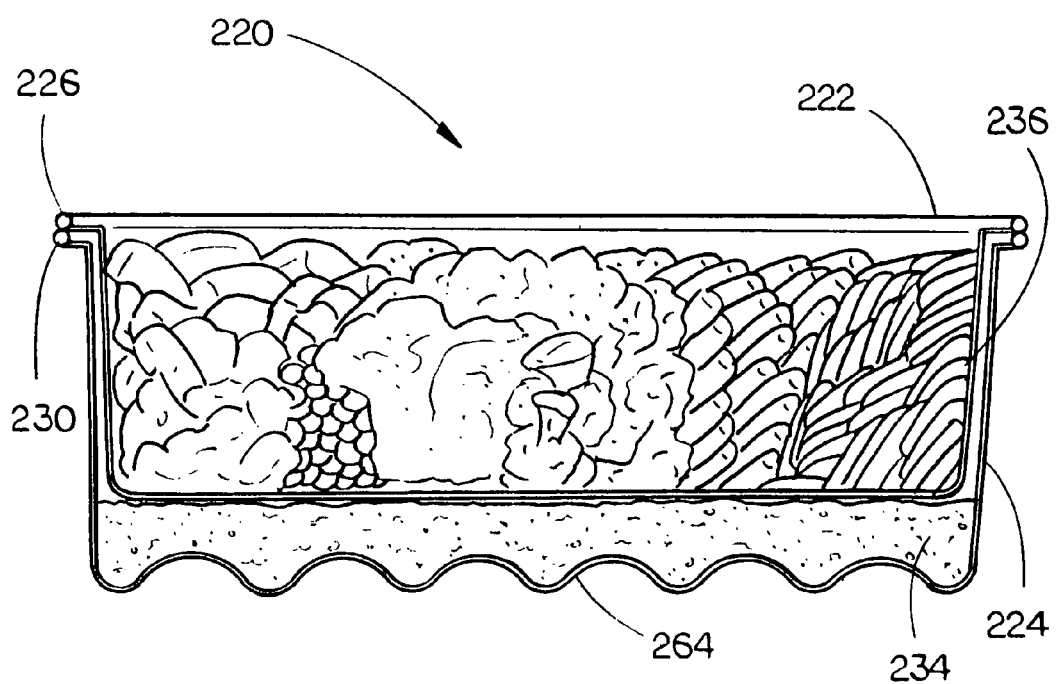
FIG. 24 is an illustration of the basket containing a second food component nested within a container with a contoured base containing the first food component.

In a further embodiment, depicted in FIG. 23, the basket 222 may also include a contour 266 to provide enhanced heat transfer and cooking. The contour 262 of the container may be greater than the contour 266 of the basket 222 so that when the basket 222 is nested in the container the air gap is minimized.

Figure 25:
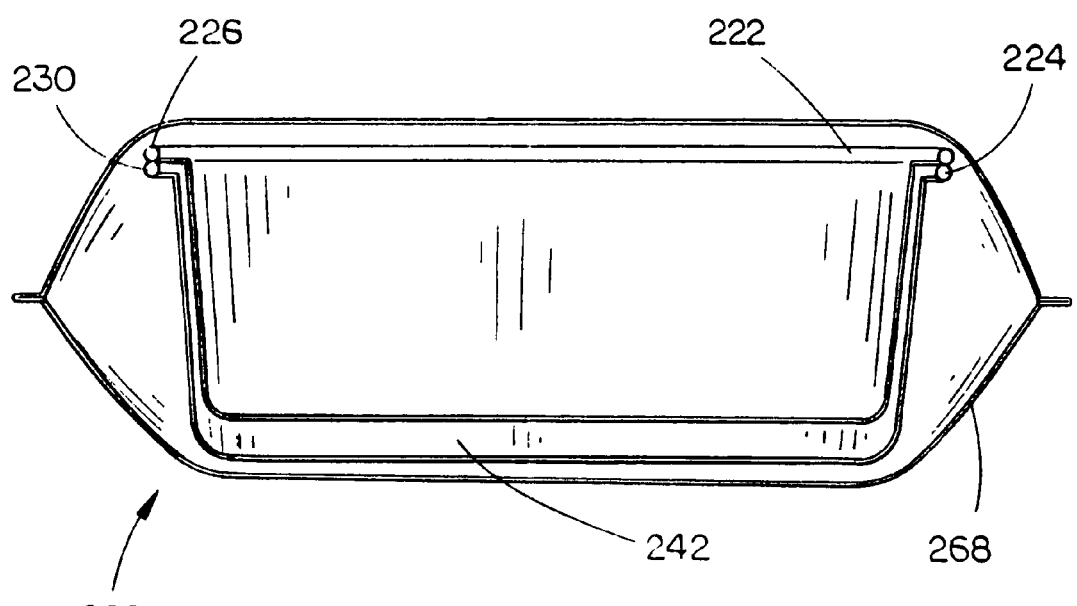
FIG. 25 is an illustration of an oven bag containing the basket nested in the container.

FIG. 25 depicts an alternative embodiment of the invention that includes a basket 222, container 224, and an oven bag 268. The oven bag 268 may be non-venting to increase the cooking pressures and decrease cooking time. To prepare the food, the basket 222 is nested within the container 224 and both are cooked inside the oven bag 268. For packaging, transport, and sale, the basket 222 and container 224 may be already packaged within the oven bag 268, or the oven bag 268 may be included with the container 224 and basket 222 and the user puts the container 224 and basket 222 into the oven bag 268.

Figure 26:
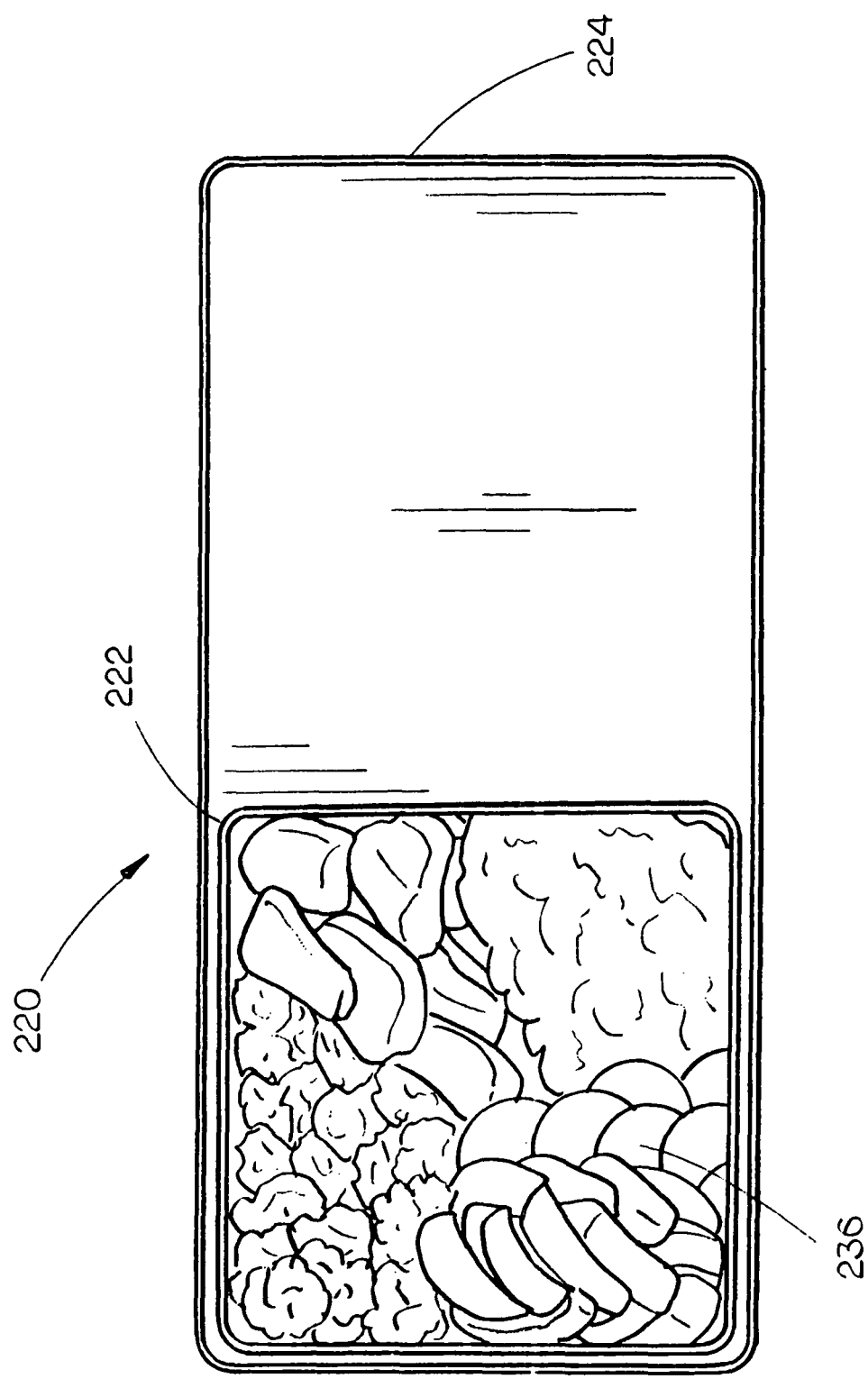
FIG. 26 is an illustration of the basket containing the second food component nested in a container containing a first food component, wherein the basket is less than half the size of the container.

An alternative embodiment of the ovenable cooking apparatus 220 is depicted in FIG. 26 and includes a basket 222 that is dimensioned to be smaller than the container 224. For example, in one embodiment the basket 222 is Less than half the size of the container 224. This embodiment may be used for food products that include a greater amount of a first food component 234 (such as sauce or sauce and vegetables) than a second food component 236 (such as starch, protein, or the like). The second food component 236 is packaged in the basket 222, which is smaller and dimensioned to receive a smaller amount of food and the first food component 234 is packaged in the container 224. Multiple baskets may also be included in the container 224. For example, in one embodiment the container 224 and the baskets may be dimensioned to allow the container 224 to accommodate two or even three baskets. The baskets may contain different food components. Use of this embodiment allows further separation of the food components.

In one embodiment, the ovenable cooking apparatus 220 includes a container 224 with a first basket 222 and a second basket. The container 224 holds a first food component 234, the first basket 222 holds a second food component 236 and the second basket may hold a second food component 236 or a third food component. The first basket 222 and the second basket may employ any of the features described previously, including openings 238, handles, or foot members 246. The first basket 222 and the second basket may have different characteristics, particularly if they are used to hold different food components. For example, the first basket 222 may include openings 238 to provide extra drainage and steam flow to a second food component 236, while the second basket may not include openings 238. In another embodiment, the container 224 and baskets may be dimensioned to allow several baskets to be nested within a single container 224.

The ovenable cooking apparatus 220 may be used according to a number of methods. In one method, the container 224 containing the first food component 234 and the basket 222 containing a second food component 236 are packaged and sold together. The basket 222 and the container 224 may be packaged in a nested fashion for efficiency, but prepared separately. For instance, a user may be instructed to heat the container 224 and the basket 222 separately instead of in a nested fashion to prepare the food components. In an alternative embodiment, the ovenable cooking apparatus 220 may include a container 224 containing a first food component 234 and a basket 222 containing a second food component 236, as well as a second basket containing a third food component. The first and second baskets may be nested in the container 224 during transport and sale, and during preparation a user may separate the second basket and cook it separately while leaving the first basket and the container 224 to cook in a nested fashion.

The materials used to construct the basket 222 and the container 224 may depend on the cooking mechanism, the type of food, cost, and other factors. The materials may include all the aforementioned materials (PP<CPET, APET, Nylon, Aluminum, etc.), and others such as pressed paperboard, molded pulp, or the like. It may also be possible to construct the basket 222 from one material and the container 224 from another. For instance, the basket 222 may be constructed of polypropylene (PP) and the container 224 may be constructed of Crystallized Polyethylene Terepthalate (CPET).

It is believed that the invention may be further understood by the following examples, which are not limiting in any way.

EXAMPLE 1

Chicken Primavera

Two samples of Chicken Primavera were prepared under the same conditions to look for improvement in food quality and cook times. The first sample was prepared according to current methods using an aluminum tray and a frozen block of the Chicken Primavera with all ingredients mixed together. The second sample was prepared using a foodservice compatible embodiment of the ovenable cooking apparatus 220, which included an aluminum basket 222 with openings 238 nested within an aluminum container 224. The container 224 included a medium depth tray pan and contained sauce. The basket 222 was a shallow tray pan with between 20 and 40 oval shaped openings 238 approximately 1" long. The basket 222 was nested within the container 224 and contained vegetables and proteins. The size of the basket 222, container 224, and the amount of sauce allowed for an air gap between the base 240 of the basket 222 and the sauce.

Significant improvements were observed in comparisons between the conventional method and the ovenable cooking apparatus 220. The sample prepared using the ovenable cooking apparatus 220 resulted in huge improvements in product quality, including improved sauce color and improved vegetable texture, color, and flavor.

EXAMPLE 2

Beef Stew

Two samples of Beef Stew were prepared under the same conditions to look for improvement in food quality and hold life. The first sample was prepared according to current methods using an aluminum tray and a frozen block of the Beef Stew with all ingredients mixed together. The second sample was prepared using a foodservice compatible embodiment of the ovenable cooking apparatus 220, which included an aluminum basket 222 with openings 238 nested within an aluminum container 224. The container 224 included a medium depth tray pan and contained sauce. The basket 222 was a shallow tray pan with between 20 and 40 oval shaped openings 238 approximately 1" long. The basket 222 was nested within the container 224 and contained vegetables and proteins. The size of the basket 222, container 224, and the amount of sauce allowed for an air gap between the base 240 of the basket 222 and the sauce. The products were sampled after preparation, 30 minutes later, 60 minutes later, and 90 minutes later to compare their quality under conditions where they are kept warm for serving after being cooked (their hold life).

Significant improvements were observed in comparisons between the conventional method and the ovenable cooking apparatus 220. The sample prepared using the ovenable cooking apparatus 220 resulted in huge improvements in product quality, including improved sauce color and impoved vegetable texture, color, and flavor. The potatoes and carrots prepared using the ovenable cooking apparatus 220 were significantly better than the ptoates and carrots prepared using conventional methods. The beef also showed superior quality over time compared to the beef that was prepared conventionally.

EXAMPLE 3

Chicken Parmigiana

A first sample of chicken parmigiana was prepared according to the conventional method, which included a frozen block of all ingredients in a foodservice tray. A second sample of chicken parmigiana was prepared using the ovenable cooking apparatus. The sauce was placed in the container and the chicken parmigiana and pasta were placed in the basket and cooked. The basket did not include openings for steam to enter the basket.

There were significant improvements in the sample prepared using the ovenable cooking apparatus. The chicken from the first sample was soggy and did not meet consumer standards. The chicken from the ovenable cooking apparatus had the appropriate crispy texture. The pasta also had improved texture and flavor.

EXAMPLE 4

Tandoori Chicken

Tandoori Chicken was prepared using the ovenable cooking apparatus 220, which included an aluminum basket 222 nested within an aluminum container 224. The basket 222 did not include perforations. The basket 222 contained 30 ounces of minted couscous with garbanzo beans. The container 224 contained 25 ounces of curry sauce and 30 ounces of Tandoori chicken breast in 1" chunks.

Significant improvements were observed compared to Tandoori Chicken prepared using a single tray and a frozen block of all Tandoori Chicken ingredients mixed together. There were particular improvements to sauce color and vegetable texture, color, and flavor.

EXAMPLE 5

Jerk Chicken

Jerk Chicken was prepared using the ovenable cooking apparatus 220, which included an aluminum basket 222 nested within an aluminum container 224. The basket 222 did not include perforations. The basket 222 contained 30 ounces of protein and 30 ounces of white rice. The container 224 contained 40 ounces of black beans and sauce.

Significant improvements were observed compared to Jerk Chicken prepared using a single tray and a frozen block of all the Jerk Chicken ingredients mixed together. There were particular improvements to sauce color and vegetable texture, color, and flavor.

EXAMPLE 6

Chicken Milanese

Chicken Milanese was prepared using the ovenable cooking apparatus 220, which included an aluminum basket 222 and an aluminum container 224.

The basket 222 did not include perforations. The basket 222 contained 20 ounces of Chicken Milanese, which included 10 chicken breast tenders. The container 224 contained 20 ounces of broccoli rabe and 30 ounces of mushroom risotto.

The container 224 was covered and steamed for 1 hour. The chicken Milanese in the basket was reheated in a 350 degree oven for 15 minutes.

Significant improvements were observed compared to chicken Milanese prepared using a single tray and a frozen block of all the chicken milanese ingredients mixed together. There were particular improvements to sauce color and vegetable texture, color, and flavor.

EXAMPLE 7

Vegetarian Pad Thai

Vegetarian Pad Thai was prepared using the ovenable cooking apparatus 220, which included an aluminum basket 222 and an aluminum container 224. The basket 222 did not include perforations. The basket 222 contained 30 ounces of rice flour vermicelli and 12 ounces of vegetables, including julienne carrots, bean sprouts, and green onions. The container 224 contained 30 ounces of sietan (wheat gluten) and 25 ounces of Pad Thai sauce. The container 224 was covered and steamed for 1 hour. The basket was covered and steamed for 20 minutes.

Significant improvements were observed compared to Vegetarian Pad Thai prepared using a single tray and a frozen block without separating the ingredients. There were particular improvements to vegetable texture, color, and flavor, as well as sauce color.

EXAMPLE 8

Dim Sum Party Pack

A Dim Sum Party Pack was prepared using the ovenable cooking apparatus 220, which included an aluminum basket 222 and an aluminum container 224. The basket 222 did not include perforations. The basket 222 contained 6 boa buns with asian barbeque pork, 6 LaChoy Chicken Potstickers, and 6 steamed vegetable spring rolls. The container 224 contained 12 ounces of teriyaki sauce. The container 224 was heated for 15 minutes in a 350 degree oven while covered. The basket was steamed uncovered for 10 minutes.

The Dim Sum Party Pack was not compared to a Dim Sum Party Pack prepared using the conventional single tray method because this type of meal is cannot be prepared according to traditional methods due to the breaded ingredients. However, use of the ovenable cooking apparatus 220 to prepare the Dim Sum Party Pack resulted in a very high quality result, with no sogginess in the breaded ingredients.

The current invention provides numerous advantages over prior art. First, use of the container to hold the first food component and the basket to hold the second food component provides separation of the food ingredients during cooking. This may lead to significant improvements in food quality, including improvement in texture, hold life, color, and flavor. Separation of the food ingredients also provides enhanced control of the moisture levels and ultimately, the quality of the food ingredients. In one example, individually quick frozen (IQF) foods may be placed in the basket and are separated from other food ingredients. As the IQF foods thaw, moisture can drain from the basket into the container. This keeps the IQF foods from becoming soggy from excess moisture, and also ensures that the other food ingredients in the container do not dry out.

Second, the current invention allows the introduction of new food items into the foodservice industry. Currently, breaded items may not meet consumer standards when prepared in foodservice trays that do not provide separation of ingredients. By placing breaded items in the basket of the ovenable cooking apparatus, they may come out crispy instead of soggy. This will open up a plethora of new food items for the foodservice industry without excessive changes to current methods.

Third, the current invention may also provide significant thermodynamic and heat transfer advantages. Separating the food ingredients increases the surface area to volume ratio, which increases the surface area to which heat may be transferred. This may result in greater efficiency in cooking.

Fourth, the ovenable cooking apparatus is largely compatible with existing methods of meal preparation in the foodservice industry. By nesting the basket in the container during packaging and cooking, there is no need for additional oven space to prepare the meal.

Last, the ovenable cooking apparatus allows users to plate, assemble, and customize their meal according to their preferences and taste. The presentation of the meal is more attractive and appealing when consumers can choose how to place each component and how much of each food ingredient they would like to put on their plate. By keeping the food components separate during cooking, the ingredients don't intermix and consumers can customize their meals with varying amounts of ingredients.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A cooking apparatus, comprising:
  a food comprising a first food component and a second food component, the first food component and the second food component being at least substantially separate during cooking;
  a container including a base and a sidewall having an at least substantially continuous shelf formed therein, the shelf projecting inwardly into the container, the shelf spaced away from the base to form a cavity at least substantially holding the first food component for cooking of the first food component; and
  a basket holding the second food component, the basket being removably receivable by the container and having a base, the base of the basket resting on the shelf of the container when the basket is received in the container so that the first food component is at least substantially contained in the cavity between the base of the container and the base of the basket;
  wherein at least one of the container and the basket define a passage to enhance heating of the second food component.

2. The cooking apparatus as claimed in claim 1, further comprising a sheet of barrier material continuously sealed to a rim of the container, the sheet of barrier material enclosing the basket within the container.

3. The cooking apparatus as claimed in claim 1, wherein the basket includes a second sidewall, and wherein the passage is at least partially defined between the sidewall and the second sidewall.

4. The cooking apparatus as claimed in claim 1, wherein at least one of the container and the basket are constructed from a material selected from a group consisting of aluminum, CPET, polypropylene, nylon, pressed paperboard, and molded pulp.

5. The cooking apparatus as claimed in claim 1, wherein the first food component is a sauce, and the second food component includes at least one of protein, starch, and vegetables.

6. The cooking apparatus as claimed in claim 5, wherein the first food component includes protein.

7. A system for maintaining the separateness of food components while facilitating cooking thereof, comprising:
- a food comprising a first food component and a second food component, the first food component comprising at least one of a sauce, a gravy, a protein, a carbohydrate, or a vegetable;
- a first container including a base and a sidewall having an at least substantially continuous shelf formed therein, the shelf projecting inwardly into the container, the shelf spaced away from the base to form a cavity at least substantially holding the first food component for cooking of the first food component;
- a second container holding the second food component, the second container removably receivable by the first container and separating the second food component from the first food component, the second container having a base and sidewalls, the base of the second container including an aperture extending through a bottom surface of the base of the second container, the sidewalls of the second container extending from the base of the second container to a rim of the second container to define a volume, the second food component being held at least substantially within the volume, the bottom surface of the base resting on the shelf when the second container is received in the first container so that the first food component is at least substantially contained within the cavity between the base of the first container and the base of the second container;
- wherein separation of the first food component from the second food component maintains a surface area for the first and second food components to facilitate heating of the first and second food components.

8. The system as claimed in claim 7, wherein the second container is steam impermeable.

9. The cooking apparatus as claimed in claim 7, further comprising a sheet of barrier material continuously sealed to a rim of the container, the sheet of barrier material enclosing the second container within the first container.

10. The system as claimed in claim 7, wherein at least one of the first container and the second container are constructed from a material selected from a group consisting of aluminum, CPET, polypropylene, nylon, pressed paperboard, and molded pulp.

11. The system as claimed in claim 7, wherein the second food component includes at least one of protein, starch, and vegetables.

12. The system as claimed in claim 7, wherein at least one of the first container and the second container define a passage through which hot air circulates to heat the first and second food components.

13. The system as claimed in claim 12, wherein the first food component has a liquid based content, and heating the first food component enhances heating of the second food component.

14. The system as claimed in claim 12, wherein the passage is defined by the aperture.

15. The system as claimed in claim 12, wherein the second container includes a second sidewall, and wherein a passage is at least partially defined between the sidewall and the second sidewall.

* * * * *